US012041467B2

(12) United States Patent
Akl et al.

(10) Patent No.: US 12,041,467 B2
(45) Date of Patent: Jul. 16, 2024

(54) DELAYED RECONFIGURATION IN WIRELESS SYSTEMS

(71) Applicant: QUALCOMM Incorporated, San Diego, CA (US)

(72) Inventors: Naeem Akl, Somerville, NJ (US); Karl Georg Hampel, Hoboken, NJ (US); Ozcan Ozturk, San Diego, CA (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/323,930

(22) Filed: May 18, 2021

(65) Prior Publication Data

US 2021/0368360 A1 Nov. 25, 2021

Related U.S. Application Data

(60) Provisional application No. 63/029,330, filed on May 22, 2020.

(51) Int. Cl.
*H04W 24/02* (2009.01)
*H04L 9/40* (2022.01)
(Continued)

(52) U.S. Cl.
CPC ......... *H04W 24/02* (2013.01); *H04L 41/0813* (2013.01); *H04L 63/18* (2013.01);
(Continued)

(58) Field of Classification Search
None
See application file for complete search history.

(56) References Cited

U.S. PATENT DOCUMENTS

2009/0228593 A1 9/2009 Takeda
2020/0267795 A1* 8/2020 Jung .................... H04W 36/16
(Continued)

FOREIGN PATENT DOCUMENTS

WO WO-2020007338 A1 1/2020
WO WO-2020090987 A1 5/2020

OTHER PUBLICATIONS

International Search Report and Written Opinion—PCT/US2021/033168—ISA/EPO—Sep. 13, 2021.

*Primary Examiner* — Bob A Phunkulh
(74) *Attorney, Agent, or Firm* — Holland & Hart LLP

(57) ABSTRACT

Methods, systems, and devices for wireless communications are described that support delaying the application of reconfiguration messages. An integrated access and backhaul (IAB) node transmit or receive, along a first signaling path, a reconfiguration message indicating the first IAB node to postpone applying a reconfiguration message until a second signaling path becomes available. The first IAB node may send a reconfiguration complete message to a first IAB donor node along the first path and wait to perform a procedure with the first IAB donor node. When the second path becomes available, the first IAB node and the second IAB node may then perform the procedure. In some cases, delaying the reconfiguration may involve postponing the forwarding of messages received at the first IAB node.

25 Claims, 24 Drawing Sheets

Receive, from a second node and via a first signaling path between the first node and a first donor node, a reconfiguration message that indicates a reconfiguration of the first node for a second signaling path via a third node and an indication to delay application of a portion of the reconfiguration message — 1105

Communicate via the second signaling path in accordance with the reconfiguration message based at least in part on a trigger for reconfiguration of the first node for the second signaling path via the third node — 1110

1100

(51) Int. Cl.
*H04L 41/0813* (2022.01)
*H04W 76/15* (2018.01)
*H04W 76/18* (2018.01)
*H04W 36/00* (2009.01)

(52) U.S. Cl.
CPC ........... *H04W 76/15* (2018.02); *H04W 76/18* (2018.02); *H04W 36/0055* (2013.01)

(56) References Cited

U.S. PATENT DOCUMENTS

| | | | | |
|---|---|---|---|---|
| 2021/0127293 | A1* | 4/2021 | Hong | H04W 24/08 |
| 2022/0015176 | A1* | 1/2022 | Ishii | H04W 76/19 |
| 2022/0070696 | A1* | 3/2022 | Jung | H04W 24/02 |
| 2022/0070959 | A1* | 3/2022 | Jung | H04W 76/19 |
| 2022/0086749 | A1* | 3/2022 | Ishii | H04W 40/36 |
| 2022/0132337 | A1* | 4/2022 | Muhammad | H04W 40/34 |
| 2022/0151006 | A1* | 5/2022 | Muhammad | H04W 76/19 |
| 2022/0182903 | A1* | 6/2022 | Ishii | H04W 36/0058 |
| 2022/0217598 | A1* | 7/2022 | Ishii | H04W 36/305 |
| 2022/0217613 | A1* | 7/2022 | Teyeb | H04L 45/74 |
| 2022/0217804 | A1* | 7/2022 | Jung | H04W 28/0268 |
| 2022/0232494 | A1* | 7/2022 | Sandgren | H04W 56/0025 |

* cited by examiner

DELAYED RECONFIGURATION IN WIRELESS SYSTEMS

CROSS REFERENCE

The present application for patent claims the benefit of U.S. Provisional Patent Application No. 63/029,330 by AKL et al., entitled "DELAYED RECONFIGURATION IN WIRELESS SYSTEMS," filed May 22, 2020, assigned to the assignee hereof, and expressly incorporated by reference herein.

INTRODUCTION

The following relates generally to wireless communications and more specifically to methods and systems for managing reconfiguration messages in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first node in a wireless communications system is described. The method may include receiving, from a second node and via a first signaling path between the first node and a first donor node, a reconfiguration message that indicates a reconfiguration of the first node for a second signaling path via a third node and an indication to delay application of a portion of the reconfiguration message and communicating via the second signaling path in accordance with the reconfiguration message based on a trigger for reconfiguration of the first node for the second signaling path via the third node.

An apparatus for wireless communications at a first node in a wireless communications system is described. The apparatus may include a processor, memory coupled with the processor, and instructions stored in the memory. The instructions may be executable by the processor to cause the apparatus to receive, from a second node and via a first signaling path between the first node and a first donor node, a reconfiguration message that indicates a reconfiguration of the first node for a second signaling path via a third node and an indication to delay application of a portion of the reconfiguration message and communicate via the second signaling path in accordance with the reconfiguration message based on a trigger for reconfiguration of the first node for the second signaling path via the third node.

Another apparatus for wireless communications at a first node in a wireless communications system is described. The apparatus may include means for receiving, from a second node and via a first signaling path between the first node and a first donor node, a reconfiguration message that indicates a reconfiguration of the first node for a second signaling path via a third node and an indication to delay application of a portion of the reconfiguration message and means for communicating via the second signaling path in accordance with the reconfiguration message based on a trigger for reconfiguration of the first node for the second signaling path via the third node.

A non-transitory computer-readable medium storing code for wireless communications at a first node in a wireless communications system is described. The code may include instructions executable by a processor to receive, from a second node and via a first signaling path between the first node and a first donor node, a reconfiguration message that indicates a reconfiguration of the first node for a second signaling path via a third node and an indication to delay application of a portion of the reconfiguration message and communicate via the second signaling path in accordance with the reconfiguration message based on a trigger for reconfiguration of the first node for the second signaling path via the third node.

In some examples of the method, apparatuses, and non-transitory computer-readable medium described herein, the reconfiguration message includes the indication to delay application of the portion of the reconfiguration message.

Some examples of the method, apparatuses, and non-transitory computer-readable medium described herein may further include operations, features, means, or instructions for delaying application of the portion of the reconfiguration message based on the second signaling path being unavailable and the indication to delay application of the portion of the reconfiguration message, determining that the second signaling path may be available, and applying the portion of the reconfiguration message based on the determining.

Some examples of the method, apparatuses, and non-transitory computer-readable medium described herein may further include operations, features, means, or instructions for establishing a connection with the first donor node of the wireless communications system via the second node of the wireless communications system.

Some examples of the method, apparatuses, and non-transitory computer-readable medium described herein may further include operations, features, means, or instructions for establishing a second connection with one of the first donor node or a second donor node as part of the reconfiguration of the first node and determining that the second signaling path may be available based on establishing the second connection.

In some examples of the method, apparatuses, and non-transitory computer-readable medium described herein, the indication to delay application of the portion of the reconfiguration message may include operations, features, means, or instructions for an indication to postpone one or more procedures triggered by the reconfiguration message.

In some examples of the method, apparatuses, and non-transitory computer-readable medium described herein, the reconfiguration message indicates updated uplink mapping information or Internet Protocol (IP) address information for the first node for communications via the second signaling path and the method, apparatuses, and non-transitory computer-readable medium may include further operations, features, means, or instructions for utilizing, before communicating via the second signaling path, initial uplink mapping information or IP address information different from the updated uplink mapping information or IP address information for the first node for communications via the first signaling path.

In some examples of the method, apparatuses, and non-transitory computer-readable medium described herein, utilizing the initial uplink mapping information or IP address information may include operations, features, means, or instructions for transmitting a reconfiguration complete message to the first donor node via the first signaling path in accordance with the initial uplink mapping information or IP address information.

Some examples of the method, apparatuses, and non-transitory computer-readable medium described herein may further include operations, features, means, or instructions for transmitting an acknowledgement of the reconfiguration message via the second signaling path in accordance with the updated uplink mapping information or IP address information as part of communicating via the second signaling path.

Some examples of the method, apparatuses, and non-transitory computer-readable medium described herein may further include operations, features, means, or instructions for initiating a security handshake via the second signaling path in accordance with the updated uplink mapping information or IP address information as part of communicating via the second signaling path.

In some examples of the method, apparatuses, and non-transitory computer-readable medium described herein, the trigger for reconfiguration of the first node for the second signaling path via the third node includes an expiration of a timer, an absolute time, reception of a first indication from the first donor node, reception of an indication from a parent node of the first node, or any combination thereof.

In some examples of the method, apparatuses, and non-transitory computer-readable medium described herein, the indication to delay application of the portion of the reconfiguration message may include operations, features, means, or instructions for an indication to postpone forwarding of an upstream message to the third node, where the upstream message may be from a child node of the first node.

Some examples of the method, apparatuses, and non-transitory computer-readable medium described herein may further include operations, features, means, or instructions for performing a random access procedure, a security handshake, or a handover procedure from the second node to the third node.

Some examples of the method, apparatuses, and non-transitory computer-readable medium described herein may further include operations, features, means, or instructions for configuring a new or existing stream control transmission protocol (SCTP) connection, a new of existing F1 control plane (F1-C) connection, an additional signaling path of an existing SCTP connection, or one or more new or existing F1 user plane (F1-U) data tunnels for the first node based at least in part on the reconfiguration message.

Some examples of the method, apparatuses, and non-transitory computer-readable medium described herein may further include operations, features, means, or instructions for discarding one or more portions of the reconfiguration message based at least in part on a failure of establishment of the second signaling path.

Some examples of the method, apparatuses, and non-transitory computer-readable medium described herein may further include operations, features, means, or instructions for determining the failure of establishment of the second signaling path based on an indication from the first donor node, a parent node of the first node, or a lack of receipt of a configuration message from the parent node prior to expiration of a timer.

In some examples of the method, apparatuses, and non-transitory computer-readable medium described herein, the second signaling path may be between the first node and the first donor node or between the first node and a second donor node.

A method for wireless communications at a parent node in a wireless communications system is described. The method may include transmitting, to a child node and via a first signaling path between the child node and a first donor node, a reconfiguration message that indicates a reconfiguration of the child node for a second signaling path based on a trigger for reconfiguration of the child node for the second signaling path and applying a portion of the reconfiguration message based on determining that the trigger for reconfiguration of the child node for the second signaling path is satisfied.

An apparatus for wireless communications at a parent node in a wireless communications system is described. The apparatus may include a processor, memory coupled with the processor, and instructions stored in the memory. The instructions may be executable by the processor to cause the apparatus to transmit, to a child node and via a first signaling path between the child node and a first donor node, a reconfiguration message that indicates a reconfiguration of the child node for a second signaling path based on a trigger for reconfiguration of the child node for the second signaling path and apply a portion of the reconfiguration message based on determining that the trigger for reconfiguration of the child node for the second signaling path is satisfied.

Another apparatus for wireless communications at a parent node in a wireless communications system is described. The apparatus may include means for transmitting, to a child node and via a first signaling path between the child node and a first donor node, a reconfiguration message that indicates a reconfiguration of the child node for a second signaling path based on a trigger for reconfiguration of the child node for the second signaling path and means for applying a portion of the reconfiguration message based on determining that the trigger for reconfiguration of the child node for the second signaling path is satisfied.

A non-transitory computer-readable medium storing code for wireless communications at a parent node in a wireless communications system is described. The code may include instructions executable by a processor to transmit, to a child node and via a first signaling path between the child node and a first donor node, a reconfiguration message that indicates a reconfiguration of the child node for a second signaling path based on a trigger for reconfiguration of the child node for the second signaling path and apply a portion of the reconfiguration message based on determining that the trigger for reconfiguration of the child node for the second signaling path is satisfied.

Some examples of the method, apparatuses, and non-transitory computer-readable medium described herein may further include operations, features, means, or instructions for receiving an upstream message from the child node, refraining from forwarding the upstream message to the first donor node based on the trigger not being satisfied, and forwarding the upstream message to the first donor node based on the trigger being satisfied.

Some examples of the method, apparatuses, and non-transitory computer-readable medium described herein may further include operations, features, means, or instructions for detecting a random access configuration, completion of a handover procedure, or a distributed unit (DU) function change at the parent node and forwarding the upstream message to the first donor node based on the detecting.

Some examples of the method, apparatuses, and non-transitory computer-readable medium described herein may further include operations, features, means, or instructions for transmitting an indication that instructs the child node to delay application of the reconfiguration message until the trigger, the trigger including an expiration of a timer, a first indication from the first donor node, a second indication from the parent node, an absolute time, or any combination thereof.

Some examples of the method, apparatuses, and non-transitory computer-readable medium described herein may further include operations, features, means, or instructions for transmitting, to the child node, an indication to apply the portion of the reconfiguration message, wherein the trigger includes the indication.

Some examples of the method, apparatuses, and non-transitory computer-readable medium described herein may further include operations, features, means, or instructions for receiving an indication from the first donor node instructing the parent node to delay application of the portion of the reconfiguration message.

Some examples of the method, apparatuses, and non-transitory computer-readable medium described herein may further include operations, features, means, or instructions for refraining from scheduling uplink messages for the child node for a portion of time based on the trigger not being satisfied.

Some examples of the method, apparatuses, and non-transitory computer-readable medium described herein may further include operations, features, means, or instructions for transmitting, to the child node, a message indicating a failure of establishment of the second signaling path.

A method for wireless communications at a donor node in a wireless communications system is described. The method may include establishing a first connection with a first node of the wireless communications system, establishing a second connection with a second node of the wireless communications system, and transmitting, to the first node and via a first signaling path between the first node and the donor node via the second node, a reconfiguration message that indicates a reconfiguration of the first node to use a second signaling path and an indication to delay application of a portion of the reconfiguration message.

An apparatus for wireless communications at a donor node in a wireless communications system is described. The apparatus may include a processor, memory coupled with the processor, and instructions stored in the memory. The instructions may be executable by the processor to cause the apparatus to establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message.

Another apparatus for wireless communications at a donor node in a wireless communications system is described. The apparatus may include means for establishing a first connection with a first node of the wireless communications system, means for establishing a second connection with a second node of the wireless communications system, and means for transmitting, to the first node and via a first signaling path between the first node and the donor node via the second node, a reconfiguration message that indicates a reconfiguration of the first node to use a second signaling path and an indication to delay application of a portion of the reconfiguration message.

A non-transitory computer-readable medium storing code for wireless communications at a donor node in a wireless communications system is described. The code may include instructions executable by a processor to establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message.

Some examples of the method, apparatuses, and non-transitory computer-readable medium described herein may further include operations, features, means, or instructions for receiving, from the first node via the first signaling path, acknowledgement of the reconfiguration message and receiving, from the first node via the second signaling path, a second acknowledgement of the reconfiguration message.

In some examples of the method, apparatuses, and non-transitory computer-readable medium described herein, the indication to delay application of the portion of the reconfiguration message instructs one of the first node or the second node to postpone one or more procedures triggered by the reconfiguration message.

In some examples of the method, apparatuses, and non-transitory computer-readable medium described herein, the indication to delay application of the portion of the reconfiguration message instructs one of the first node or the second node to delay application of the portion of the reconfiguration message until expiration of a timer, a trigger from the donor node or parent node, an absolute time, or any combination thereof.

A method of wireless communications at a first node in wireless communications system is described. The method may include establishing a connection with a first donor node of the wireless communications system via a second node of the wireless communications system, receiving, from the second node and via a first signaling path between the first node and the first donor node, a reconfiguration message that indicates a reconfiguration of the first node for a second signaling path via a third node, delaying application of a portion of the reconfiguration message based on the second signaling path being unavailable, determining that the second signaling path is available, applying the portion of the reconfiguration message based on the determining, and communicating via the second signaling path in accordance with the reconfiguration message based on applying the portion of the reconfiguration message.

An apparatus for wireless communications at a first node in wireless communications system is described. The apparatus may include a processor, memory coupled with the processor, and instructions stored in the memory. The instructions may be executable by the processor to cause the apparatus to establish a connection with a first donor node of the wireless communications system via a second node of the wireless communications system, receive, from the second node and via a first signaling path between the first node and the first donor node, a reconfiguration message that indicates a reconfiguration of the first node for a second signaling path via a third node, delay application of a portion of the reconfiguration message based on the second signaling path being unavailable, determine that the second signaling path is available, apply the portion of the reconfiguration message based on the determining, and communicate via the second signaling path in accordance with the reconfiguration message based on applying the portion of the reconfiguration message.

Another apparatus for wireless communications at a first node in wireless communications system is described. The apparatus may include means for establishing a connection with a first donor node of the wireless communications system via a second node of the wireless communications system, receiving, from the second node and via a first signaling path between the first node and the first donor node, a reconfiguration message that indicates a reconfiguration of the first node for a second signaling path via a third node, delaying application of a portion of the reconfiguration message based on the second signaling path being unavailable, determining that the second signaling path is available, applying the portion of the reconfiguration message based on the determining, and communicating via the second signaling path in accordance with the reconfiguration message based on applying the portion of the reconfiguration message.

A non-transitory computer-readable medium storing code for wireless communications at a first node in wireless communications system is described. The code may include instructions executable by a processor to establish a connection with a first donor node of the wireless communications system via a second node of the wireless communications system, receive, from the second node and via a first signaling path between the first node and the first donor node, a reconfiguration message that indicates a reconfiguration of the first node for a second signaling path via a third node, delay application of a portion of the reconfiguration message based on the second signaling path being unavailable, determine that the second signaling path is available, apply the portion of the reconfiguration message based on the determining, and communicate via the second signaling path in accordance with the reconfiguration message based on applying the portion of the reconfiguration message.

Some examples of the method, apparatuses, and non-transitory computer-readable medium described herein may further include operations, features, means, or instructions for postponing one or more procedures triggered by the reconfiguration message.

Some examples of the method, apparatuses, and non-transitory computer-readable medium described herein may further include operations, features, means, or instructions for utilizing, while delaying application of the portion of the reconfiguration message, initial uplink mapping information different from the updated uplink mapping information for the first node for communications via the first signaling path.

In some examples of the method, apparatuses, and non-transitory computer-readable medium described herein, utilizing the initial uplink mapping information may include operations, features, means, or instructions for transmitting a reconfiguration complete message to the first donor node via the first signaling path in accordance with the initial uplink mapping information.

Some examples of the method, apparatuses, and non-transitory computer-readable medium described herein may further include operations, features, means, or instructions for transmitting an acknowledgement of the reconfiguration message via the second signaling path in accordance with the updated uplink mapping information after applying the portion of the reconfiguration message.

Some examples of the method, apparatuses, and non-transitory computer-readable medium described herein may further include operations, features, means, or instructions for initiating a security handshake via the second signaling path in accordance with the updated uplink mapping information after applying the portion of the reconfiguration message.

Some examples of the method, apparatuses, and non-transitory computer-readable medium described herein may further include operations, features, means, or instructions for receiving, from the first donor node, an indication to delay application of the portion of the reconfiguration message, and delaying application of the portion of the reconfiguration message based on the indication.

Some examples of the method, apparatuses, and non-transitory computer-readable medium described herein may further include operations, features, means, or instructions for delaying application of the portion of the reconfiguration message until expiration of a timer, an absolute time, reception of an indication from the first donor node, reception of a trigger from a parent node of the first node, or any combination thereof.

Some examples of the method, apparatuses, and non-transitory computer-readable medium described herein may further include operations, features, means, or instructions for receiving an indication to extend delaying application of the portion of the reconfiguration message from the first donor node or the second node, and extending delaying application of the portion of the reconfiguration message based on the indication.

Some examples of the method, apparatuses, and non-transitory computer-readable medium described herein may further include operations, features, means, or instructions for postponing forwarding of an upstream message to the third node, where the upstream message may be from a child node of the first node.

Some examples of the method, apparatuses, and non-transitory computer-readable medium described herein may further include operations, features, means, or instructions for receiving an indication to postpone forwarding of one or more upstream messages received at the first node, where the upstream message may be postponed based on the indication.

In some examples of the method, apparatuses, and non-transitory computer-readable medium described herein, the indication to postpone forwarding may be associated with a Backhaul Adaptation Protocol (BAP) address, a BAP routing identifier (ID), a channel ID, or any combination thereof.

In some examples of the method, apparatuses, and non-transitory computer-readable medium described herein, the indication to postpone forwarding may be associated with a given mobile termination (MT) function of the wireless communications system or a set of MT functions of the wireless communications system.

In some examples of the method, apparatuses, and non-transitory computer-readable medium described herein, postponing forwarding of the upstream message may include operations, features, means, or instructions for refraining from scheduling uplink messages for the child node of the first node.

Some examples of the method, apparatuses, and non-transitory computer-readable medium described herein may further include operations, features, means, or instructions for discarding the upstream message based on an indication from the first donor node, an indication from a parent node of the first node, a handover failure, or a lack of receipt a configuration message from the parent node prior to expiration of a timer.

Some examples of the method, apparatuses, and non-transitory computer-readable medium described herein may further include operations, features, means, or instructions for establishing a second connection with one of the first donor node or the second donor node as part of the reconfiguration of the first node, and determining that the second signaling path may be available based on establishing the second connection.

In some examples of the method, apparatuses, and non-transitory computer-readable medium described herein, applying the portion of the reconfiguration message may include operations, features, means, or instructions for performing a random access procedure, a security handshake, or a handover procedure from the second node to the third node.

In some examples of the method, apparatuses, and non-transitory computer-readable medium described herein, applying the portion of the reconfiguration message may include operations, features, means, or instructions for establishing an SCTP connection or an F1-C connection for the first node.

In some examples of the method, apparatuses, and non-transitory computer-readable medium described herein, applying the portion of the reconfiguration message may include operations, features, means, or instructions for establishing an additional signaling path of an existing SCTP connection or one or more F1-U data tunnels for the first node.

Some examples of the method, apparatuses, and non-transitory computer-readable medium described herein may further include operations, features, means, or instructions for discarding one or more portions of the reconfiguration message based at least in part on a failure of establishment of the second signaling path.

Some examples of the method, apparatuses, and non-transitory computer-readable medium described herein may further include operations, features, means, or instructions for determining the failure of establishment of the second signaling path based on an indication from the first donor node, a parent node of the first node, or a lack of receipt a configuration message from the parent node prior to expiration of a timer.

In some examples of the method, apparatuses, and non-transitory computer-readable medium described herein, the second signaling path may be between the first node and the first donor node or between the first node and a second donor node.

A method of wireless communications at a parent node in a wireless communications system is described. The method may include establishing a connection between a child node and a first donor node of the wireless communications system via the parent node, transmitting, to the child node and via a first signaling path between the child node and the first donor node, a reconfiguration message that indicates a reconfiguration of the child node for a second signaling path, delaying application of a portion of the reconfiguration message based on the second signaling path being unavailable, determining that the second signaling path is available, and applying the portion of the reconfiguration message based on determining that the second signaling path is available.

An apparatus for wireless communications at a parent node in a wireless communications system is described. The apparatus may include a processor, memory coupled with the processor, and instructions stored in the memory. The instructions may be executable by the processor to cause the apparatus to establish a connection between a child node and a first donor node of the wireless communications system via the parent node, transmit, to the child node and via a first signaling path between the child node and the first donor node, a reconfiguration message that indicates a reconfiguration of the child node for a second signaling path, delay application of a portion of the reconfiguration message based on the second signaling path being unavailable, determine that the second signaling path is available, and apply the portion of the reconfiguration message based on determining that the second signaling path is available.

Another apparatus for wireless communications at a parent node in a wireless communications system is described. The apparatus may include means for establishing a connection between a child node and a first donor node of the wireless communications system via the parent node, transmitting, to the child node and via a first signaling path between the child node and the first donor node, a reconfiguration message that indicates a reconfiguration of the child node for a second signaling path, delaying application of a portion of the reconfiguration message based on the second signaling path being unavailable, determining that the second signaling path is available, and applying the portion of the reconfiguration message based on determining that the second signaling path is available.

A non-transitory computer-readable medium storing code for wireless communications at a parent node in a wireless communications system is described. The code may include instructions executable by a processor to establish a connection between a child node and a first donor node of the wireless communications system via the parent node, transmit, to the child node and via a first signaling path between the child node and the first donor node, a reconfiguration message that indicates a reconfiguration of the child node for a second signaling path, delay application of a portion of the reconfiguration message based on the second signaling path being unavailable, determine that the second signaling path is available, and apply the portion of the reconfiguration message based on determining that the second signaling path is available.

Some examples of the method, apparatuses, and non-transitory computer-readable medium described herein may further include operations, features, means, or instructions for receiving an upstream message from the child node, and refraining from forwarding the upstream message to the first donor node based on delaying application of the portion of the reconfiguration message.

Some examples of the method, apparatuses, and non-transitory computer-readable medium described herein may further include operations, features, means, or instructions for forwarding the upstream message to the first donor node after applying the portion of the reconfiguration message.

Some examples of the method, apparatuses, and non-transitory computer-readable medium described herein may further include operations, features, means, or instructions for detecting a random access configuration, completion of a handover procedure, or a DU function change at the parent node, and forwarding the upstream message to the first donor node based on the detecting.

Some examples of the method, apparatuses, and non-transitory computer-readable medium described herein may further include operations, features, means, or instructions for detecting a security handshake, establishment of an SCTP connection, or modification of an existing SCTP connection, and forwarding the upstream message to the first donor node based on the detecting.

Some examples of the method, apparatuses, and non-transitory computer-readable medium described herein may further include operations, features, means, or instructions for detecting establishment or migration of an F1-C connection, or setup or migration of one or more F1-U connections, and forwarding the upstream message to the first donor node based on the detecting.

Some examples of the method, apparatuses, and non-transitory computer-readable medium described herein may further include operations, features, means, or instructions for transmitting an indication to the child node instructing the child node to delay application of the reconfiguration message.

In some examples of the method, apparatuses, and non-transitory computer-readable medium described herein, the indication instructs the child node to delay application of the reconfiguration message until expiration of a timer, a trigger from the parent node or the first donor node, an absolute time, or any combination thereof.

In some examples of the method, apparatuses, and non-transitory computer-readable medium described herein, the indication instructs the child node to extend delaying application of the reconfiguration message.

Some examples of the method, apparatuses, and non-transitory computer-readable medium described herein may further include operations, features, means, or instructions for receiving an indication from the first donor node instructing the parent node to delay application of the portion of the reconfiguration message.

Some examples of the method, apparatuses, and non-transitory computer-readable medium described herein may further include operations, features, means, or instructions for transmitting a configuration message to the child node configuring the child node with a reconnection timer based on delaying application of the portion of the reconfiguration message.

In some examples of the method, apparatuses, and non-transitory computer-readable medium described herein, delaying application of the portion of the reconfiguration message may include operations, features, means, or instructions for delaying scheduling uplink messages for the child node.

In some examples of the method, apparatuses, and non-transitory computer-readable medium described herein, the second signaling path may be between the child node and the first donor node or between the child node and a second donor node.

A method of wireless communications at a donor node in a wireless communications system is described. The method may include establishing a first connection with a first node of the wireless communications system, establishing a second connection with a second node of the wireless communications system, and transmitting, to the first node and via a first signaling path between the first node and the donor node via the second node, a reconfiguration message that indicates a reconfiguration of the first node to use a second signaling path and an indication to delay application of a portion of the reconfiguration message.

An apparatus for wireless communications at a donor node in a wireless communications system is described. The apparatus may include a processor, memory coupled with the processor, and instructions stored in the memory. The instructions may be executable by the processor to cause the apparatus to establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message.

Another apparatus for wireless communications at a donor node in a wireless communications system is described. The apparatus may include means for establishing a first connection with a first node of the wireless communications system, establishing a second connection with a second node of the wireless communications system, and transmitting, to the first node and via a first signaling path between the first node and the donor node via the second node, a reconfiguration message that indicates a reconfiguration of the first node to use a second signaling path and an indication to delay application of a portion of the reconfiguration message.

A non-transitory computer-readable medium storing code for wireless communications at a donor node in a wireless communications system is described. The code may include instructions executable by a processor to establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message.

Some examples of the method, apparatuses, and non-transitory computer-readable medium described herein may further include operations, features, means, or instructions for receiving, from the first node via the first signaling path, acknowledgement of the reconfiguration message.

Some examples of the method, apparatuses, and non-transitory computer-readable medium described herein may further include operations, features, means, or instructions for receiving, from the first node via the second signaling path, a second acknowledgement of the reconfiguration message.

Some examples of the method, apparatuses, and non-transitory computer-readable medium described herein may further include operations, features, means, or instructions for transmitting the reconfiguration message for a second donor node of the wireless communications system, where the second signaling path may be between the first node and the second donor node.

In some examples of the method, apparatuses, and non-transitory computer-readable medium described herein, the indication to delay application of the portion of the reconfiguration message instructs one of the first node or the second node to postpone one or more procedures triggered by the reconfiguration message.

In some examples of the method, apparatuses, and non-transitory computer-readable medium described herein, the indication to delay application of the portion of the reconfiguration message instructs one of the first node or the second node to delay application of the portion of the reconfiguration message until expiration of a timer, a trigger from the donor node or parent node, an absolute time, or any combination thereof.

DETAILED DESCRIPTION

Figure 1:
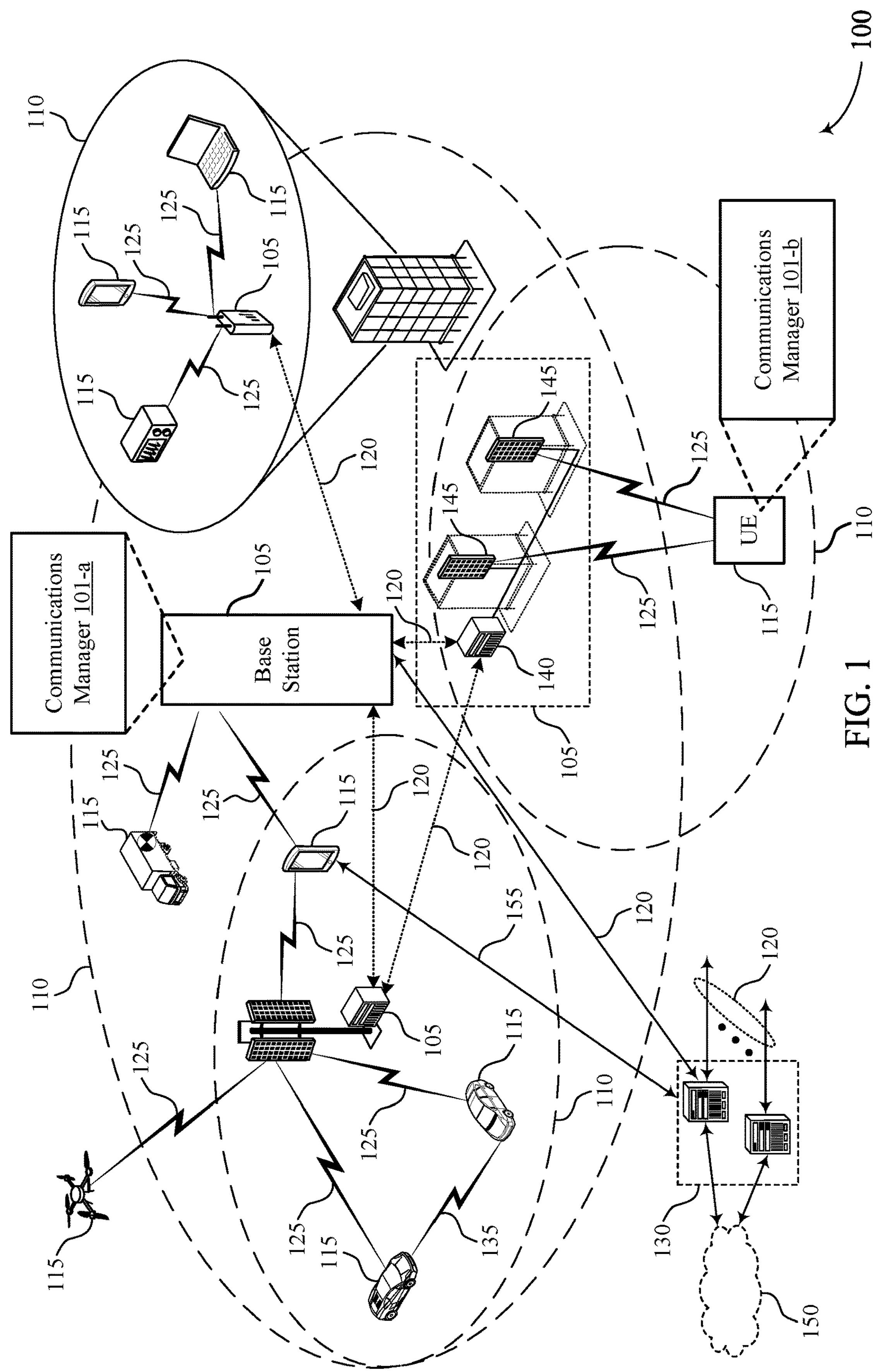
FIG. 1 illustrates an example of a wireless communications system that supports delayed reconfiguration in wireless systems in accordance with one or more aspects of the present disclosure.

Some wireless communication systems may be configured to support an integrated access and backhaul (IAB) network, where one or more access nodes have wireless backhaul connections to a network. The IAB network architecture may include an IAB donor node with functions to control the IAB network that is connected to the core network and terminating with a UE, with any number of IAB nodes in between that may act as relays for communication between the UE and the core network. In some aspects, an IAB network shares resources between access and backhaul links. In some examples, the IAB donor node (which may also be referred to as an anchor node) is an access node having a wireline connection to the core network. The donor node may have a central unit (CU) that is a central entity that controls or otherwise configures resources within the IAB network. The donor node may also have one or more DUs that serve as scheduling nodes to schedule child nodes of the IAB donor node. Downstream from the IAB donor node may include one or more IAB nodes (also referred to as wireless nodes) within the IAB network, with each downstream IAB node constituting a hop within the IAB network. Each IAB node may relay traffic from an IAB donor node through one or more hops. In one example, each IAB node may have the DU and an MT. The DU of the IAB node may act as a scheduling node that schedules child nodes of this particular IAB node, which may be a UE or a child wireless node (e.g., a UE or a base station within the IAB network). The MT may serve as a scheduled node similar to a UE that is scheduled by its parent IAB node. In this context, the parent IAB node may be an IAB donor node (e.g., an anchor node) or a parent IAB node within the IAB network (e.g., an upstream wireless node).

An IAB donor node may communicate with a destination IAB node along a first signaling path that includes a number of intermediate IAB nodes. The IAB donor node may determine to establish a second signaling path to the destination IAB node and perform a handover procedure from the first signaling path to the second signaling path. In order to perform the handover procedure, the IAB donor node transmits a reconfiguration message to a first IAB node on the first signaling path to the destination IAB node that indicates a reconfiguration for a second signaling path to the IAB donor node. The first IAB node then node applies the reconfiguration message and transmits an acknowledgement message (e.g., a reconfiguration complete message) on the second signaling path to the IAB donor node. The first IAB node then initiates a security handshake procedure on the second signaling path. This process of reconfiguration message exchange followed by a security handshake procedure is then repeated for each intermediate IAB node between the IAB donor node and the destination IAB node. Thus, each reconfiguration message exchange and security handshake procedure occurs sequentially and may increase the delay of the handover procedure.

In some examples, a first IAB donor node with a signaling connection to a first IAB node and a second IAB node may transmit a reconfiguration message to the first IAB node on a first signaling path via the second IAB node. In some cases, the reconfiguration message may indicate to the first IAB node to postpone applying at least part of the reconfiguration message until a second signaling path to the first IAB donor node becomes available. The first IAB node may then postpone applying at least part of the reconfiguration message until the second signaling path becomes available. Here, the first IAB node may transmit an acknowledgement message (e.g., a reconfiguration complete message) to the first IAB donor node on the first signaling path and postpone initiating a security handshake procedure with the first IAB donor node. When the second signaling path becomes available, the first IAB node and the second IAB node may each initiate the security handshake procedure with the first IAB donor on the second signaling path in parallel. In some cases, the first signaling path is a signaling path from a CU of the first IAB donor node to the first IAB node via a first DU of the first IAB donor node and the second signaling path is a signaling path from the CU to the first IAB node via a second DU of the IAB donor node. In some examples, the first IAB node may be a child of the second IAB node or a descendant node on the first signaling path with respect to the second IAB node, where the descendant node is a node that is more than one hop away from the second IAB node on the first signaling path.

In some instances, the first IAB node may postpone applying at least part of the reconfiguration message until it receives an indication from the second IAB node. In some cases, when the first IAB node is a descendant node of the second IAB node, the first IAB node may postpone applying at least part of the reconfiguration message until it receives the indication from its parent node. The indication may trigger the first IAB node to fully apply the reconfiguration message and initiate the security handshake procedure.

In some examples, the first IAB donor node may send a reconfiguration message to the first IAB node via the second IAB node that indicates a second signaling path to either the first IAB donor node or a second IAB donor node. The first IAB node may then apply the reconfiguration message, transmit an acknowledgement message to the second IAB node, and initiate a security handshake procedure on the second signaling path. In some cases, the second path may not be available and the second IAB node may postpone forwarding the acknowledgement message and security handshake procedure to the first IAB donor node or the second IAB donor node until the second signaling path is available. When the second signaling path is available, the first IAB node and the second IAB node may each perform the security handshake procedure with the first IAB donor node or the second IAB donor node on the second path in parallel, thus reducing the delay of the handover procedure.

Aspects of the disclosure are initially described in the context of wireless communications systems. Aspects of the disclosure then described in context of a network scheme. Aspects of the disclosure are further illustrated by and described with reference to apparatus diagrams, system diagrams, and flowcharts that relate to delayed reconfiguration in wireless systems.

FIG. 1 illustrates an example of a wireless communications system 100 that supports delayed reconfiguration in wireless systems in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “millimeter wave” or the like if used herein may broadly represent frequencies that may include mid-band frequencies, may be within FR2, FR4, FR4-a or FR4-1, or FR5, or may be within the EHF band.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, wireless communications system 100 may support IAB functionality and a communications manager 101 may be included in a device to support delayed execution of reconfiguration messages in an IAB network. For example, a base station 105 and a UE 115 may each be an example of an IAB node that supports IAB functionality with other IAB nodes. An IAB node may include one or both of MT and DU functionality to support communications with other IAB nodes. An IAB node may act as a parent IAB node that supports communication for one or more child IAB nodes and may relay communications from a child IAB node to a donor IAB node.

In some aspects, base station 105 may include a communications manager 101-*a*, or a UE 115 may include a communications manager 101-*b*. In some cases, a base station 105 in the wireless communications system 100 may operate as an IAB donor node or an IAB node, and a UE 115 may operate as an IAB node as described herein.

In some aspects, if a base station 105 is operating as an IAB donor node, communications manager 101-*b* may establish a first connection with a first node (e.g., a base station 105 operating as an IAB node, a UE 115) of the IAB network and a second connection with a second node of the IAB network. Communications manager 101-*b* may transmit a reconfiguration message to the first node on a first signaling path via the second node. The reconfiguration message may indicate to the first node a reconfiguration of the first node to use a second signaling path and to delay application of a portion of the reconfiguration message. Communications manager 101-*b* may receive an acknowledgement message (e.g., a reconfiguration complete message) from the first node on the first signaling path. In some cases, the communications manager 101-*b* may perform a security handshake procedure with the first node and the second node on the second signaling path after the delaying application of the portion of the reconfiguration message.

If a base station 105 is operating as an IAB node in the IAB network, communications manager 101-*a* and communications manager 101-*b* may perform similar functions. For example, a base station 105 and a UE 115 may operate as IAB nodes in the IAB network. Here, a communications manager 101 may operate as part of a first node of the IAB network and establish a connection with a first IAB donor node of the IAB network via a second node of the IAB network. After establishing the connection, communications manager 101 may receive a reconfiguration message from the second node and via a first signaling path between communications manager 101 and the first IAB donor node. The reconfiguration message may indicate to communications manager 101 a reconfiguration of the first node for a second signaling path between the first node and the first IAB donor node or between the first node and a second IAB donor node via a third node of the IAB network. When communications manager 101 receives the reconfiguration message, the second signaling path may be unavailable. Communications manager 101 may then delay application of a portion of the reconfiguration message based on the second signaling path being unavailable. Communications manager 101 may determine that the second path is available and apply the portion of the reconfiguration message after the delay. Communications manager 101 may then communicate via the second signaling path.

In some cases, a base station 105 and a UE 115 may operate as parent IAB nodes in the IAB network. Here a communications manager 101 may operate as part of a parent node of the IAB network and establish a connection between a child node and a first IAB donor node of the IAB network via the parent node. After establishing the connection, communications manager 101 may transmit a reconfiguration message to the child node on a first signaling path between the child node and the first IAB donor node that indicates a reconfiguration of the child node for a second signaling path. The child node may apply the reconfiguration and transmit a message (e.g., a reconfiguration complete message, a security handshake procedure) upstream to the parent node. Communications manager 101 may determine that the second signaling path is unavailable and delay application of a portion of the reconfiguration message. Communications manager may further refrain from forwarding the upstream message received from the child node until the second signaling path is available. Communications manager 101 may then determine that the second signaling path is available, apply the portion of the reconfiguration message based on the second signaling path being available, and forward the upstream message on the second signaling path.

Figure 2:
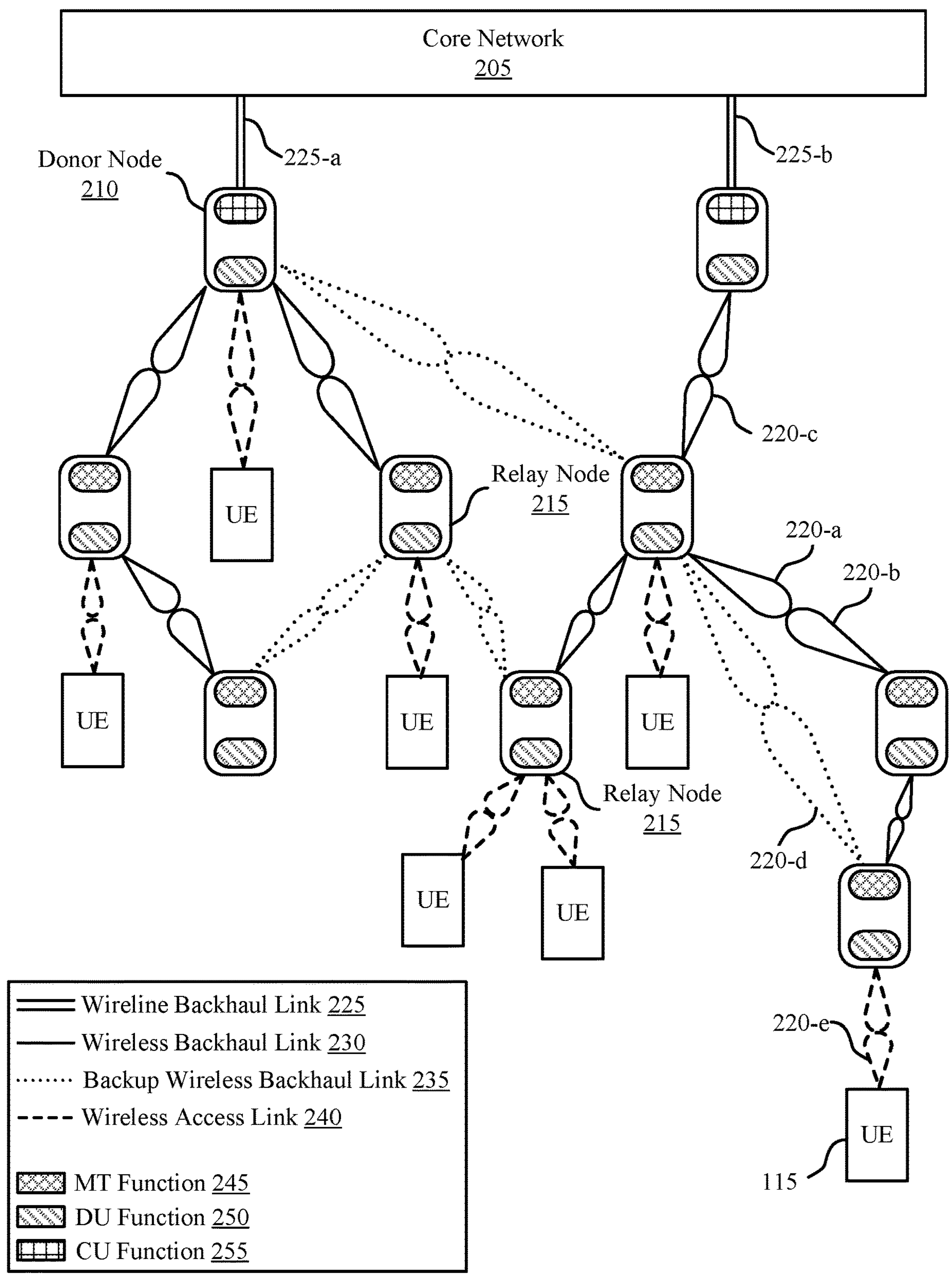
FIG. 2 illustrates an example of a wireless communications system that supports delayed reconfiguration in wireless systems in accordance with one or more aspects of the present disclosure.

FIG. 2 illustrates an example of a wireless communications system 200 that supports delayed reconfiguration in wireless systems in accordance with one or more aspects of the present disclosure. In some examples, wireless communications system 200 may implement aspects of wireless communications system 100.

Wireless communications system 200 (e.g., an NR system) may supplement wireline backhaul connections (e.g., wireline backhaul links 225) by sharing infrastructure and spectral resources for network access with wireless backhaul link capabilities, providing an IAB network architecture. Wireless communications system 200 may include a core network 205 and base stations 105 or supported devices split into one or more support entities (i.e., functions) for promoting wireless backhaul density in collaboration with communication access. Aspects of the supporting functionalities of the base stations 105 may be referred to as wireless IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 225 and one or more additional links (e.g., wireless backhaul links 230, backup wireless backhaul links 235, or wireless access links 240). As illustrated herein, the various wireless links in the wireless communications system 200 may also include one or more beams 220 (e.g., beam pairs including a reception beam and a transmission beam between the various wireless nodes). An IAB donor node 210 may be split into associated base station CU 255 and DU 250 entities, where one or more DUs 250 associated with an IAB donor node 210 may be partially controlled by an associated CU 255. CUs 255 of IAB donor nodes 210 may host layer 3 (L3) (e.g., RRC, service data adaption protocol (SDAP), or PDCP) functionality and signaling. Further CUs 255 of IAB donor nodes 210 may communicate with the core network 205 over a wireline backhaul link 225 (e.g., which may be referred to as an NG interface). DUs 250 may host lower layer operations, such as layer 1 (L1) or layer 2 (L2) (e.g., RLC, MAC, Physical layer) functionality and signaling. A DU 250 entity of an IAB donor node 210 may support a serving cell within the network coverage area according to connections associated with wireless backhaul links 230 and wireless access links 235 of the IAB network. DUs 250 of the IAB donor nodes 210 may control both access and backhaul links within the corresponding network coverage and may provide controlling and scheduling for descendant (i.e., child) IAB relay nodes 215 and or UEs 115. For example, a DU 250 may support an RLC channel connection with a UE 115 (e.g., via a wireless access link 240) or with an IAB relay node 215 (e.g., via a backhaul link, such as a primary wireless backhaul link 230 or a backup wireless backhaul link 235).

IAB relay nodes 215 may be split into associated MT 245 and base station DU 250 entities, where MT 245 functionality of the IAB relay nodes 215 may be controlled or scheduled by antecedent (i.e., parent) IAB nodes via wireless backhaul links. A parent node to an IAB relay node 215 (i.e., a child node) may be another (antecedent) IAB relay node 215 or an IAB donor node 210. The MT 245 function may be similar to functionality performed by UEs 115 in the system. An IAB relay node 215 may not be directly connected to a wireline backhaul 225. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT 245 functionality. In some cases, DUs 250 of the IAB relay nodes 215 may be partially controlled by signaling messages from CU 255 entities of an associated IAB donor node 210 (e.g., transmitted via an F1-application protocol (AP)). The DUs 250 of the IAB relay nodes 215 may support serving cells of the network coverage area. For example, a DU 250 of an IAB relay node 215 may perform the same or similar functions as a DU 250 of an IAB donor node 210, supporting one or more wireless access links 240 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU 255 (e.g., a network entity or network device) or the core network 205 either directly or via one or more IAB relay nodes 215. Each IAB relay node 215 may include a primary wireless backhaul link 230 for relaying data upstream or receiving information from a base station CU 255 or the core network 205. In some cases, an IAB relay node 215 may additionally include one or more backup wireless backhaul links 235 (e.g., for redundant connectivity or improved robustness). If the primary wireless backhaul link 230 fails (e.g., due to interference, malfunction at a connected IAB node, movement of IAB nodes, or maintenance at IAB nodes), an IAB relay node 215 may utilize a backup wireless backhaul link 235 for backhaul communication within the IAB network. The first (e.g., primary) wireless backhaul link 230 may be associated with a coverage area and MT 245 functionality may be controlled or scheduled by a first parent node. The one or more secondary backhaul links (e.g., backup wireless backhaul links 235) may be associated with a non-collocated coverage area and controlled or scheduled by one or more parent nodes. Each of the primary backhaul connections and the one or more secondary connections may support spectral capabilities to provide network communication over one or more random access technologies (RATs). The one or more IAB nodes may further support base station DU entities and may support multiple backhaul and wireless access links within the relay chain. The DU entities may control or schedule descendant IAB relay nodes 215 and UEs 115 within the IAB network (e.g., downstream in the IAB network) via the configured backhaul and wireless access links. That is, an IAB relay node 215 may act as a relay between an IAB donor node 210 and one or more descendant devices (e.g., other IAB relay nodes 215 or UEs 115) in both communication directions based on established backhaul and access connections.

The operations performed by the wireless devices in the wireless communications system 200 may be static or dynamic. For example, in a dynamic IAB system, a wireless device may function as an IAB donor node 210, an IAB relay node 215, a parent node, a child node, or any combination of these. In some cases, wireless devices may dynamically switch between the different roles in the IAB system (e.g., based on configurations, channel conditions, or neighboring devices). In other cases, wireless devices may function in multiple different roles at the same time (e.g., a single wireless device, such as a base station 105 or UE 115, may act as a parent node for one wireless device and a child node for another wireless device).

In some examples, there may be interference between one or more communications of the wireless communications system 200. As an illustrative example, a wireless node (e.g., an IAB relay node 215, an IAB donor node 210, or a UE 115) may receive or transmit communications using one or more beams 220 corresponding to a communications link (e.g., a wireless backhaul link 230, a backup wireless backhaul link 235, or a wireless access link 240). For instance, a wireless node may receive signals carried by a transmission beam 220-*a* using a reception beam 220-*b*. In such examples, the transmission beam 220-*a* may be referred to as a serving beam (e.g., carrying signals intended for the wireless node). However, the other communications in the wireless communications system 200 may interfere with the reception of the signals of the transmission beam 220-*a*. For example, transmission beams 220-*c*, 220-*d*, 220-*e*, or any combination thereof may be picked up by the reception beam 220-*b*, which may result in relatively inefficient communications.

As described herein, the devices of wireless communications system 200 (e.g., IAB relay nodes 215, IAB donor nodes 210, a CU 255, a DU 250, an MT 245 or a combination thereof) may use techniques for managing the delayed execution of reconfiguration messages. For example, a first IAB donor node 210 may establish a first connection with a first IAB relay node 215 and a second connection with a second IAB relay node 215. The first IAB donor node 210 may transmit a reconfiguration message (e.g., from a CU 255) to the first relay node on a first signaling path via the second IAB relay node 215. The reconfiguration message may indicate to the first IAB relay node 215 a reconfiguration of the first relay node to use a second signaling path and to delay application of a portion of the reconfiguration message. The first IAB donor node 210 may receive an acknowledgement message (e.g., a reconfiguration complete message) from the first relay node on the first signaling path. In some cases, the first IAB donor node may then perform a security handshake procedure with the first relay node and the second relay node on the second signaling path after the delaying application of the portion of the reconfiguration message.

In another example, a first IAB relay node 215 may establish a connection with a first IAB donor node 210 via a second IAB relay node 215. After establishing the connection, the first IAB relay node 215 may receive a reconfiguration message from the second IAB relay node 215 and via a first signaling path between the first IAB relay node 215 and the first IAB donor node 210. The reconfiguration message may indicate to first IAB relay node 215 a reconfiguration for a second signaling path between first IAB relay node 215 and the first IAB donor node 210 or between the first IAB relay node 215 and a second IAB donor node 210 via a third IAB relay node 215. At the time that the first IAB relay node 215 receives the reconfiguration message, the second signaling path may be unavailable. The first IAB relay node 215 may then delay application of a portion of the reconfiguration message based on the second signaling path being unavailable. The first IAB relay node 215 may determine that the second path is available and apply the portion of the reconfiguration message after the delay. The first IAB relay node 215 may then communicate via the second signaling path.

In some cases, a parent node (e.g., an IAB relay node 215) may establish a connection between a child node (e.g., an IAB relay node 215) and a first IAB donor node 210 via the parent node. After establishing the connection, the parent node may transmit a reconfiguration message to the child node on a first signaling path between the child node and the first IAB donor node 210 that indicates a reconfiguration of the child node for a second signaling path. The child node may apply the reconfiguration and transmit a message (e.g., a reconfiguration complete message, a security handshake procedure) upstream to the parent node. The parent node may determine that the second signaling path is unavailable and delay application of a portion of the reconfiguration message. The parent node may further refrain from forwarding the upstream message received from the child node until the second signaling path is available. The parent node may then determine that the second signaling path is available, apply the portion of the reconfiguration message based on the second signaling path being available, and forward the upstream message on the second signaling path.

Figure 3:
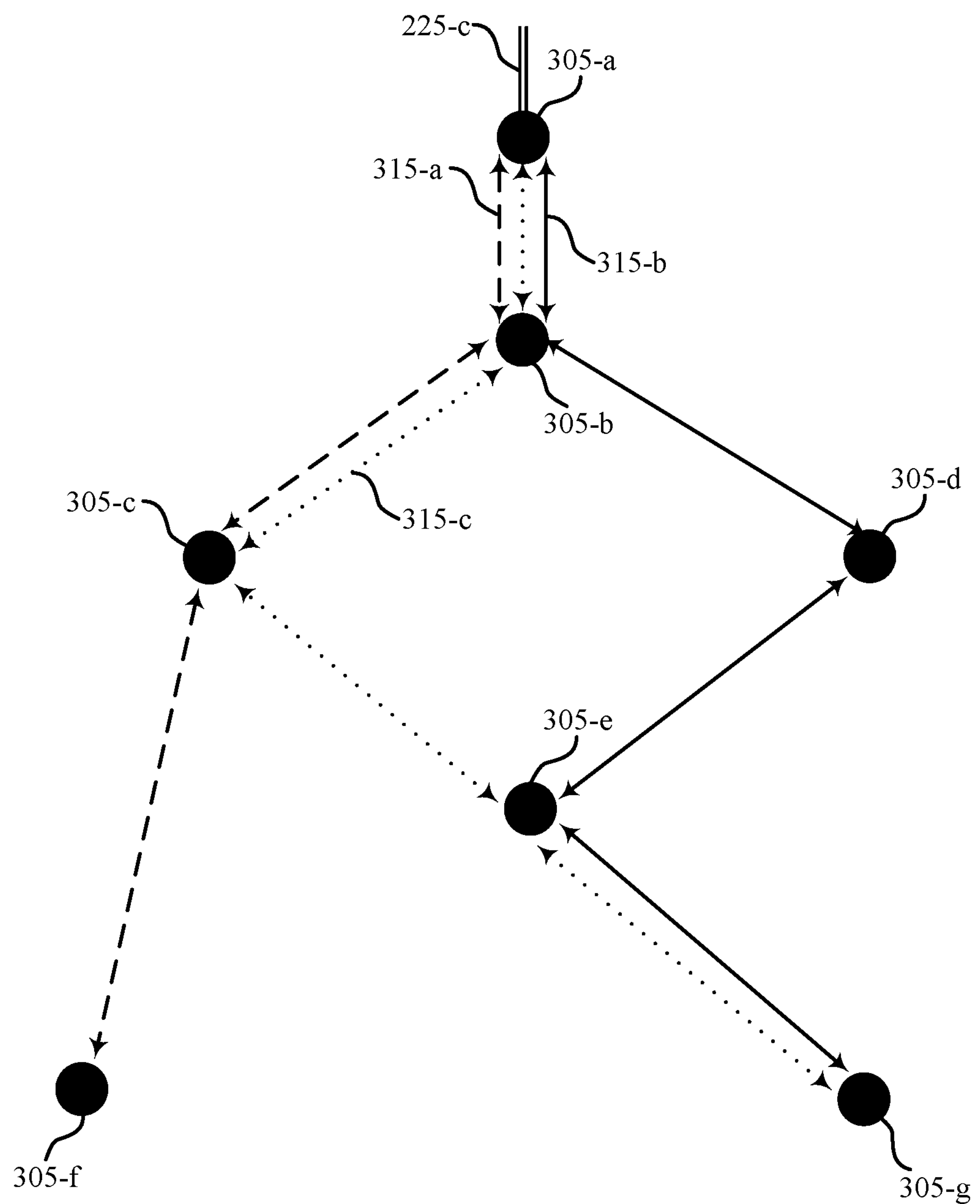
FIG. 3 illustrates an example of a network scheme that supports delayed reconfiguration in wireless systems in accordance with one or more aspects of the present disclosure.

FIG. 3 illustrates an example of a network scheme 300 that supports delayed reconfiguration in wireless systems in accordance with one or more aspects of the present disclosure. In some examples, network scheme 300 may implement aspects of wireless communications systems 100 or 200. Network scheme 300 may include multiple nodes 305 communicating with each other over a system of wireless links (e.g., backhaul or access links). Each node may include multiple CUs, DUs, MTs, or a combination thereof. Node 305-*a* may be coupled with wireline backhaul link 310-*a* to provide a wireline interface to a core network. Node 305-*a* may include a CU and one or more DUs (e.g., operate as an IAB donor node) and nodes 305-*b*, 305-*b*, 305-*b*, 305-*b*, 305-*b*, and 305-*g* may include one or more DUs and MTs (operate as an IAB node).

Network scheme 300 may include multiple signaling paths. For example, node 305-*a* may communicate with various nodes 305 of the network scheme via signaling paths 315. Node 305-*a* may route the traffic between nodes using a Backhaul Adaptation Protocol (BAP) layer. Each node 305 may be configured with a unique BAP address that is used to identify the node 305. In an example, node 305-*a* may transmit a BAP routing ID to node 305-*b* that indicates to route the BAP address of a destination node for scheduled traffic and a BAP path ID. The BAP path ID indicates to node 305-*b* the signaling path 315 along which the scheduled traffic should be transmitted. For example, traffic that is scheduled for node 305-*g* may be transmitted along signaling path 315-*b* or signaling path 315-*c*. The BAP path ID may indicate to node 305-*b* whether to transmit the scheduled traffic to node 305-*c* or to node 305-*d*. Each node 305 may be configured with a table that may allow a node 305 to route traffic between nodes based on the BAP address and the BAP path ID. In some examples, the traffic may be routed depending on the type of traffic. In some cases, the node 305-*a* may determine a signaling path 315 for scheduled traffic based on the traffic being F1-C traffic, F1-U traffic, or non F1-C traffic.

In some cases, node 305-*a* may establish a connection with node 305-*g* via signaling path 315-*b*. Node 305-*a* may determine to establish a connection with node 305-*g* via signaling path 315-*c*. Node 305-*a* may transmit a reconfiguration message to node 305-*g* via signaling path 315-*b*. The reconfiguration message may indicate to the node 305-*g* a reconfiguration of the node 305-*g* node to use a signaling path 315-*c* and to delay application of a portion of the reconfiguration message based on signaling path 315-*c* being unavailable. Node 305-*g* may then apply the portion of the reconfiguration message after determining that the signaling path 315-*c* is available and communicate with node 305-*a* via signaling path 315-*c*. In some examples, different signaling paths 315 may include one or more of the same nodes 305. For example, as shown in FIG. 3, the node 305-*e* may be a part of the signaling path 315-*c* and the signaling path 315-*b*. Alternatively, different signaling paths 315 may include different nodes 305. For example, as shown in FIG. 3, the node 305-*d* may be part of the signaling path 315-*b* and the node 305-*c* may be part of the signaling path 315-*c*.

Figure 4:
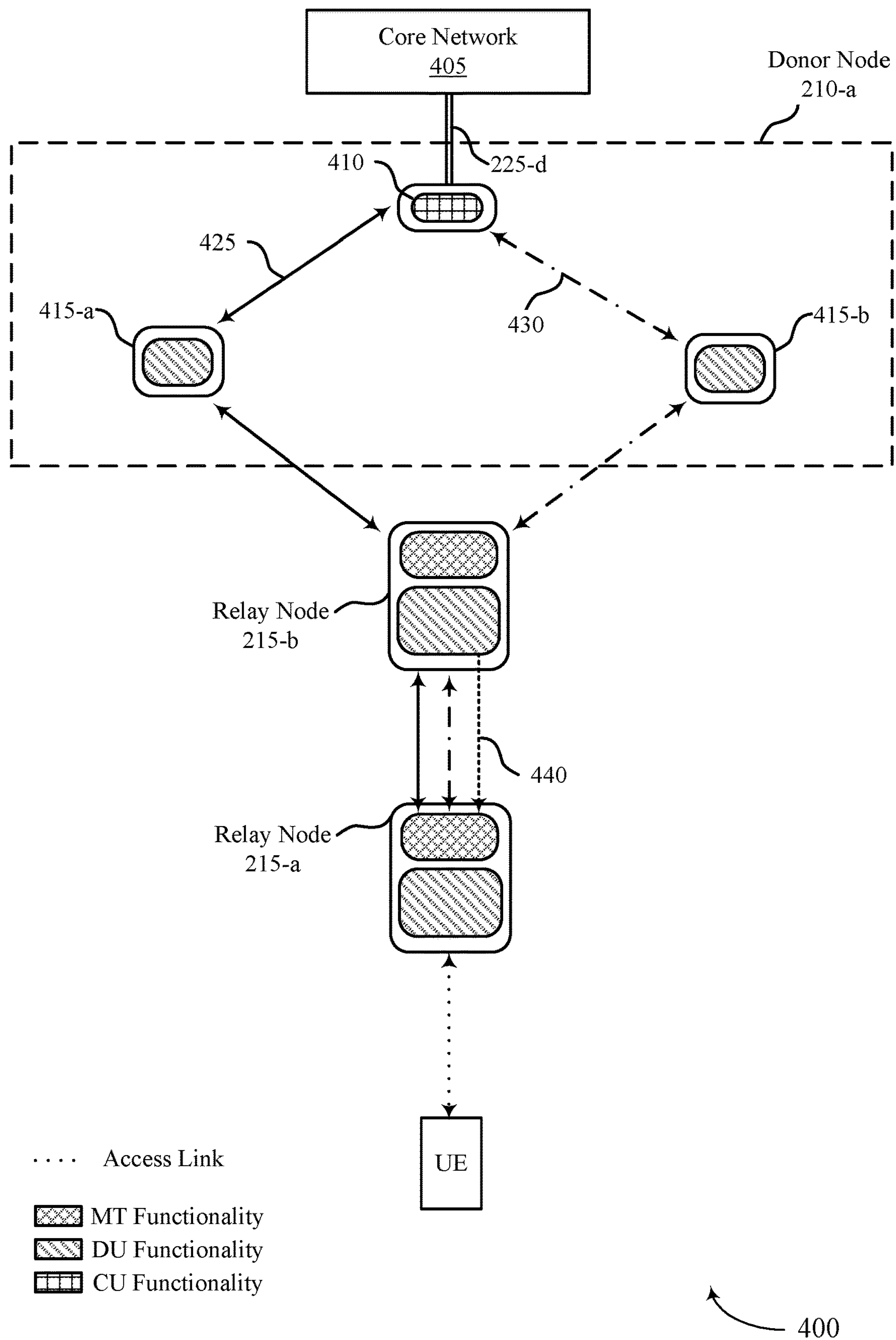
FIG. 4 illustrates an example of a wireless communications system that supports delayed reconfiguration in wireless systems in accordance with one or more aspects of the present disclosure.

FIG. 4 illustrates an example of a wireless communications system 400 that supports delayed reconfiguration in wireless systems in accordance with one or more aspects of the present disclosure. In some examples, wireless communications system 400 may implement aspects of wireless communications systems 100 or 200. For example, the wireless communications system 400 may include a number of devices (e.g., IAB nodes), such as a core network 405, IAB donor nodes 210, IAB relay nodes 215, a UE 115, among other examples of devices and aspects of the wireless communications systems 100 and 200.

An IAB donor node 210-*a* may include a CU 410, a first DU 415-*a*, and a second DU 415-*b*. The CU 410 may be coupled with a wireline backhaul link 225-*d* to provide a wireline interface to a core network. A first IAB relay node 215-*a* may include a DU 415-*c* and an MT 425-*a*. A second relay node may include a DU 415-*d* and an MT 425-*b*. The IAB donor node 210-*a* may establish a connection with the first IAB relay node 215-*a* on a first signaling path 425 via the second IAB relay node 215-*b*. The first signaling path 425 may connect the CU 410 to first IAB relay node 215-*a* via the first DU 415-*a* and second IAB relay node 215-*b*. In some cases, the connections with the first IAB relay node 215-*a* and the second IAB relay node 215-*b* are F1-C connections or RRC connections. In some cases, the first IAB relay node 215-*a* is a child node of the second IAB relay node 215-*b*. In other cases, the first IAB relay node 215-*a* is a descendant node along the first signaling path 425 with respect to the second IAB relay node 215-*b*.

In some cases, the IAB donor node 210-*a* may desire to communicate with the first IAB relay node 215-*a* via a second signaling path 430. The second signaling path 430 may connect the CU 410 to the first IAB relay node 215-*a* via the second DU 415-*b* and second IAB relay node 215-*b*. The IAB donor node 210-*a* may transmit a reconfiguration message to the first IAB relay node 215-*a* via the first signaling path 425 that indicates a reconfiguration of the first IAB relay node 215-*a* to use the second signaling path 430. The reconfiguration message may also indicate to the first IAB relay node 215-*a* to delay application of a portion of the reconfiguration message. In some cases, the reconfiguration message may indicate to the first IAB relay node 215-*a* to delay application of a portion of the reconfiguration message until a trigger (e.g., an absolute time (e.g., 1:00 PM), an expiration of a timer, receiving an indication from the IAB donor node 210-*a* or a parent node (e.g., second IAB relay node 215-*b*), or any combination thereof). In some cases, the reconfiguration message may include an RRC reconfiguration message with or without synchronization. In some examples, the reconfiguration message may carry IP connection information for the first IAB relay node 215-*a*, packet routing information for the first IAB relay node 215-*a*, BAP routing information, a channel ID (e.g., a backhaul radio link control channel ID, a logical channel ID), updated uplink mapping information, updated Internet Protocol (IP) address information (e.g., an IP address or an IP prefix), or any combination thereof. In some examples, an end destination of the reconfiguration message is a UE of the IAB network. In some examples, the first IAB donor node 210-*b* may transmit the indication to delay application of the portion of the reconfiguration message to the first IAB relay node 215-*a* in a message separate from the reconfiguration message.

In some instances, a reconfiguration message may trigger an IAB relay node 215 to perform one or more procedures. For example, the reconfiguration message may trigger the first IAB relay node 215-*a* or the second IAB relay node 215-*b* to perform a random access procedure, a security handshake procedure, or a handover procedure from the first signaling path 425 to the second signaling path 430 (e.g., a handover procedure from the first DU 415-*a* to the second DU 415-*b*). The reconfiguration message may also trigger an IAB relay node 215 to establish an SCTP connection or an F1-C connection for the IAB relay node 215 or establish an additional signaling path of an existing SCTP connection or one or more F1-U data tunnels for the IAB relay node 215.

The first IAB relay node 215-*a* may receive the reconfiguration message and delay application of a portion of the reconfiguration message based on the second signaling path 430 being unavailable. In some examples, the first IAB relay node 215-*a* may delay application of a portion of the reconfiguration message until an absolute time (e.g., 1:00 PM), an expiration of a timer, receiving a trigger from the IAB donor node 210-*a* or a parent node (second IAB relay node 215-*b*), or any combination thereof based on receiving the reconfiguration message. In some cases, delaying application of the portion of the reconfiguration message includes postponing one or more of the procedures triggered by the reconfiguration message. In some examples, the first IAB relay node 215-*a* may receive an indication from the IAB donor node 210-*a* or the second IAB relay node 215-*b* via the first signaling path 425 to delay application of the portion of the reconfiguration message and delay application based on receiving the indication. For example, the indication may indicate for the first IAB relay node 215-*a* to extend delaying application of the portion of the reconfiguration message until an absolute time, an expiration of a timer, receiving a trigger from the IAB donor node 210-*a* or a parent node (second IAB relay node 215-*b*), or any combination thereof. In some instances, after receiving the reconfiguration message, the first IAB relay node 215-*a* may transmit an acknowledgement of the reconfiguration message (e.g., a reconfiguration complete message) to the IAB donor node 210-*a* via the first signaling path 425 utilizing initial uplink information for communications via the first signaling path 425.

In some cases, the first IAB relay node 215-*a* is a parent node to one or more child nodes (not shown). Here, the IAB donor node 210-*a* may transmit the reconfiguration message to the one or more child nodes that indicates a reconfiguration of the one or more child nodes to use the second signaling path 430. Here, the first IAB relay node 215-*a* may receive an upstream message via the second signaling path 430 and postpone forwarding the upstream message (e.g., to second DU 415-*b* via second IAB relay node 215-*b*). In some cases, the first IAB relay node 215-*a* may receive an indication to postpone forwarding the upstream message and may postpone forwarding the upstream message based on indication. In some examples, the indication is associated with a BAP address, BAP routing ID, a channel ID (e.g., a backhaul radio link control channel ID, a logical channel ID), or any combination thereof. In some aspects, the indication is associated with one or more MTs of the child nodes (e.g., all child nodes of the first IAB relay node 215-*a*) or an MT of the first IAB relay node 215-*a*. In some instances, the indication is received via a MAC control element (MAC-CE) or via downlink control information (DCI). In some cases, the first IAB relay node 215-*a* may postpone forwarding the upstream message by refraining from scheduling uplink messages for one or more of the child nodes. In some examples, the first IAB relay node 215-*a* may discard the upstream message based on receiving an indication from the IAB donor node 210-*a* or a parent node (e.g., the second IAB relay node 215-*b*), a handover failure, or a lack of receipt of a configuration message from the parent node prior to the expiration of a timer.

The first IAB relay node 215-*a* may determine that the second signaling path 430 is available and apply the portion of the reconfiguration message after the delay. In some instances, the first IAB relay node 215-*a* may receive a switch indication 440 to apply the portion of the reconfiguration message. The switch indication 440 may indicate to the first IAB relay node 215-*a* to perform a random access procedure, a security handshake, or a handover procedure from the first signaling path 425 to the second signaling path 430. The first IAB relay node 215-*a* may communicate the security handshake procedure along the second signaling path 430 from a DU of the first IAB relay node 215-*a* to CU 410 by a DU of the second IAB relay node 215-*b* and the second DU 415-*b*. In some cases, the switch indication 440 may indicate to the first IAB relay node 215-*a* to perform the one or more procedures triggered by the reconfiguration message. In some examples, the reconfiguration message may indicate updated uplink mapping information or IP address information for the first IAB relay node 215-*a* for communications via the second signaling path 430. After establishing the connection via the second signaling path 430, the first IAB relay node 215-*a* may transmit an acknowledgement of the reconfiguration message via the second signaling path 430 utilizing the updated uplink mapping information or IP address information. In some cases, the first IAB relay node 215-*a* may initiate the security handshake procedure via the second signaling path 430 utilizing the updated uplink mapping information or IP address information. In some examples, the purpose of the security handshake procedure may be to establish (manage or redirect) the transport network layer (TNL) or IP Security (IPSec) to the second signaling path 430. After applying the portion of the reconfiguration message, the first relay node may communicate via the second signaling path 430 according to the reconfiguration message.

The second IAB relay node 215-*b* may be a parent node to the first IAB relay node 215-*a*. In some cases, the second relay node may establish a connection between the IAB donor node 210-*a* and the first IAB relay node 215-*a* via first signaling path 425. In some examples, the second IAB relay node 215-*b* may transmit the reconfiguration message from the IAB donor node 210-*a* to the first IAB relay node 215-*a* indicating the reconfiguration of the first IAB relay node 215-*a* for the second signaling path 430. In some examples, the first IAB relay node 215-*a* may apply the entire reconfiguration message and transmit an upstream message to the second IAB relay node 215-*b* indicating that the reconfiguration message was applied. The second IAB relay node 215-*b* may receive the upstream message from first IAB relay node 215-*a* and determine that the second signaling path 430 is not available. In some cases, the second IAB relay node 215-*b* may refrain from forwarding the message to the IAB donor node 210-*a* via the second signaling path 430 based on the second signaling path 430 being unavailable. In some cases, the second IAB relay node 215-*b* may receive an indication from the IAB donor node 210-*a* to delay forwarding the upstream message. In some examples, the second IAB relay node 215-*b* may forward the upstream message to the IAB donor node 210-*a* via the second signaling path 430 when the second signaling path 430 becomes available.

The second IAB relay node 215-*b* may receive a reconfiguration message from the IAB donor node 210-*a* via first signaling path 425 that indicates a reconfiguration of the second IAB relay node 215-*b* for the second signaling path 430. The second IAB relay node 215-*b* may delay application of a portion of the reconfiguration based on the second signaling path 430 being unavailable. The second IAB relay node 215-*b* may then determine that the second signaling path 430 is available and apply the portion of the reconfiguration message. In some cases, the second IAB relay node 215-*b* may detect a random access configuration, or completion of a handover procedure from the first DU 415-*a* to the second DU 415-*b* and forward the upstream message. After the second IAB relay node 215-*b* applies the portion of the reconfiguration message, the first IAB relay node 215-*a* and the second IAB relay node 215-*b* may perform a security handshake procedure with the IAB donor node 210-*a* in parallel along the second signaling path 430.

In some aspects, the first IAB relay node 215-*a* may fail to establish the second signaling path 430 and discard one or more portions of the reconfiguration message. The first IAB relay node 215-*a* may determine a failure to establish the second signaling path 430 by an indication from the IAB donor node 210-*a* or a parent node (e.g., the second IAB relay node 215-*b*), or a lack of receipt of a configuration message from the parent node prior to the expiration of a timer. In some examples, the second IAB relay node 215-*b* may fail to establish the second signaling path 430 and discard one or more portions of the reconfiguration message. The second IAB relay node 215-*b* may determine a failure to establish the second signaling path 430 by an indication from the IAB donor node 210-*a*, or a lack of receipt of a configuration message from the IAB donor node 210-*a* prior to the expiration of a timer.

Figure 5:
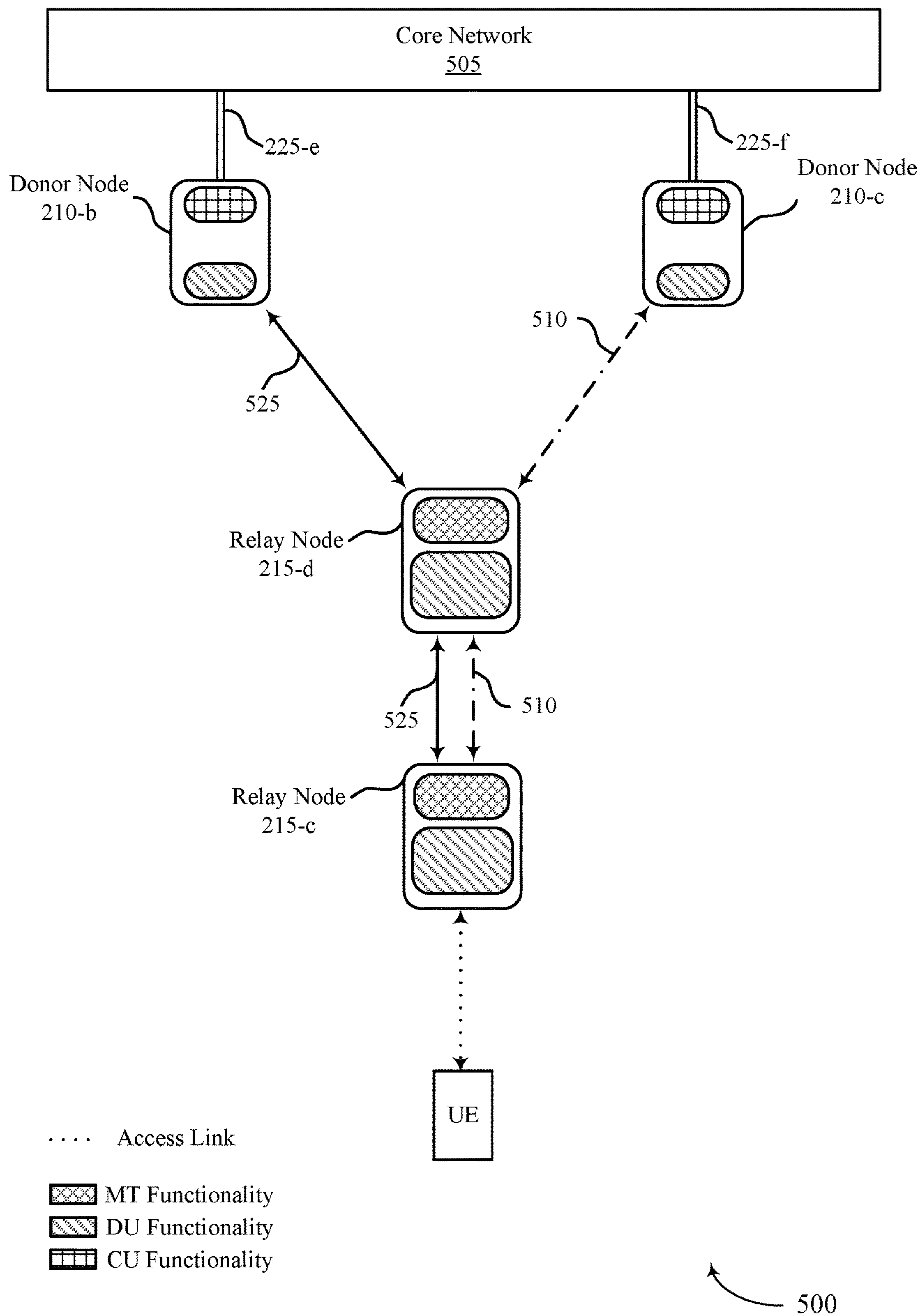
FIG. 5 illustrates an example of a wireless communications system that supports delayed reconfiguration in wireless systems in accordance with one or more aspects of the present disclosure.

FIG. 5 illustrates an example of a wireless communications system 500 that supports delayed reconfiguration in wireless systems in accordance with one or more aspects of the present disclosure. In some examples, wireless communications system 500 may implement aspects of wireless communications systems 100, 200, or 400. For example, the wireless communications system 500 may include a number of devices (e.g., IAB nodes), such as a core network 505, IAB donor nodes 210, IAB relay nodes 215, a UE 115, among other examples of devices and aspects of the wireless communications systems 100, 200, and 400.

A first IAB donor node 210-*b* and a second IAB donor node 210-*c* may be coupled with wireline backhaul link 225-*e* and wireline back link 225-*f*, respectively, to provide a wireline interface to a core network. The IAB donor nodes 210 may each include a CU and one or more DUs. In some cases, the first IAB donor node 210-*b* may establish a connection with a first IAB relay node 215-*c* and second IAB relay node 215-*d* via a first signaling path 525. The first signaling path 525 may be a signaling path from the first IAB donor node 210-*b* to the first IAB relay node 215-*c* via the second IAB relay node 215-*d*. In some cases, the connections with the first IAB relay node 215-*c* and the second IAB relay node 215-*d* are F1-C connections or RRC connections. In some cases, the first IAB relay node 215-*c* is a child node of the second IAB relay node 215-*d* (e.g., the second IAB relay node 215-*d* is a parent node of the first IAB relay node 215-*c*). In other cases, the first IAB relay node 215-*c* is a descendant node along the first signaling path 525 with respect to the second IAB relay node 215-*d*.

The first IAB donor node 210-*b* may determine to perform a handover procedure to the second IAB donor node 210-*c*. The first IAB donor node 210-*b* may transmit a reconfiguration message to the first IAB relay node 215-*c* via the first signaling path 525 that indicates a reconfiguration of the first IAB relay node 215-*c* to use a second signaling path 510. The second signaling path 510 may be a signaling path from the second IAB donor node 210-*c* to the first IAB relay node 215-*c* via the second IAB relay node 215-*d*.

The second IAB relay node 215-*d* may transmit the reconfiguration message from the first IAB donor node 210-*b* to the first IAB relay node 215-*c*. The first IAB relay node 215-*c* may apply the reconfiguration message and transmit a reconfiguration complete message to the second IAB relay node 215-*d* via the second signaling path 510. The second IAB relay node 215-*d* may delay applying a portion of the reconfiguration message based on the second signaling path 510 being unavailable and refrain from forwarding the reconfiguration complete message to the second IAB donor node 210-*c*. In some examples, the second IAB relay node 215-*d* may delay application of a portion of the reconfiguration message until an absolute time, an expiration of a timer, receiving a trigger from the second IAB donor node 210-*c*, or any combination thereof. In some examples, the first IAB donor node 210-*b* may transmit an indication to the second IAB relay node 215-*d* to extend delaying application of the reconfiguration message.

The second IAB relay node 215-*d* may determine that the second signaling path 510 is available and apply the portion of the reconfiguration message. Here, the second IAB relay node 215-*d* may forward the reconfiguration complete message to the second IAB donor node 210-*c* via the second signaling path 510. In some cases, the second IAB relay node 215-*d* may determine that the second signaling path 510 is available by detecting a random access configuration, or a completion of a handover procedure from the first IAB donor node 210-*b* to the second IAB donor node 210-*c*. In some examples, the second IAB relay node 215-*d* may detect a security handshake procedure between the second IAB donor node 210-*c* and the first IAB relay node 215-*c* and forward the reconfiguration complete message based on detecting the security handshake procedure. In other cases, the second IAB relay node 215-*d* may detect the establishment of an SCTP connection, modification of an existing SCTP connection, establishment of an F1-C connection, migration of an F1-C connection, setup of one or more F1-U connections, or migration of one or more F1-U connections, and forward the reconfiguration complete message based on detecting the connections. In some examples, the second IAB relay node 215-*d* may forward the reconfiguration complete message upon executing a security handshake with second IAB donor node 210-*c*, establishment of an SCTP connection, modification of an existing SCTP connection, establishment of an F1-C connection, migration of an F1-C connection, setup of one or more F1-U tunnels, or migration of one or more F1-U tunnels After the second IAB relay node 215-*d* forwards the reconfiguration complete message and applies the portion of the reconfiguration message, both the first IAB relay node 215-*c* and the second IAB relay node 215-*d* may perform a security handshake procedure with the second IAB donor node 210-*c*. For instance, both the first IAB relay node 215-*c* and the second IAB relay node 215-*d* may perform a security handshake procedure with the second IAB donor node 210-*c* in parallel.

Figure 6:
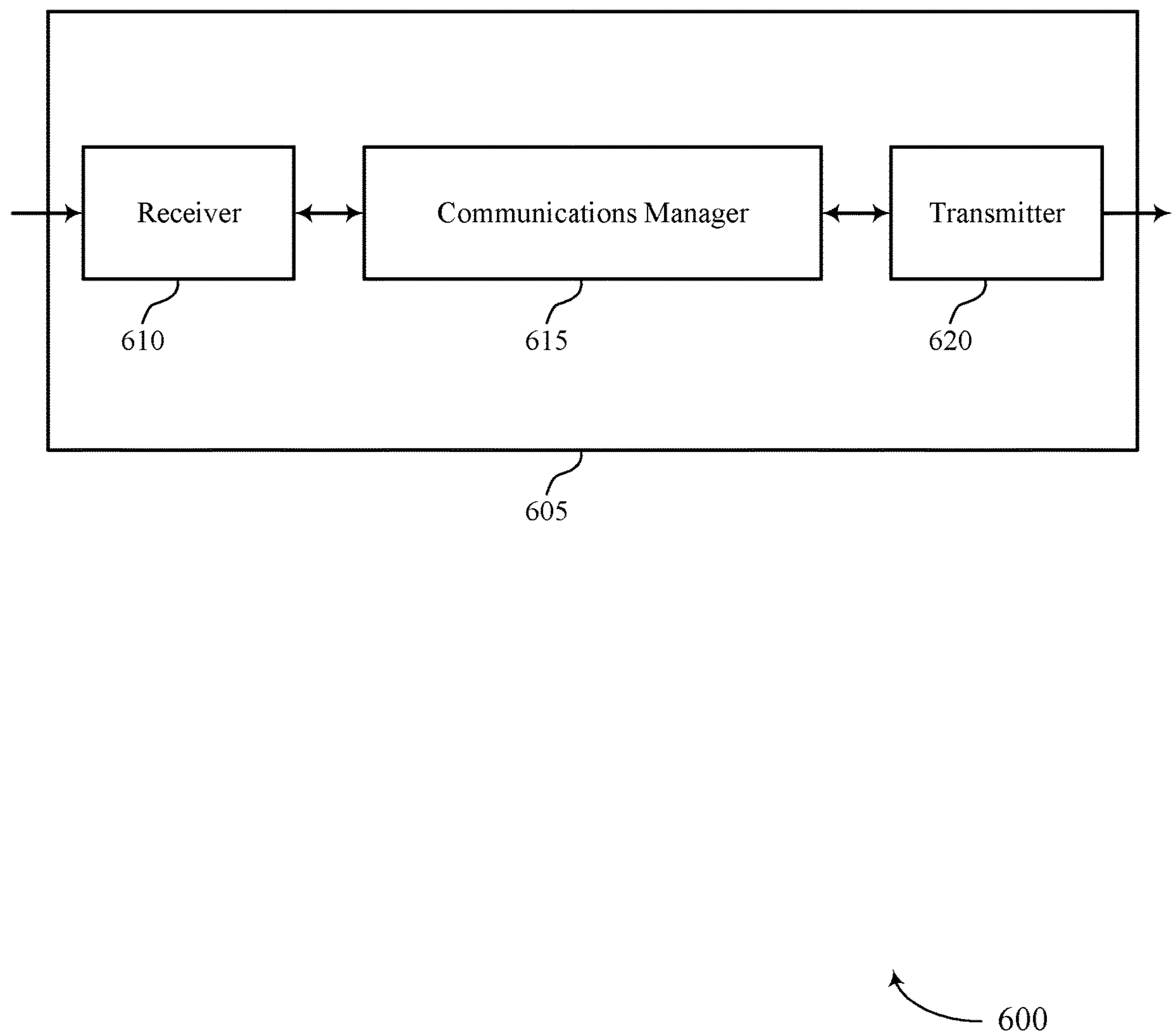
FIGS. 6 and 7 show block diagrams of devices that support delayed reconfiguration in wireless systems in accordance with one or more aspects of the present disclosure.

FIG. 6 shows a block diagram 600 of a device 605 that supports delayed reconfiguration in wireless systems in accordance with one or more aspects of the present disclosure. The device 605 may be an example of aspects of an IAB node as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to delayed reconfiguration in wireless systems). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may receive, from the second node and via a first signaling path between the first node and the first donor node, a reconfiguration message that indicates a reconfiguration of the first node for a second signaling path via a third node and an indication to delay application of a portion of the reconfiguration message and communicate via the second signaling path in accordance with the reconfiguration message based on a trigger for reconfiguration of the first node for the second signaling path via the third node.

The communications manager 615 may transmit, to the child node and via a first signaling path between the child node and the first donor node, a reconfiguration message that indicates a reconfiguration of the child node for a second signaling path based on a trigger for reconfiguration of the child node for the second signaling path and apply a portion of the reconfiguration message based on determining that the trigger for reconfiguration of the child node for the second signaling path is satisfied.

The communications manager 615 may also establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message. The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 may be an example of means for performing various aspects of delayed reconfiguration in wireless systems as described herein. The communications manager 615, or its sub-components, may be implemented in hardware (e.g., in communications management circuitry). The circuitry may include a processor, a DSP, an ASIC, an FPGA or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device.

In some examples, the communications manager 615 may be configured to perform various operations (e.g., receiving, determining, transmitting) using or otherwise in cooperation with the receiver 610, the transmitter 620, or both.

The communications manager 615 as described herein may be implemented to realize one or more potential advantages. One implementation may enable the device 605 to delay execution of one or more procedures triggered by a reconfiguration message. Some implementations may enable the device 605 to delay application of at least a portion of a reconfiguration message until a different signaling path is available. Based on the techniques for managing the reconfiguration between the device 605, a child node, a parent node, a donor node, or any combination therefore, the device 605 may support more efficient reconfiguration procedures such as those that may be run in parallel after delaying reconfiguration.

Figure 7:
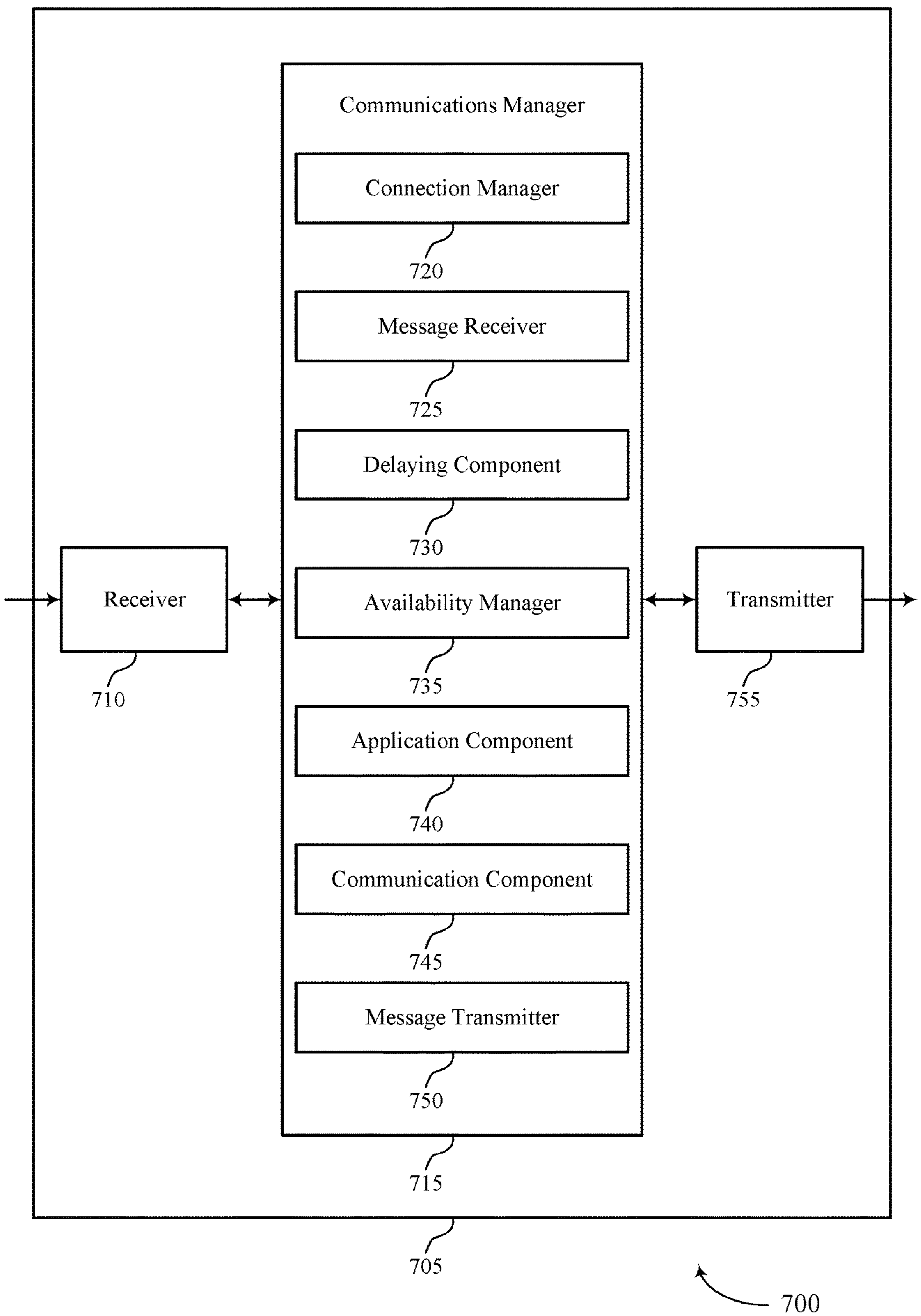

FIG. 7 shows a block diagram 700 of a device 705 that supports delayed reconfiguration in wireless systems in accordance with one or more aspects of the present disclosure. The device 705 may be an example of aspects of a device 605 or an IAB node as described herein. The device 705 may include a receiver 710, a communications manager 715, and a transmitter 755. The device 705 may also include a processor. Each of these components may be in communication with one another (e.g., via one or more buses).

Receiver 710 may receive information such as packets, user data, or control information associated with various information channels (e.g., control channels, data channels, and information related to delayed reconfiguration in wireless systems). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a connection manager 720, a message receiver 725, a delaying component 730, an availability manager 735, an application component 740, a communication component 745, and a message transmitter 750. The communications manager 715 may be an example of aspects of the communications manager 910 or 1010 as described herein.

The connection manager 720 may establish a connection with a first donor node of the wireless communications system via a second node of the wireless communications system.

The message receiver 725 may receive, from the second node and via a first signaling path between the first node and the first donor node, a reconfiguration message that indicates a reconfiguration of the first node for a second signaling path via a third node and an indication to delay application of a portion of the reconfiguration message.

The delaying component 730 may delay application of a portion of the reconfiguration message based on the second signaling path being unavailable.

The availability manager 735 may determine that the second signaling path is available.

The application component 740 may apply the portion of the reconfiguration message based on the determining.

The communication component 745 may communicate via the second signaling path in accordance with the reconfiguration message based on a trigger for reconfiguration of the first node for the second signaling path via the third node.

The connection manager 720 may establish a connection between a child node and a first donor node of the wireless communications system via the parent node.

The message transmitter 750 may transmit, to the child node and via a first signaling path between the child node and the first donor node, a reconfiguration message that indicates a reconfiguration of the child node for a second signaling path based on a trigger for reconfiguration of the child node for the second signaling path. The message transmitter 750 may transmit, to the child node, an indication to apply the portion of the reconfiguration message, where the trigger includes the indication.

The delaying component 730 may delay application of a portion of the reconfiguration message based on the second signaling path being unavailable.

The availability manager 735 may determine that the second signaling path is available.

The application component 740 may apply a portion of the reconfiguration message based on determining that the trigger for reconfiguration of the child node for the second signaling path is satisfied.

The connection manager 720 may establish a first connection with a first node of the wireless communications system and establish a second connection with a second node of the wireless communications system.

The message transmitter 750 may transmit, to the first node and via a first signaling path between the first node and the donor node via the second node, a reconfiguration message that indicates a reconfiguration of the first node to use a second signaling path and an indication to delay application of a portion of the reconfiguration message.

Transmitter 755 may transmit signals generated by other components of the device 705. In some examples, the transmitter 755 may be collocated with a receiver 710 in a transceiver module. For example, the transmitter 755 may be an example of aspects of the transceiver 920 or 1020 as described with reference to FIGS. 9 and 10. The transmitter 755 may utilize a single antenna or a set of antennas.

Figure 8:
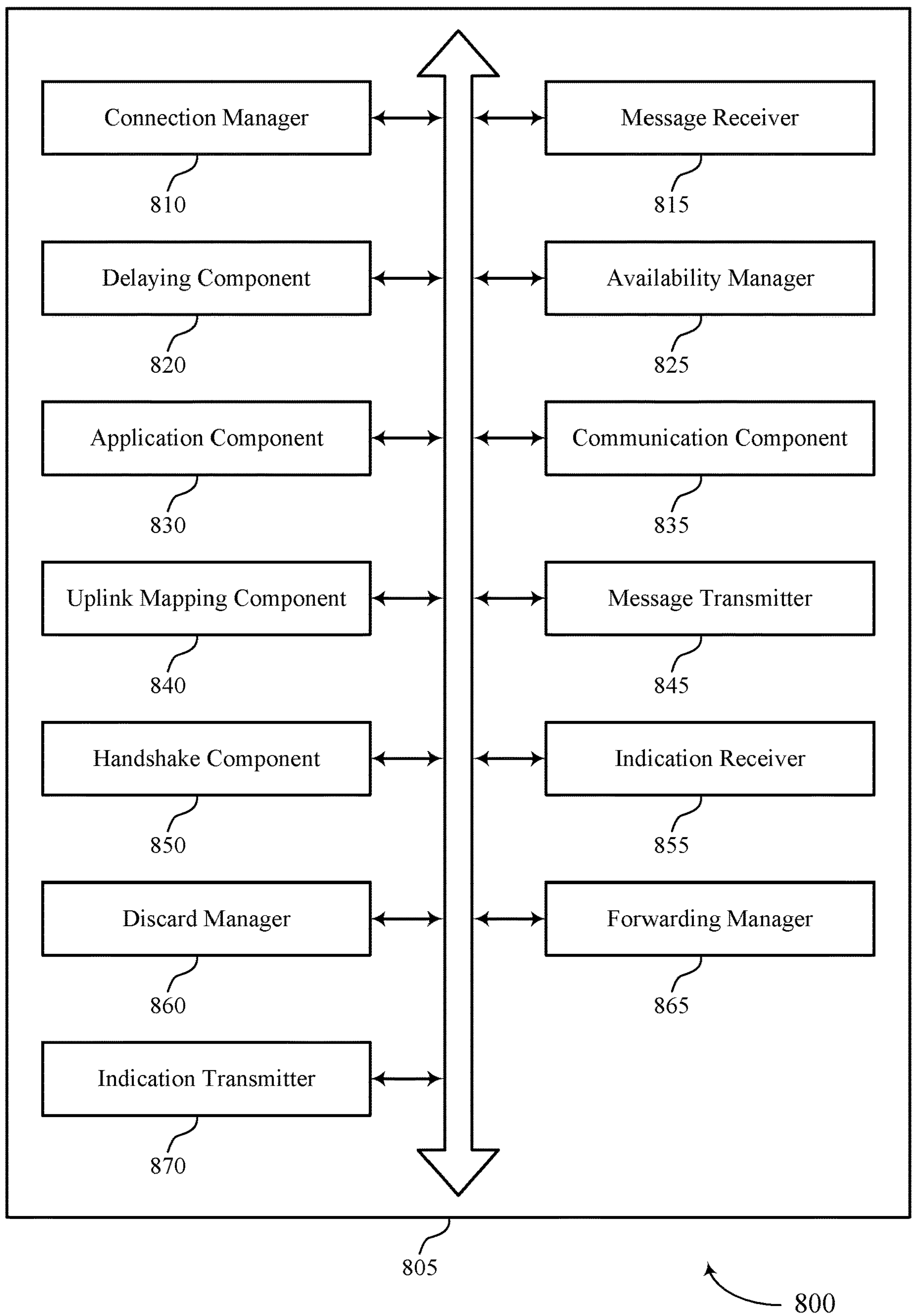
FIG. 8 shows a block diagram of a communications manager that supports delayed reconfiguration in wireless systems in accordance with one or more aspects of the present disclosure.

FIG. 8 shows a block diagram 800 of a communications manager 805 that supports delayed reconfiguration in wireless systems in accordance with one or more aspects of the present disclosure. The communications manager 805 may be an example of aspects of a communications manager 615, a communications manager 715, or a communications manager 910 described herein. The communications manager 805 may include a connection manager 810, a message receiver 815, a delaying component 820, an availability manager 825, an application component 830, a communication component 835, an uplink mapping component 840, a message transmitter 845, a handshake component 850, an indication receiver 855, a discard manager 860, a forwarding manager 865, and an indication transmitter 870. Each of these modules may communicate, directly or indirectly, with one another (e.g., via one or more buses).

The connection manager 810 may establish a connection with a first donor node of the wireless communications system via a second node of the wireless communications system. In some examples, the connection manager 810 may establish a connection between a child node and a first donor node of the wireless communications system via the parent node. In some examples, the connection manager 810 may establish a first connection with a first node of the wireless communications system. In some examples, the connection manager 810 may establish a second connection with a second node of the wireless communications system. In some examples, the connection manager 810 may establish a second connection with one of the first donor node or the second donor node as part of the reconfiguration of the first node. In some examples, the connection manager 810 may determine the failure of establishment of the second signaling path based on an indication from the first donor node, a parent node of the first node, or a lack of receipt of a configuration message from the parent node prior to expiration of a timer.

The message receiver 815 may receive, from the second node and via a first signaling path between the first node and the first donor node, a reconfiguration message that indicates a reconfiguration of the first node for a second signaling path via a third node and an indication to delay application of a portion of the reconfiguration message. In some examples, the reconfiguration message includes the indication to delay application of the portion of the reconfiguration message. In some examples, the indication to delay application of the portion of the reconfiguration message includes an indication to postpone one or more procedures triggered by the reconfiguration message. In some examples, the indication to delay application of the portion of the reconfiguration message includes an indication to postpone forwarding of an upstream message to the third node, where the upstream message is from a child node of the first node. In some cases, the indication to postpone forwarding is associated with a BAP address, a BAP routing ID, a channel ID, or any combination thereof. In some cases, the indication to postpone forwarding is associated with a given MT function of the wireless communications system or a set of MT functions of the wireless communications system. In some examples, the message receiver 815 may receive an upstream message from the child node. In some examples, the message receiver 815 may receive, from the first node via the first signaling path, acknowledgement of the reconfiguration message and receive, from the first node via the second signaling path, a second acknowledgement of the reconfiguration message. In some cases, the second signaling path is between the first node and the first donor node or between the first node and a second donor node.

The delaying component 820 may delay application of a portion of the reconfiguration message based on the second signaling path being unavailable and the indication to delay application of the portion of the reconfiguration message. In some examples, the delaying component 820 may delay application of a portion of the reconfiguration message based on the second signaling path being unavailable and the indication to delay application of the portion of the reconfiguration message. In some examples, the delaying component 820 may extend delaying application of the portion of the reconfiguration message based on the indication. In some examples, the delaying component 820 may refrain from scheduling uplink messages for the child node of the first node. In some examples, the delaying component 820 may refrain from scheduling uplink messages for the child node for a portion of time based on the trigger not being satisfied.

The availability manager 825 may determine that the second signaling path is available. In some examples, the availability manager 825 may determine that the second signaling path is available. In some examples, the availability manager 825 may determine that the second signaling path is available based on establishing the second connection.

The application component 830 may apply the portion of the reconfiguration message based on the determining. In some examples, the application component 830 may apply a portion of the reconfiguration message based on determining that the trigger for reconfiguration of the child node for the second signaling path is satisfied. In some examples, the application component 830 may perform a random access procedure, a security handshake, or a handover procedure from the second node to the third node. In some examples, the application component 830 may configure a new or existing SCTP connection, a new or existing F1-C connection for the first node, an additional signaling path of an existing SCTP connection, or one or more new or existing F1-U data tunnels for the first node based on the reconfiguration message.

The communication component 835 may communicate via the second signaling path in accordance with the reconfiguration message based on a trigger for reconfiguration of the first node for the second signaling path via the third node. In some examples, the trigger for reconfiguration of the first node for the second signaling path via the third node includes an expiration of a timer, an absolute time, reception of a first indication from the first donor node, reception of a second indication from a parent node of the first node, or any combination thereof.

The message transmitter 845 may transmit, to the child node and via a first signaling path between the child node and the first donor node, a reconfiguration message that indicates a reconfiguration of the child node for a second signaling path based on a trigger for reconfiguration of the child node for the second signaling path. In some examples, the message transmitter 845 may transmit, to the first node and via a first signaling path between the first node and the donor node via the second node, a reconfiguration message that indicates a reconfiguration of the first node to use a second signaling path and an indication to delay application of a portion of the reconfiguration message. In some examples, the message transmitter 845 may transmit a reconfiguration complete message to the first donor node via the first signaling path in accordance with the initial uplink mapping information. In some examples, the message transmitter 845 may transmit an acknowledgement of the reconfiguration message via the second signaling path in accordance with the updated uplink mapping information or IP address information as part of communicating via the second signaling path. In some examples, the message transmitter 845 may transmit a configuration message to the child node configuring the child node with a reconnection timer based on delaying application of the portion of the reconfiguration message. In some examples, the message transmitter 845 may transmit, to the child node, a message indicating a failure of establishment of the second signaling path.

In some examples, the message transmitter 845 may transmit the reconfiguration message for a second donor node of the wireless communications system, where the second signaling path is between the first node and the second donor node. In some cases, the second signaling path is between the child node and the first donor node or between the child node and a second donor node. In some cases, the indication to delay application of the portion of the reconfiguration message instructs one of the first node or the second node to postpone one or more procedures triggered by the reconfiguration message. In some cases, the indication to delay application of the portion of the reconfiguration message instructs one of the first node or the second node to delay application of the portion of the reconfiguration message until expiration of a timer, a trigger from the donor node or parent node, an absolute time, or any combination thereof.

The uplink mapping component 840 may utilize, before communicating via the second signaling path, initial uplink mapping information or IP address information different from the updated uplink mapping information or IP address information for the first node for communications via the first signaling path.

The handshake component 850 may initiate a security handshake via the second signaling path in accordance with the updated uplink mapping information or IP address information as a part pf communicating via the second signaling path.

In some examples, the indication receiver 855 may receive an indication to extend delaying application of the portion of the reconfiguration message from the first donor node or the second node. In some examples, the indication receiver 855 may receive an indication from the first donor node instructing the parent node to delay application of the portion of the reconfiguration message.

The discard manager 860 may discard the upstream message based on an indication from the first donor node, an indication from a parent node of the first node, a handover failure, or a lack of receipt of a configuration message from the parent node prior to expiration of a timer. In some examples, the discard manager 860 may discard one or more portions of the reconfiguration message based at least in part on a failure of establishment of the second signaling path.

The forwarding manager 865 may refrain from forwarding the upstream message to the first donor node based on the trigger not being satisfied. In some examples, the forwarding manager 865 may forward the upstream message to the first donor node based on the trigger being satisfied. In some examples, the forwarding manager 865 may detect a random access configuration, completion of a handover procedure, or a DU function change at the parent node. In some examples, the forwarding manager 865 may forward the upstream message to the first donor node based on the detecting. In some examples, the forwarding manager 865 may detect a security handshake, establishment of an SCTP connection, or modification of an existing SCTP connection. In some examples, the forwarding manager 865 may detect establishment or migration of an F1-C connection, or setup or migration of one or more F1-U connection.

In some cases, the indication instructs the child node to delay application of the reconfiguration message until the trigger, the trigger including an expiration of a timer, a first indication from the first donor node, a second indication from the parent node, an absolute time, or any combination thereof. In some cases, the indication instructs the child node to extend delaying application of the reconfiguration message.

Figure 9:
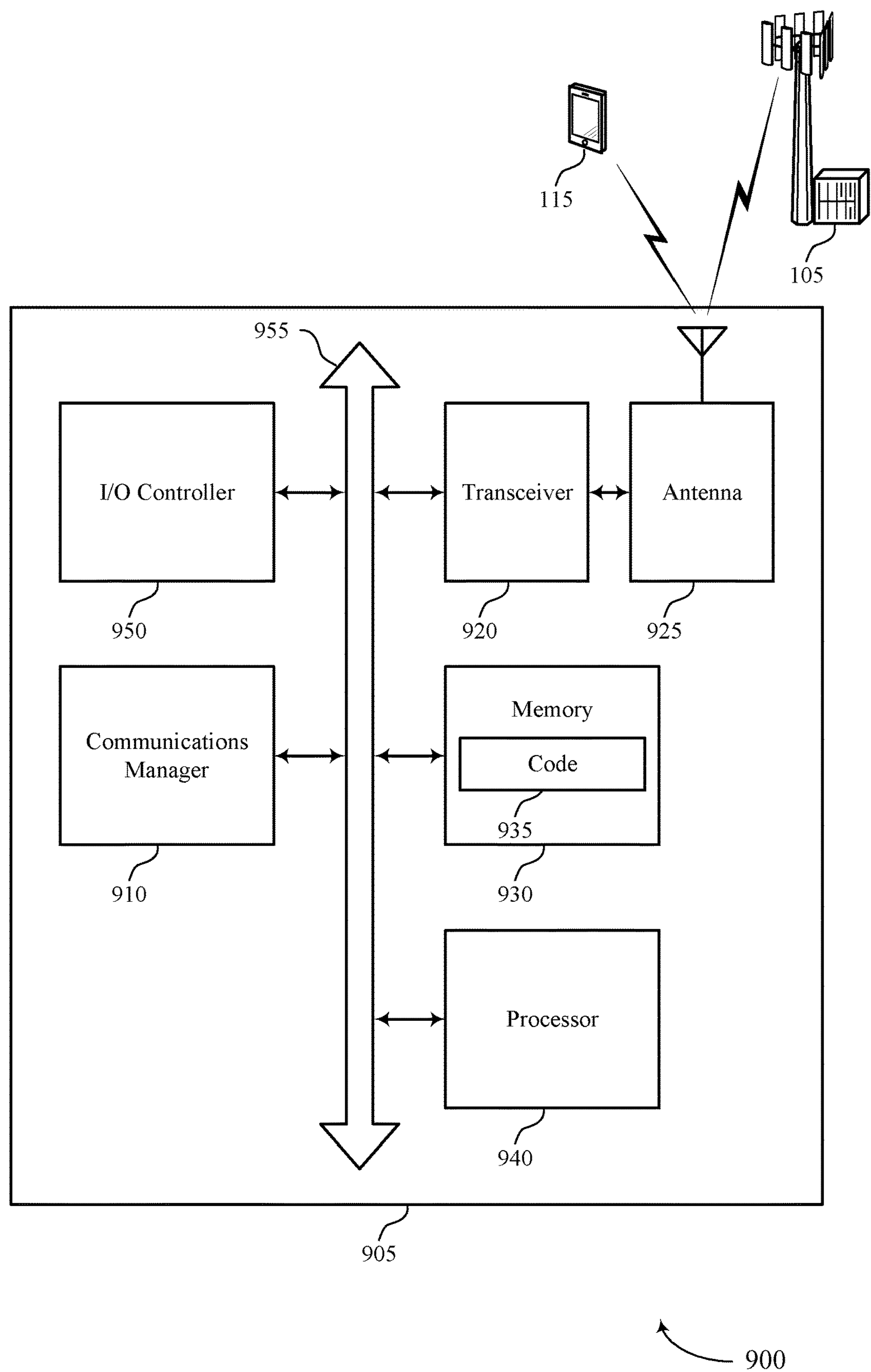
FIG. 9 shows a diagram of a system including a UE that supports delayed reconfiguration in wireless systems in accordance with one or more aspects of the present disclosure.

FIG. 9 shows a diagram of a system 900 including a device 905 that supports delayed reconfiguration in wireless systems in accordance with one or more aspects of the present disclosure. The device 905 may be an example of or include the components of device 605, device 705, or an IAB node as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may receive, from the second node and via a first signaling path between the first node and the first donor node, a reconfiguration message that indicates a reconfiguration of the first node for a second signaling path via a third node and an indication to delay application of a portion of the reconfiguration message and communicate via the second signaling path in accordance with the reconfiguration message based on a trigger for reconfiguration of the first node for the second signaling path via the third node.

The communications manager 910 may also transmit, to the child node and via a first signaling path between the child node and the first donor node, a reconfiguration message that indicates a reconfiguration of the child node for a second signaling path based on a trigger for reconfiguration of the child node for the second signaling path and apply a portion of the reconfiguration message based on determining that the trigger for reconfiguration of the child node for the second signaling path is satisfied.

The communications manager 910 may also establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM), read only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting delayed reconfiguration in wireless systems).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
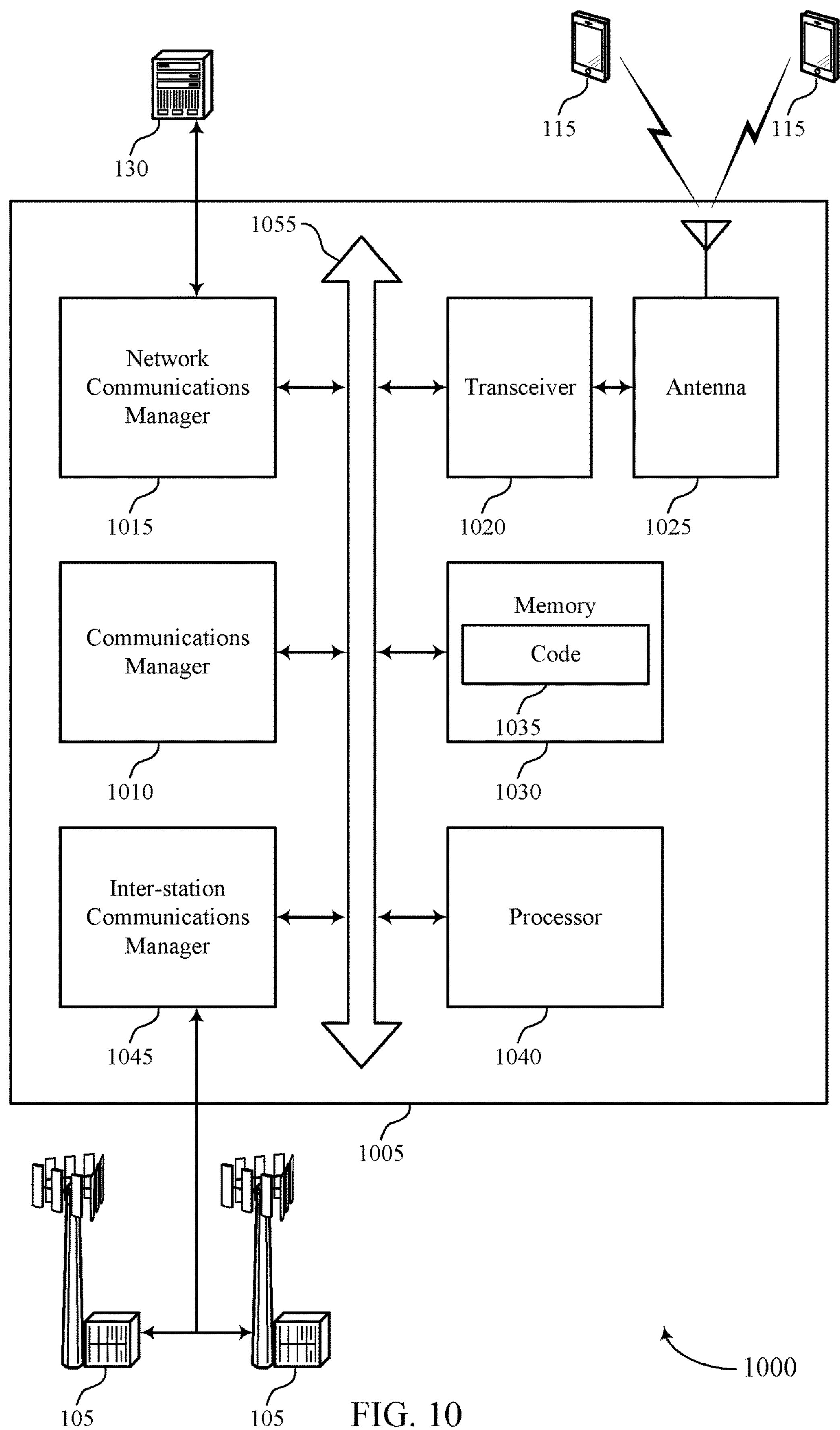
FIG. 10 shows a diagram of a system including a base station that supports delayed reconfiguration in wireless systems in accordance with one or more aspects of the present disclosure.

FIG. 10 shows a diagram of a system 1000 including a device 1005 that supports delayed reconfiguration in wireless systems in accordance with one or more aspects of the present disclosure. The device 1005 may be an example of or include the components of device 605, device 705, or an IAB node as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may receive, from the second node and via a first signaling path between the first node and the first donor node, a reconfiguration message that indicates a reconfiguration of the first node for a second signaling path via a third node and an indication to delay a portion of the reconfiguration message and communicate via the second signaling path in accordance with the reconfiguration message based on a trigger for reconfiguration of the first node for a second signaling path via a third node.

The communications manager 1010 may also transmit, to the child node and via a first signaling path between the child node and the first donor node, a reconfiguration message that indicates a reconfiguration of the child node for a second signaling path based on a trigger for reconfiguration of the child node for the second signaling path and apply a portion of the reconfiguration message based on determining that the trigger for reconfiguration of the child node for the second signaling path is satisfied.

The communications manager 1010 may also establish a first connection with a first node of the wireless communications system, establish a second connection with a second node of the wireless communications system, and transmit, to the first node and via a first signaling path between the first node and the donor node via the second node, a reconfiguration message that indicates a reconfiguration of the first node to use a second signaling path and an indication to delay application of a portion of the reconfiguration message.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting delayed reconfiguration in wireless systems).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
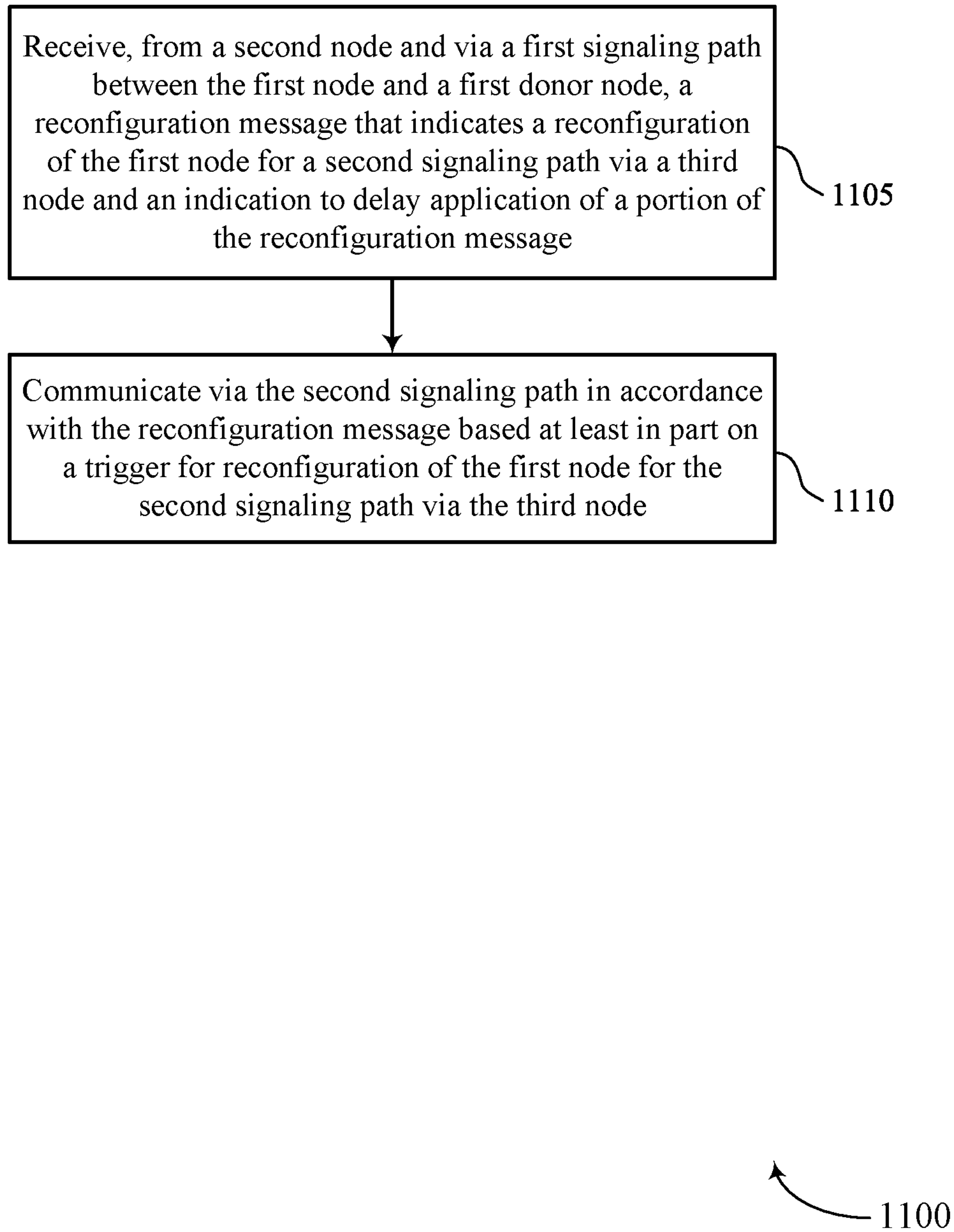
FIGS. 11 through 24 show flowcharts illustrating methods that support delayed reconfiguration in wireless systems in accordance with one or more aspects of the present disclosure.

FIG. 11 shows a flowchart illustrating a method 1100 that supports delayed reconfiguration in wireless systems in accordance with one or more aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1105, the IAB node may receive, from the second node and via a first signaling path between the first node and the first donor node, a reconfiguration message that indicates a reconfiguration of the first node for a second signaling path via a third node and an indication to delay application of a portion of the reconfiguration message. The operations of 1105 may be performed according to the methods described herein. In some examples, aspects of the operations of 1105 may be performed by a message receiver as described with reference to FIGS. 6 through 10.

At 1110, the IAB node may communicate via the second signaling path in accordance with the reconfiguration message based on a trigger for reconfiguration of the first node for the second signaling path via the third node. The operations of 1110 may be performed according to the methods described herein. In some examples, aspects of the operations of 1110 may be performed by a communication component as described with reference to FIGS. 6 through 10.

Figure 12:
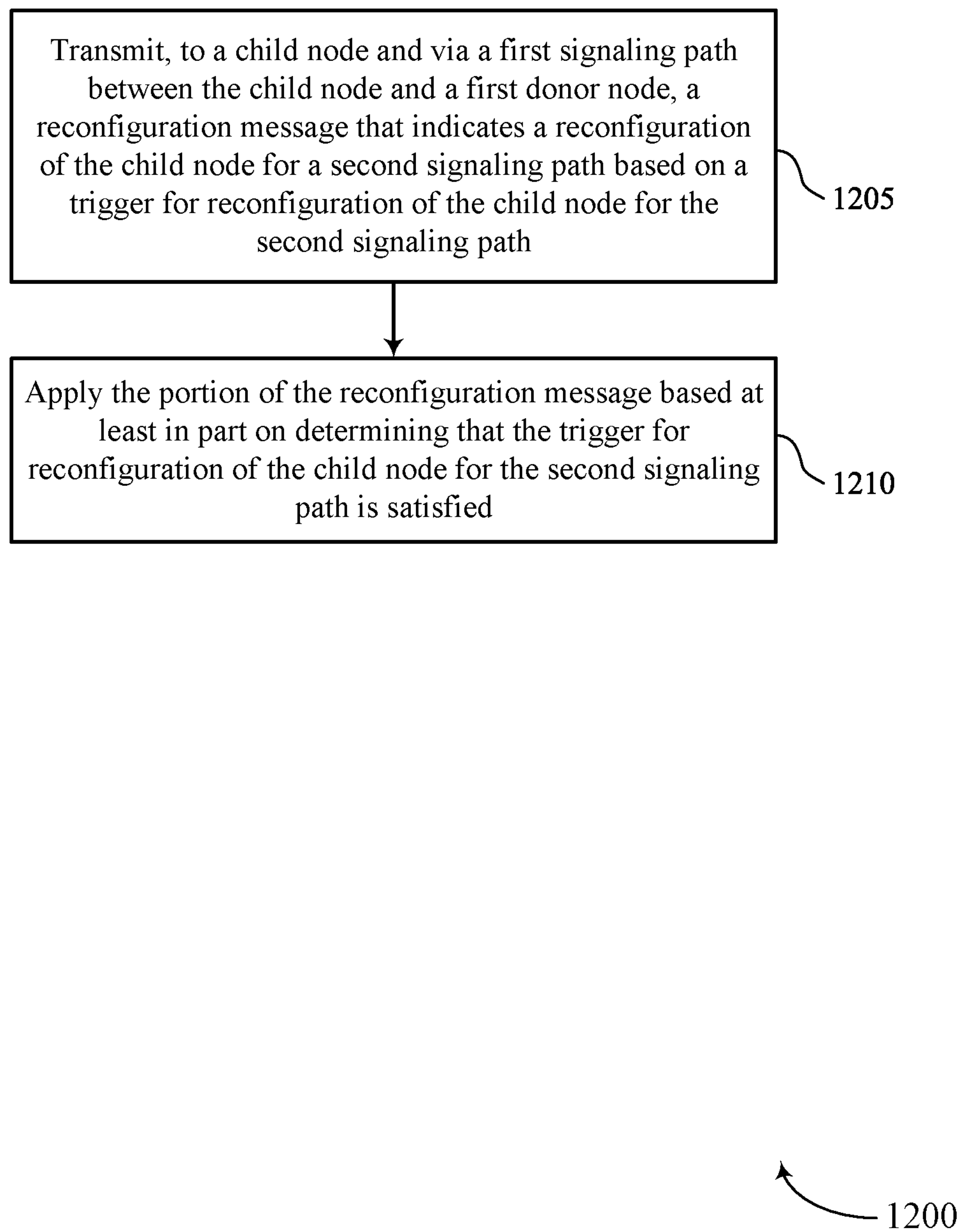

FIG. 12 shows a flowchart illustrating a method 1200 that supports delayed reconfiguration in wireless systems in accordance with one or more aspects of the present disclosure. The operations of method 1200 may be implemented by a UE 115 or base station 105 or its components as described herein. For example, the operations of method 1200 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1205, the IAB node may transmit, to the child node and via a first signaling path between the child node and the first donor node, a reconfiguration message that indicates a reconfiguration of the child node for a second signaling path based on a trigger for reconfiguration of the child node for the second signaling path. The operations of 1205 may be performed according to the methods described herein. In some examples, aspects of the operations of 1205 may be performed by a message transmitter as described with reference to FIGS. 6 through 10.

At 1210, the IAB node may apply a portion of the reconfiguration message based on determining that the trigger for reconfiguration of the child node for the second signaling path is satisfied. The operations of 1210 may be performed according to the methods described herein. In some examples, aspects of the operations of 1210 may be performed by an application component as described with reference to FIGS. 6 through 10.

Figure 13:
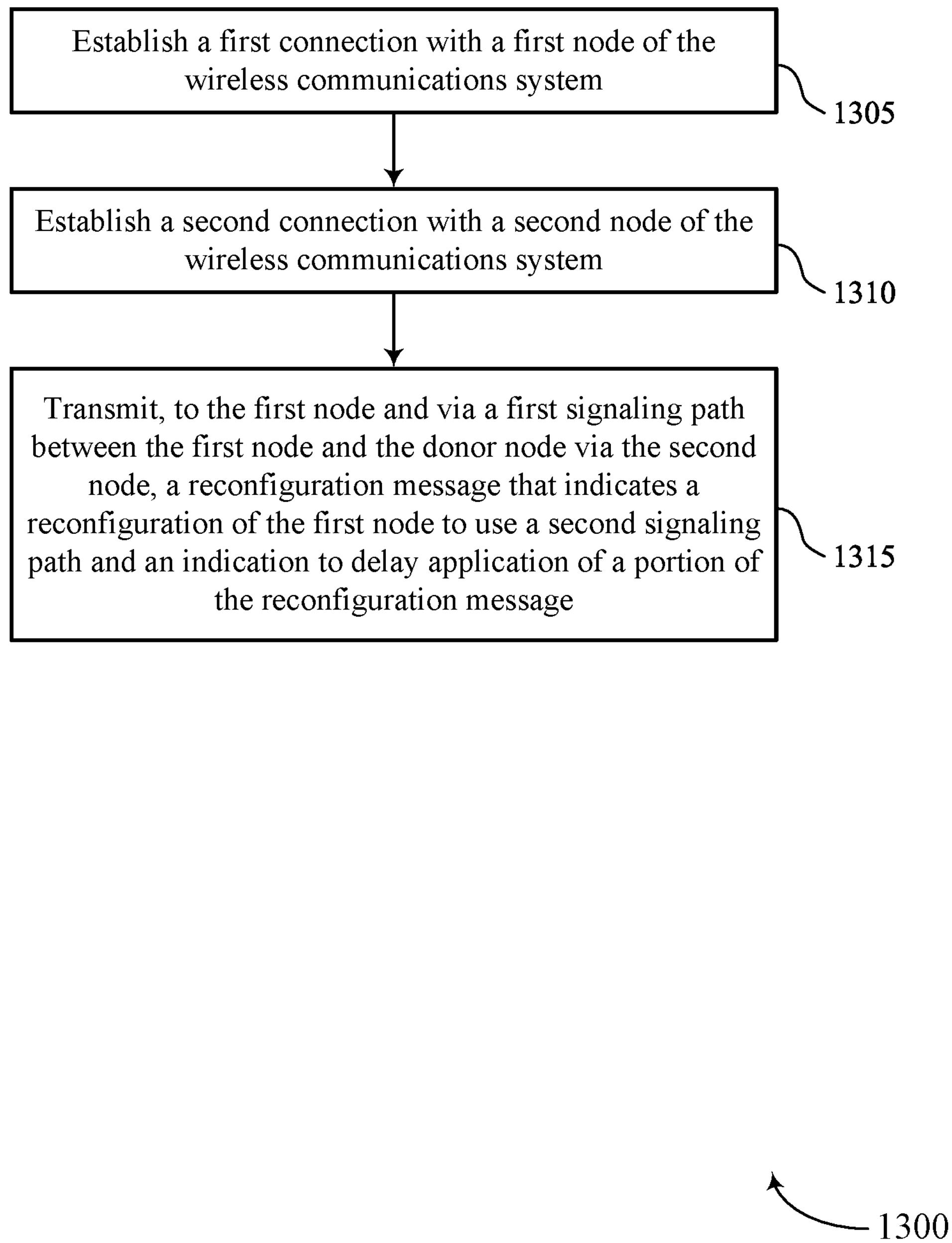

FIG. 13 shows a flowchart illustrating a method 1300 that supports delayed reconfiguration in wireless systems in accordance with one or more aspects of the present disclosure. The operations of method 1300 may be implemented by a UE 115 or base station 105 or its components as described herein. For example, the operations of method 1300 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1305, the IAB node may establish a first connection with a first node of the wireless communications system. The operations of 1305 may be performed according to the methods described herein. In some examples, aspects of the operations of 1305 may be performed by a connection manager as described with reference to FIGS. 6 through 10.

At 1310, the IAB node may establish a second connection with a second node of the wireless communications system. The operations of 1310 may be performed according to the methods described herein. In some examples, aspects of the operations of 1310 may be performed by a connection manager as described with reference to FIGS. 6 through 10.

At 1315, the IAB node may transmit, to the first node and via a first signaling path between the first node and the donor node via the second node, a reconfiguration message that indicates a reconfiguration of the first node to use a second signaling path and an indication to delay application of a portion of the reconfiguration message. The operations of 1315 may be performed according to the methods described herein. In some examples, aspects of the operations of 1315 may be performed by a message transmitter as described with reference to FIGS. 6 through 10.

Figure 14:
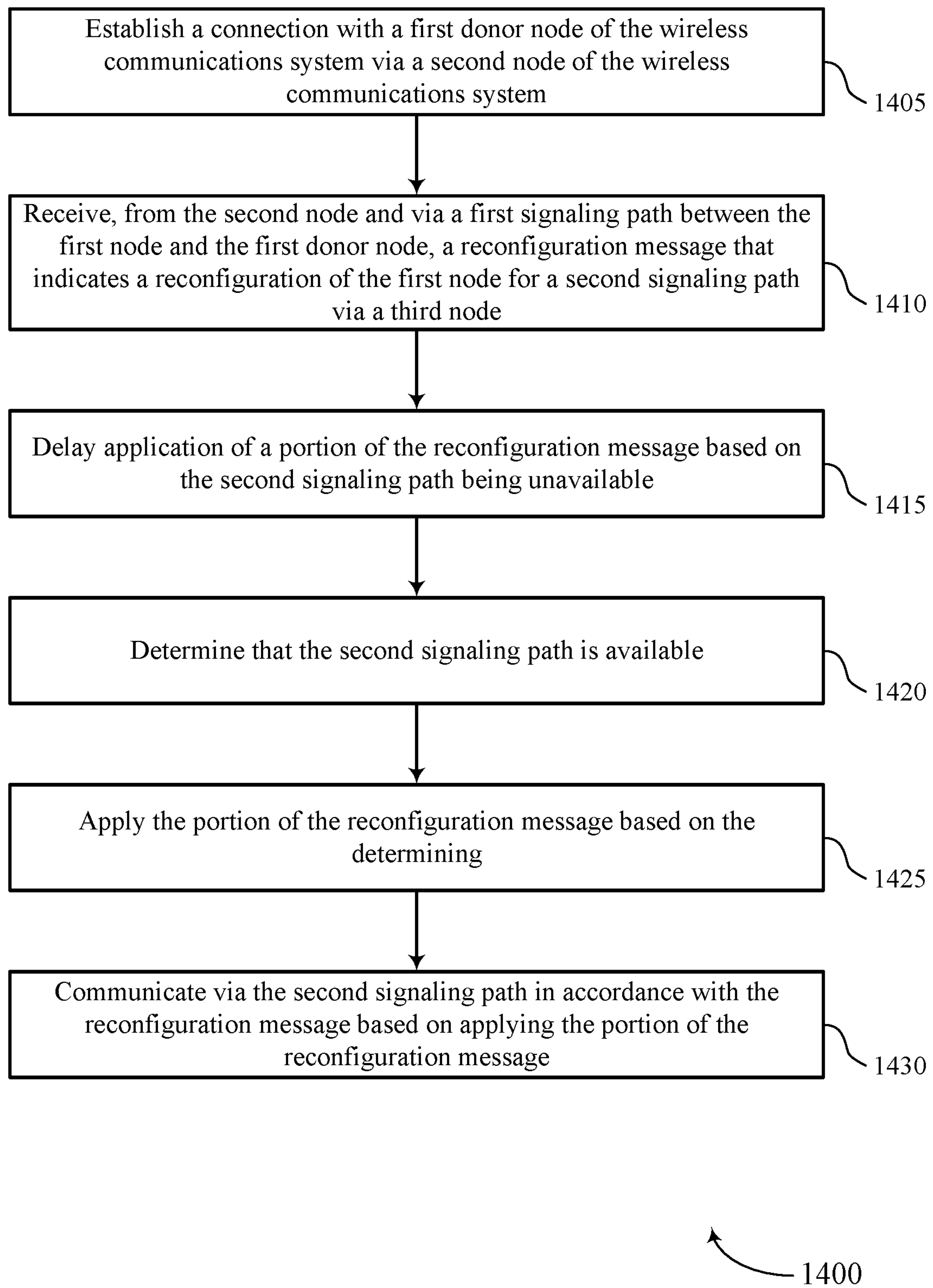

FIG. 14 shows a flowchart illustrating a method 1400 that supports delayed reconfiguration in wireless systems in accordance with one or more aspects of the present disclosure. The operations of method 1400 may be implemented by a UE 115 or base station 105 or its components as described herein. For example, the operations of method 1400 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1405, the IAB node may establish a connection with a first donor node of the wireless communications system via a second node of the wireless communications system. The operations of 1405 may be performed according to the methods described herein. In some examples, aspects of the operations of 1405 may be performed by a connection manager as described with reference to FIGS. 6 through 10.

At 1410, the IAB node may receive, from the second node and via a first signaling path between the first node and the first donor node, a reconfiguration message that indicates a reconfiguration of the first node for a second signaling path via a third node. The operations of 1410 may be performed according to the methods described herein. In some examples, aspects of the operations of 1410 may be performed by a message receiver as described with reference to FIGS. 6 through 10.

At 1415, the IAB node may delay application of a portion of the reconfiguration message based on the second signaling path being unavailable. The operations of 1415 may be performed according to the methods described herein. In some examples, aspects of the operations of 1415 may be performed by a delaying component as described with reference to FIGS. 6 through 10.

At 1420, the IAB node may determine that the second signaling path is available. The operations of 1420 may be performed according to the methods described herein. In some examples, aspects of the operations of 1420 may be performed by an availability manager as described with reference to FIGS. 6 through 10.

At 1425, the IAB node may apply the portion of the reconfiguration message based on the determining. The operations of 1425 may be performed according to the methods described herein. In some examples, aspects of the operations of 1425 may be performed by an application component as described with reference to FIGS. 6 through 10.

At 1430, the IAB node may communicate via the second signaling path in accordance with the reconfiguration message based on applying the portion of the reconfiguration message. The operations of 1430 may be performed according to the methods described herein. In some examples, aspects of the operations of 1430 may be performed by a communication component as described with reference to FIGS. 6 through 10.

Figure 15:
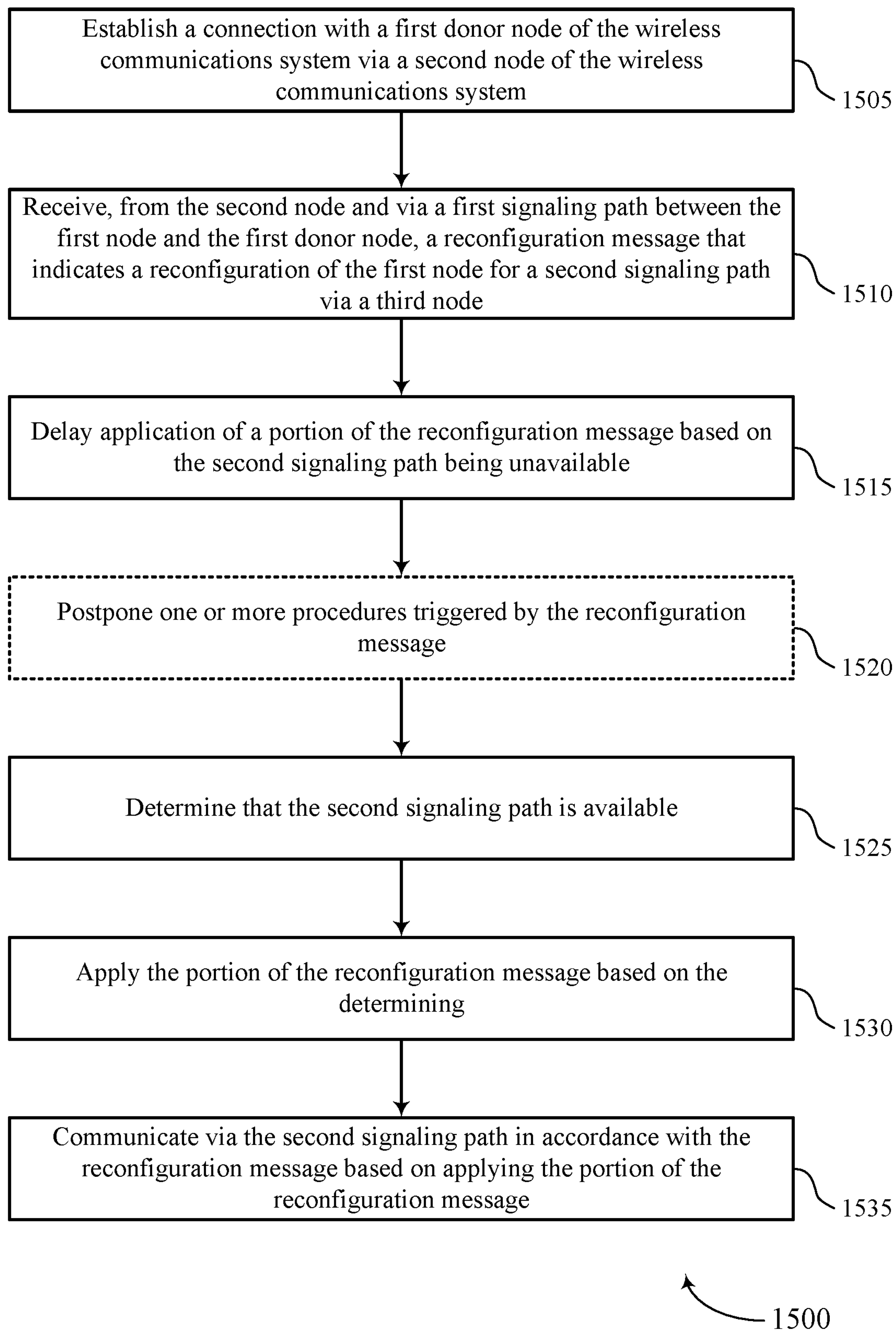

FIG. 15 shows a flowchart illustrating a method 1500 that supports delayed reconfiguration in wireless systems in accordance with one or more aspects of the present disclosure. The operations of method 1500 may be implemented by a UE 115 or base station 105 or its components as described herein. For example, the operations of method 1500 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1505, the IAB node may establish a connection with a first donor node of the wireless communications system via a second node of the wireless communications system. The operations of 1505 may be performed according to the methods described herein. In some examples, aspects of the operations of 1505 may be performed by a connection manager as described with reference to FIGS. 6 through 10.

At 1510, the IAB node may receive, from the second node and via a first signaling path between the first node and the first donor node, a reconfiguration message that indicates a reconfiguration of the first node for a second signaling path via a third node. The operations of 1510 may be performed according to the methods described herein. In some examples, aspects of the operations of 1510 may be performed by a message receiver as described with reference to FIGS. 6 through 10.

At 1515, the IAB node may delay application of a portion of the reconfiguration message based on the second signaling path being unavailable. The operations of 1515 may be performed according to the methods described herein. In some examples, aspects of the operations of 1515 may be performed by a delaying component as described with reference to FIGS. 6 through 10.

At 1520, the IAB node may postpone one or more procedures triggered by the reconfiguration message. The operations of 1520 may be performed according to the methods described herein. In some examples, aspects of the operations of 1520 may be performed by a delaying component as described with reference to FIGS. 6 through 10.

At 1525, the IAB node may determine that the second signaling path is available. The operations of 1525 may be performed according to the methods described herein. In some examples, aspects of the operations of 1525 may be performed by an availability manager as described with reference to FIGS. 6 through 10.

At 1530, the IAB node may apply the portion of the reconfiguration message based on the determining. The operations of 1530 may be performed according to the methods described herein. In some examples, aspects of the operations of 1530 may be performed by an application component as described with reference to FIGS. 6 through 10.

At 1535, the IAB node may communicate via the second signaling path in accordance with the reconfiguration message based on applying the portion of the reconfiguration message. The operations of 1535 may be performed according to the methods described herein. In some examples, aspects of the operations of 1535 may be performed by a communication component as described with reference to FIGS. 6 through 10.

Figure 16:
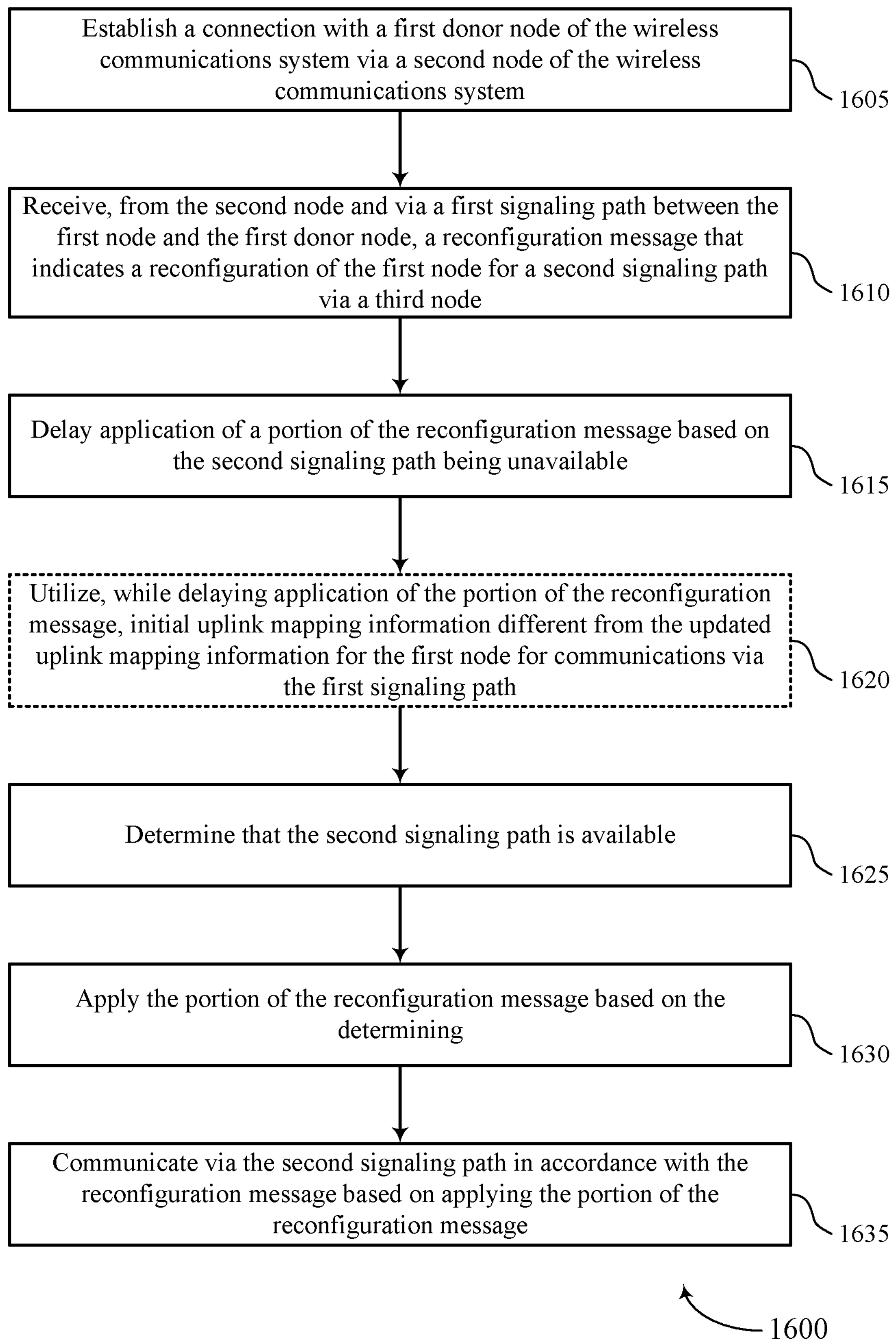

FIG. 16 shows a flowchart illustrating a method 1600 that supports delayed reconfiguration in wireless systems in accordance with one or more aspects of the present disclosure. The operations of method 1600 may be implemented by a UE 115 or base station 105 or its components as described herein. For example, the operations of method 1600 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1605, the IAB node may establish a connection with a first donor node of the wireless communications system via a second node of the wireless communications system. The operations of 1605 may be performed according to the methods described herein. In some examples, aspects of the operations of 1605 may be performed by a connection manager as described with reference to FIGS. 6 through 10.

At 1610, the IAB node may receive, from the second node and via a first signaling path between the first node and the first donor node, a reconfiguration message that indicates a reconfiguration of the first node for a second signaling path via a third node. The operations of 1610 may be performed according to the methods described herein. In some examples, aspects of the operations of 1610 may be performed by a message receiver as described with reference to FIGS. 6 through 10.

At 1615, the IAB node may delay application of a portion of the reconfiguration message based on the second signaling path being unavailable. The operations of 1615 may be performed according to the methods described herein. In some examples, aspects of the operations of 1615 may be performed by a delaying component as described with reference to FIGS. 6 through 10.

At 1620, the IAB node may utilize, while delaying application of the portion of the reconfiguration message, initial uplink mapping information different from the updated uplink mapping information for the first node for communications via the first signaling path. The operations of 1620 may be performed according to the methods described herein. In some examples, aspects of the operations of 1620 may be performed by an uplink mapping component as described with reference to FIGS. 6 through 10.

At 1625, the IAB node may determine that the second signaling path is available. The operations of 1625 may be performed according to the methods described herein. In some examples, aspects of the operations of 1625 may be performed by an availability manager as described with reference to FIGS. 6 through 10.

At 1630, the IAB node may apply the portion of the reconfiguration message based on the determining. The operations of 1630 may be performed according to the methods described herein. In some examples, aspects of the operations of 1630 may be performed by an application component as described with reference to FIGS. 6 through 10.

At 1635, the IAB node may communicate via the second signaling path in accordance with the reconfiguration message based on applying the portion of the reconfiguration message. The operations of 1635 may be performed according to the methods described herein. In some examples, aspects of the operations of 1635 may be performed by a communication component as described with reference to FIGS. 6 through 10.

Figure 17:
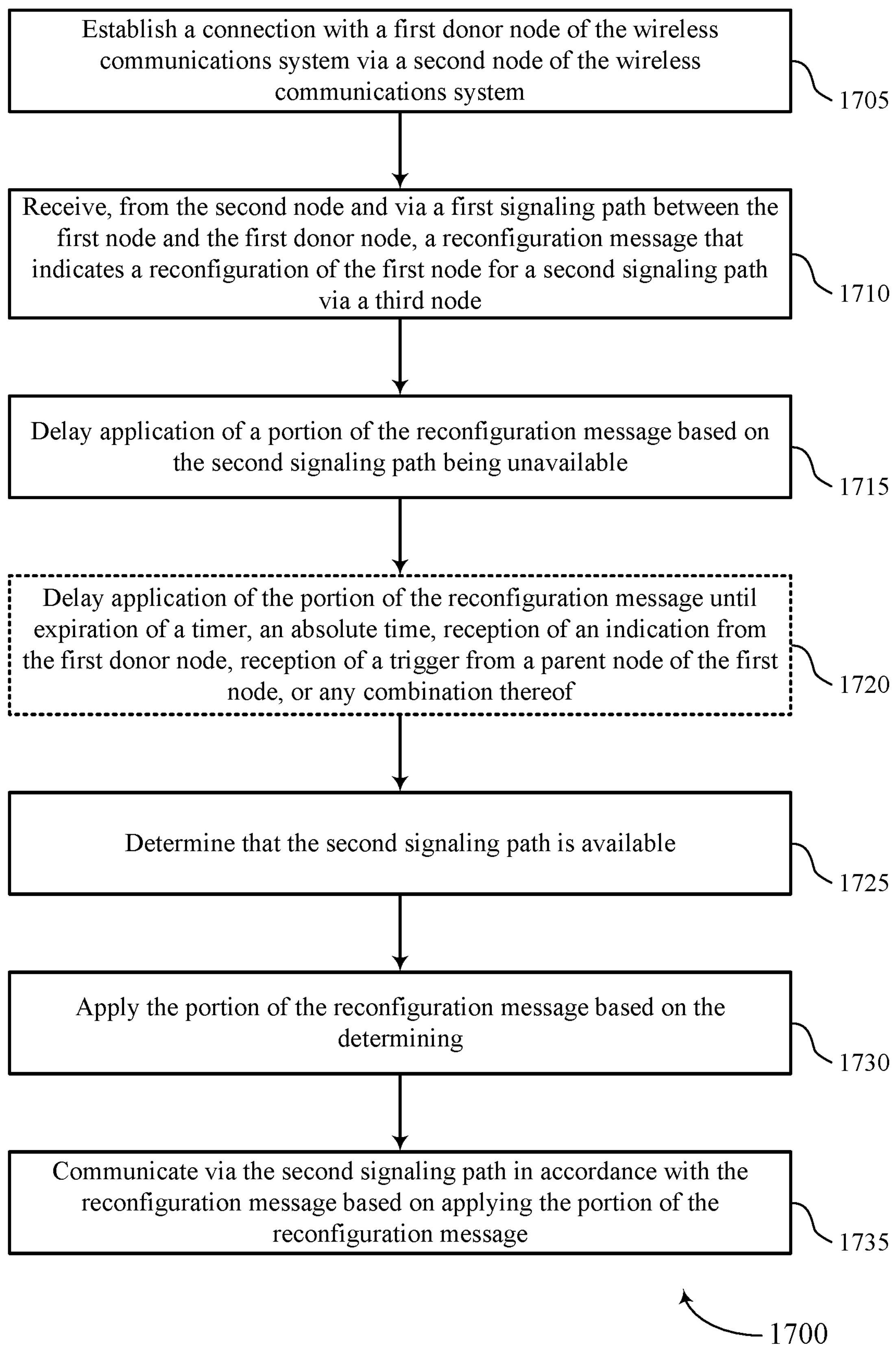

FIG. 17 shows a flowchart illustrating a method 1700 that supports delayed reconfiguration in wireless systems in accordance with one or more aspects of the present disclosure. The operations of method 1700 may be implemented by a UE 115 or base station 105 or its components as described herein. For example, the operations of method 1700 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1705, the IAB node may establish a connection with a first donor node of the wireless communications system via a second node of the wireless communications system. The operations of 1705 may be performed according to the methods described herein. In some examples, aspects of the operations of 1705 may be performed by a connection manager as described with reference to FIGS. 6 through 10.

At 1710, the IAB node may receive, from the second node and via a first signaling path between the first node and the first donor node, a reconfiguration message that indicates a reconfiguration of the first node for a second signaling path via a third node. The operations of 1710 may be performed according to the methods described herein. In some examples, aspects of the operations of 1710 may be performed by a message receiver as described with reference to FIGS. 6 through 10.

At 1715, the IAB node may delay application of a portion of the reconfiguration message based on the second signaling path being unavailable. The operations of 1715 may be performed according to the methods described herein. In some examples, aspects of the operations of 1715 may be performed by a delaying component as described with reference to FIGS. 6 through 10.

At 1720, the IAB node may delay application of the portion of the reconfiguration message until expiration of a timer, an absolute time, reception of an indication from the first donor node, reception of a trigger from a parent node of the first node, or any combination thereof. The operations of 1720 may be performed according to the methods described herein. In some examples, aspects of the operations of 1720 may be performed by a delaying component as described with reference to FIGS. 6 through 10.

At 1725, the IAB node may determine that the second signaling path is available. The operations of 1725 may be performed according to the methods described herein. In some examples, aspects of the operations of 1725 may be performed by an availability manager as described with reference to FIGS. 6 through 10.

At 1730, the IAB node may apply the portion of the reconfiguration message based on the determining. The operations of 1730 may be performed according to the methods described herein. In some examples, aspects of the operations of 1730 may be performed by an application component as described with reference to FIGS. 6 through 10.

At 1735, the IAB node may communicate via the second signaling path in accordance with the reconfiguration message based on applying the portion of the reconfiguration message. The operations of 1735 may be performed according to the methods described herein. In some examples, aspects of the operations of 1735 may be performed by a communication component as described with reference to FIGS. 6 through 10.

Figure 18:
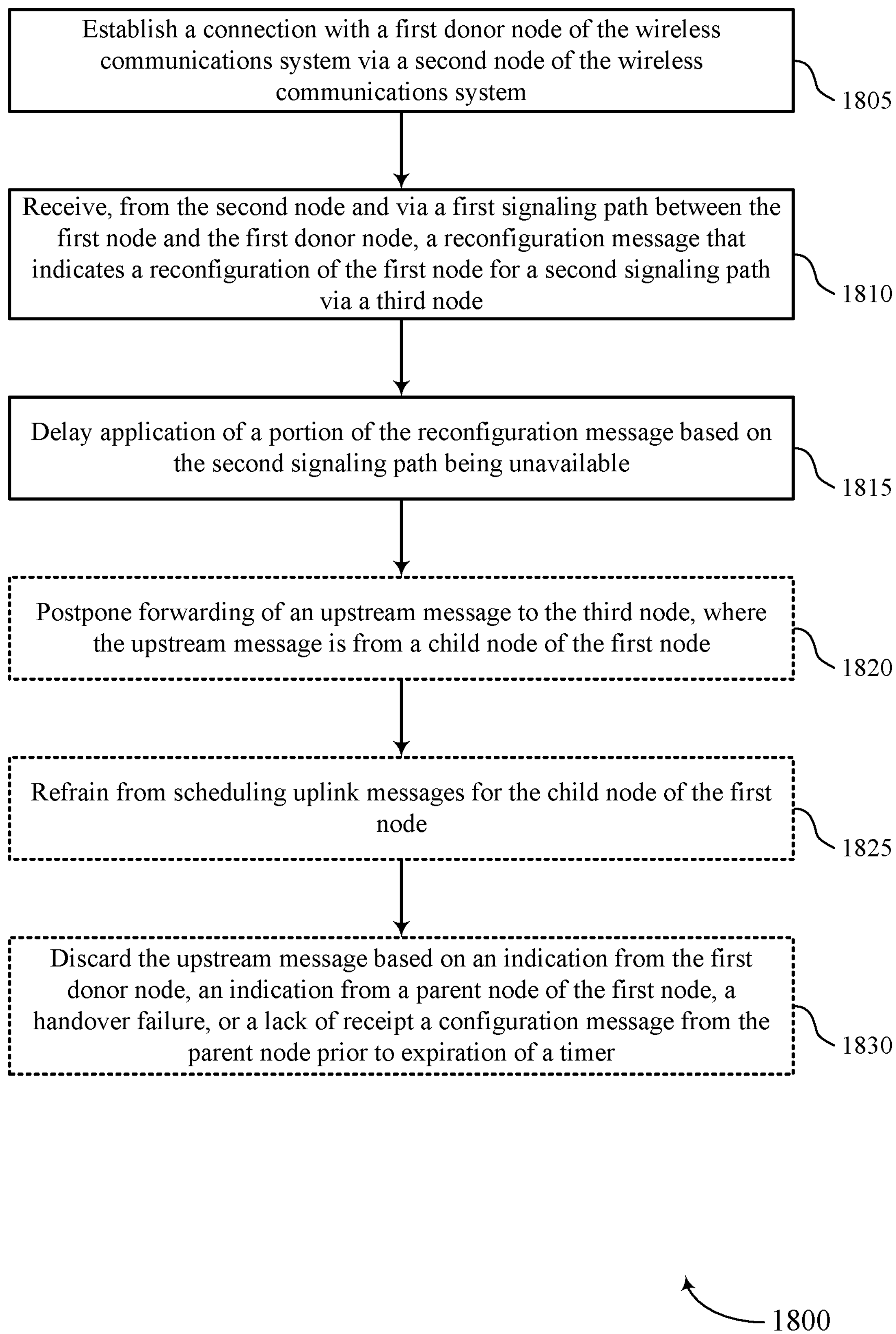

FIG. 18 shows a flowchart illustrating a method 1800 that supports delayed reconfiguration in wireless systems in accordance with one or more aspects of the present disclosure. The operations of method 1800 may be implemented by a UE 115 or base station 105 or its components as described herein. For example, the operations of method 1800 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1805, the IAB node may establish a connection with a first donor node of the wireless communications system via a second node of the wireless communications system. The operations of 1805 may be performed according to the methods described herein. In some examples, aspects of the operations of 1805 may be performed by a connection manager as described with reference to FIGS. 6 through 10.

At 1810, the IAB node may receive, from the second node and via a first signaling path between the first node and the first donor node, a reconfiguration message that indicates a reconfiguration of the first node for a second signaling path via a third node. The operations of 1810 may be performed according to the methods described herein. In some examples, aspects of the operations of 1810 may be performed by a message receiver as described with reference to FIGS. 6 through 10.

At 1815, the IAB node may delay application of a portion of the reconfiguration message based on the second signaling path being unavailable. The operations of 1815 may be performed according to the methods described herein. In some examples, aspects of the operations of 1815 may be performed by a delaying component as described with reference to FIGS. 6 through 10.

At 1820, the IAB node may postpone forwarding of an upstream message to the third node, where the upstream message is from a child node of the first node. The operations of 1820 may be performed according to the methods described herein. In some examples, aspects of the operations of 1820 may be performed by a delaying component as described with reference to FIGS. 6 through 10.

At 1825, the IAB node may refrain from scheduling uplink messages for the child node of the first node. The operations of 1825 may be performed according to the methods described herein. In some examples, aspects of the operations of 1825 may be performed by a delaying component as described with reference to FIGS. 6 through 10.

At 1830, the IAB node may discard the upstream message based on an indication from the first donor node, an indication from a parent node of the first node, a handover failure, or a lack of receipt a configuration message from the parent node prior to expiration of a timer. The operations of 1830 may be performed according to the methods described herein. In some examples, aspects of the operations of 1830 may be performed by a discard manager as described with reference to FIGS. 6 through 10.

Figure 19:
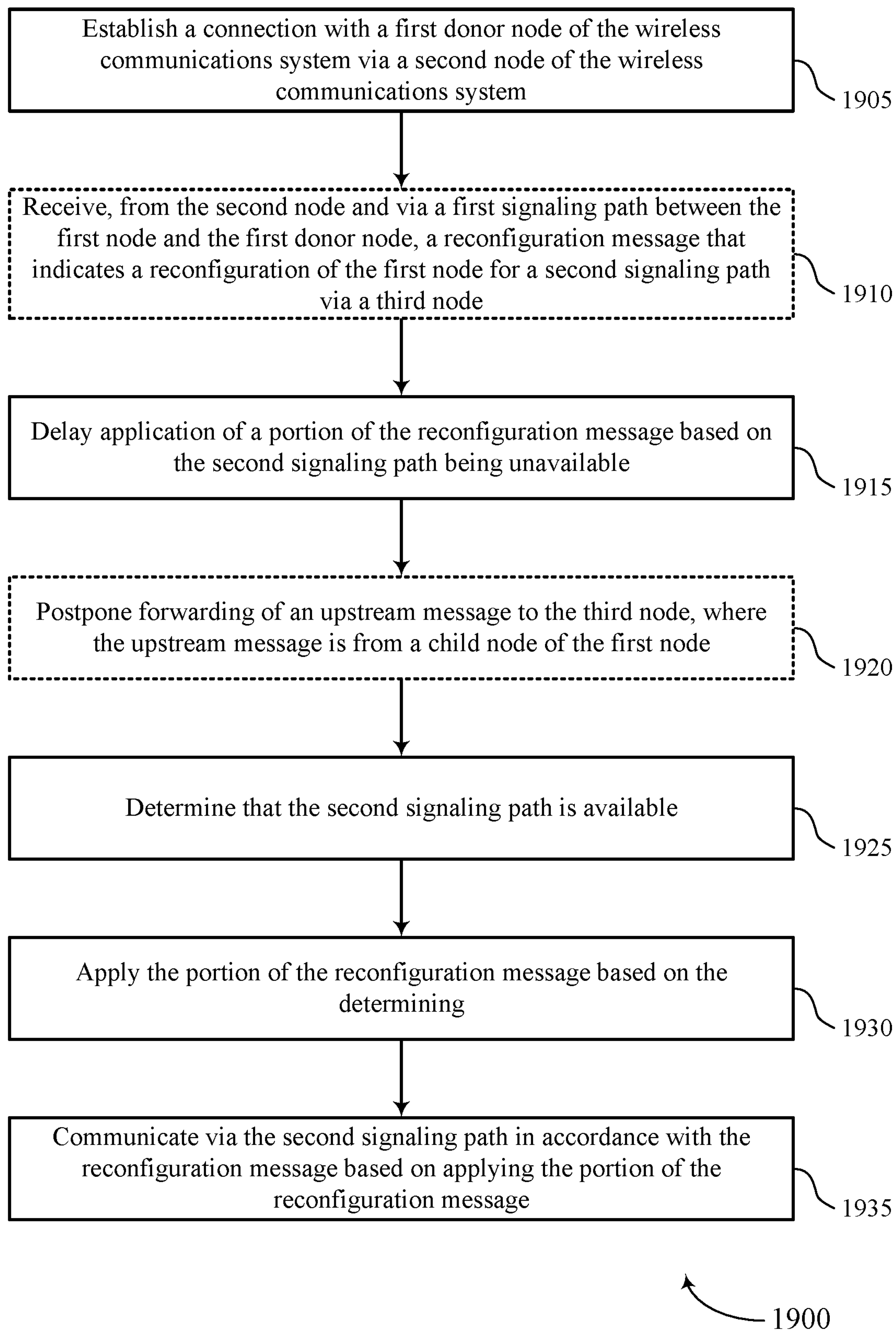

FIG. 19 shows a flowchart illustrating a method 1900 that supports delayed reconfiguration in wireless systems in accordance with one or more aspects of the present disclosure. The operations of method 1900 may be implemented by a UE 115 or base station 105 or its components as described herein. For example, the operations of method 1900 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 1905, the IAB node may establish a connection with a first donor node of the wireless communications system via a second node of the wireless communications system. The operations of 1905 may be performed according to the methods described herein. In some examples, aspects of the operations of 1905 may be performed by a connection manager as described with reference to FIGS. 6 through 10.

At 1910, the IAB node may receive, from the second node and via a first signaling path between the first node and the first donor node, a reconfiguration message that indicates a reconfiguration of the first node for a second signaling path via a third node. The operations of 1910 may be performed according to the methods described herein. In some examples, aspects of the operations of 1910 may be performed by a message receiver as described with reference to FIGS. 6 through 10.

At 1915, the IAB node may delay application of a portion of the reconfiguration message based on the second signaling path being unavailable. The operations of 1915 may be performed according to the methods described herein. In some examples, aspects of the operations of 1915 may be performed by a delaying component as described with reference to FIGS. 6 through 10.

At 1920, the IAB node may postpone forwarding of an upstream message to the third node, where the upstream message is from a child node of the first node. The operations of 1920 may be performed according to the methods described herein. In some examples, aspects of the operations of 1920 may be performed by a delaying component as described with reference to FIGS. 6 through 10.

At 1925, the IAB node may determine that the second signaling path is available. The operations of 1925 may be performed according to the methods described herein. In some examples, aspects of the operations of 1925 may be performed by an availability manager as described with reference to FIGS. 6 through 10.

At 1930, the IAB node may apply the portion of the reconfiguration message based on the determining. The operations of 1930 may be performed according to the methods described herein. In some examples, aspects of the operations of 1930 may be performed by an application component as described with reference to FIGS. 6 through 10.

At 1935, the IAB node may communicate via the second signaling path in accordance with the reconfiguration message based on applying the portion of the reconfiguration message. The operations of 1935 may be performed according to the methods described herein. In some examples, aspects of the operations of 1935 may be performed by a communication component as described with reference to FIGS. 6 through 10.

Figure 20:
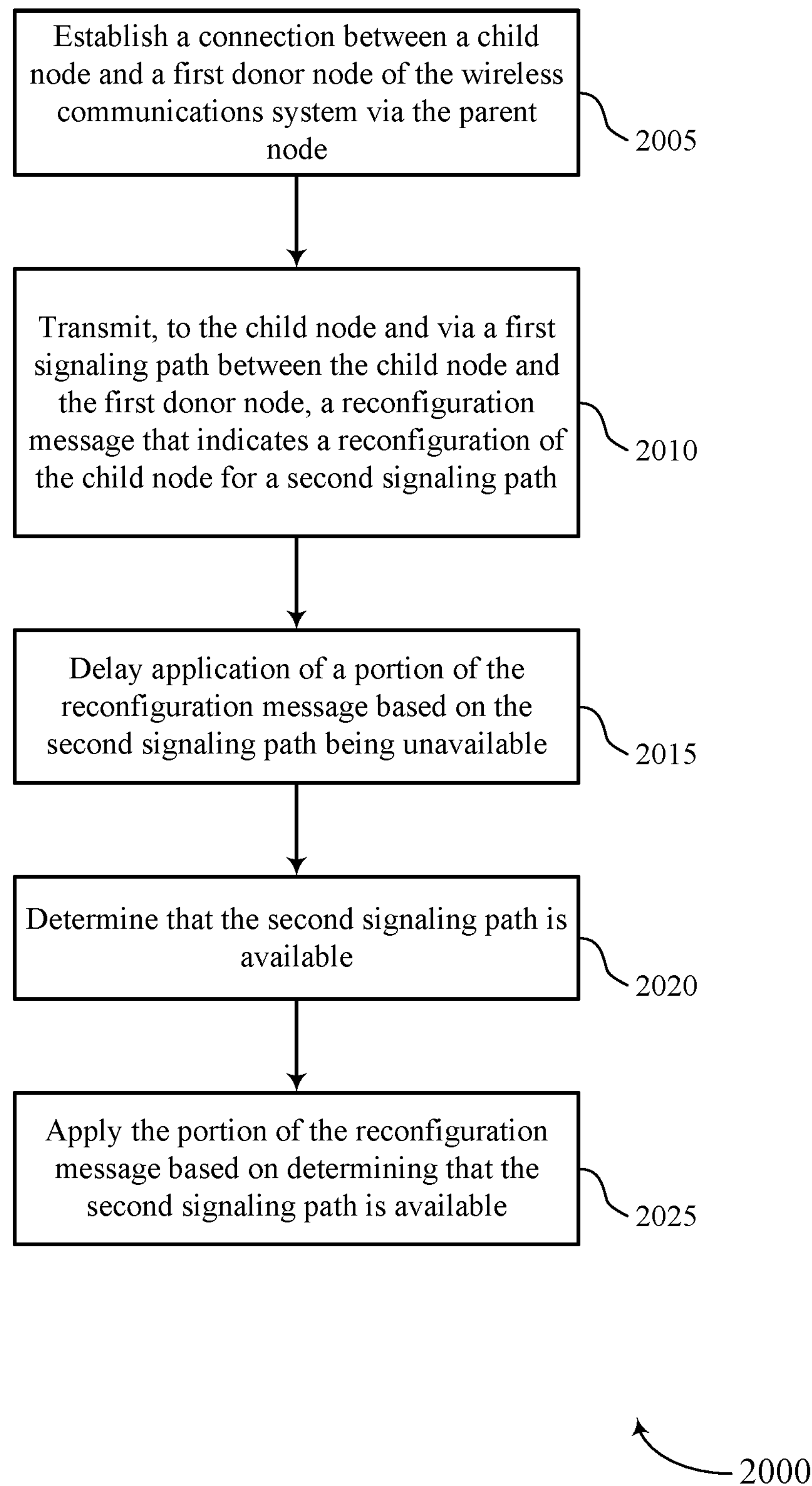

FIG. 20 shows a flowchart illustrating a method 2000 that supports delayed reconfiguration in wireless systems in accordance with one or more aspects of the present disclosure. The operations of method 2000 may be implemented by a UE 115 or base station 105 or its components as described herein. For example, the operations of method 2000 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 2005, the IAB node may establish a connection between a child node and a first donor node of the wireless communications system via the parent node. The operations of 2005 may be performed according to the methods described herein. In some examples, aspects of the operations of 2005 may be performed by a connection manager as described with reference to FIGS. 6 through 10.

At 2010, the IAB node may transmit, to the child node and via a first signaling path between the child node and the first donor node, a reconfiguration message that indicates a reconfiguration of the child node for a second signaling path. The operations of 2010 may be performed according to the methods described herein. In some examples, aspects of the operations of 2010 may be performed by a message transmitter as described with reference to FIGS. 6 through 10.

At 2015, the IAB node may delay application of a portion of the reconfiguration message based on the second signaling path being unavailable. The operations of 2015 may be performed according to the methods described herein. In some examples, aspects of the operations of 2015 may be performed by a delaying component as described with reference to FIGS. 6 through 10.

At 2020, the IAB node may determine that the second signaling path is available. The operations of 2020 may be performed according to the methods described herein. In some examples, aspects of the operations of 2020 may be performed by an availability manager as described with reference to FIGS. 6 through 10.

At 2025, the IAB node may apply the portion of the reconfiguration message based on determining that the second signaling path is available. The operations of 2025 may be performed according to the methods described herein. In some examples, aspects of the operations of 2025 may be performed by an application component as described with reference to FIGS. 6 through 10.

Figure 21:
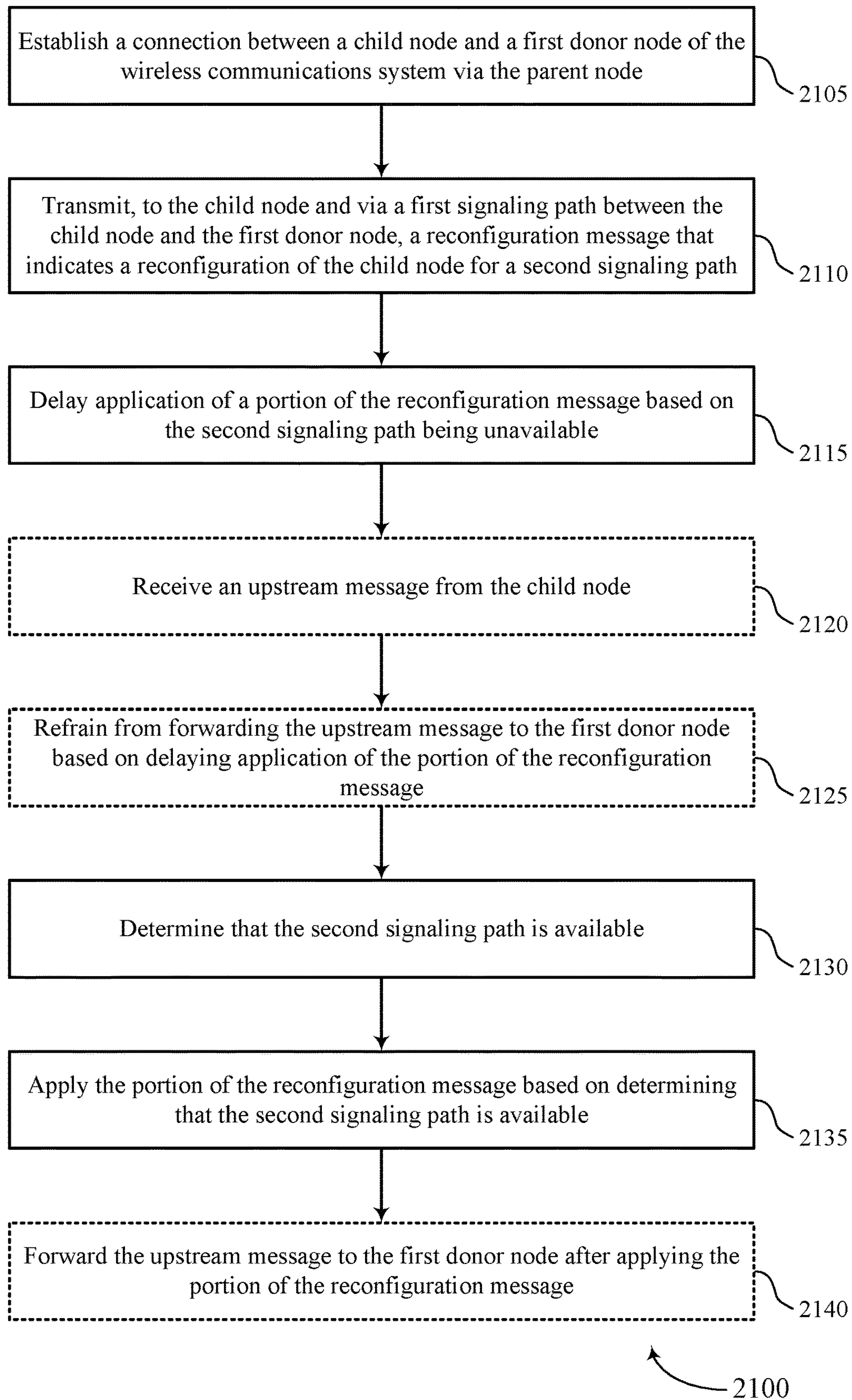

FIG. 21 shows a flowchart illustrating a method 2100 that supports delayed reconfiguration in wireless systems in accordance with one or more aspects of the present disclosure. The operations of method 2100 may be implemented by a UE 115 or base station 105 or its components as described herein. For example, the operations of method 2100 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 2105, the IAB node may establish a connection between a child node and a first donor node of the wireless communications system via the parent node. The operations of 2105 may be performed according to the methods described herein. In some examples, aspects of the operations of 2105 may be performed by a connection manager as described with reference to FIGS. 6 through 10.

At 2110, the IAB node may transmit, to the child node and via a first signaling path between the child node and the first donor node, a reconfiguration message that indicates a reconfiguration of the child node for a second signaling path. The operations of 2110 may be performed according to the methods described herein. In some examples, aspects of the operations of 2110 may be performed by a message transmitter as described with reference to FIGS. 6 through 10.

At 2115, the IAB node may delay application of a portion of the reconfiguration message based on the second signaling path being unavailable. The operations of 2115 may be performed according to the methods described herein. In some examples, aspects of the operations of 2115 may be performed by a delaying component as described with reference to FIGS. 6 through 10.

At 2120, the IAB node may receive an upstream message from the child node. The operations of 2120 may be performed according to the methods described herein. In some examples, aspects of the operations of 2120 may be performed by a message receiver as described with reference to FIGS. 6 through 10.

At 2125, the IAB node may refrain from forwarding the upstream message to the first donor node based on delaying application of the portion of the reconfiguration message. The operations of 2125 may be performed according to the methods described herein. In some examples, aspects of the operations of 2125 may be performed by a forwarding manager as described with reference to FIGS. 6 through 10.

At 2130, the IAB node may determine that the second signaling path is available. The operations of 2130 may be performed according to the methods described herein. In some examples, aspects of the operations of 2130 may be performed by an availability manager as described with reference to FIGS. 6 through 10.

At 2135, the IAB node may apply the portion of the reconfiguration message based on determining that the second signaling path is available. The operations of 2135 may be performed according to the methods described herein. In some examples, aspects of the operations of 2135 may be performed by an application component as described with reference to FIGS. 6 through 10.

At 2140, the IAB node may forward the upstream message to the first donor node after applying the portion of the reconfiguration message. The operations of 2140 may be performed according to the methods described herein. In some examples, aspects of the operations of 2140 may be performed by a forwarding manager as described with reference to FIGS. 6 through 10.

Figure 22:
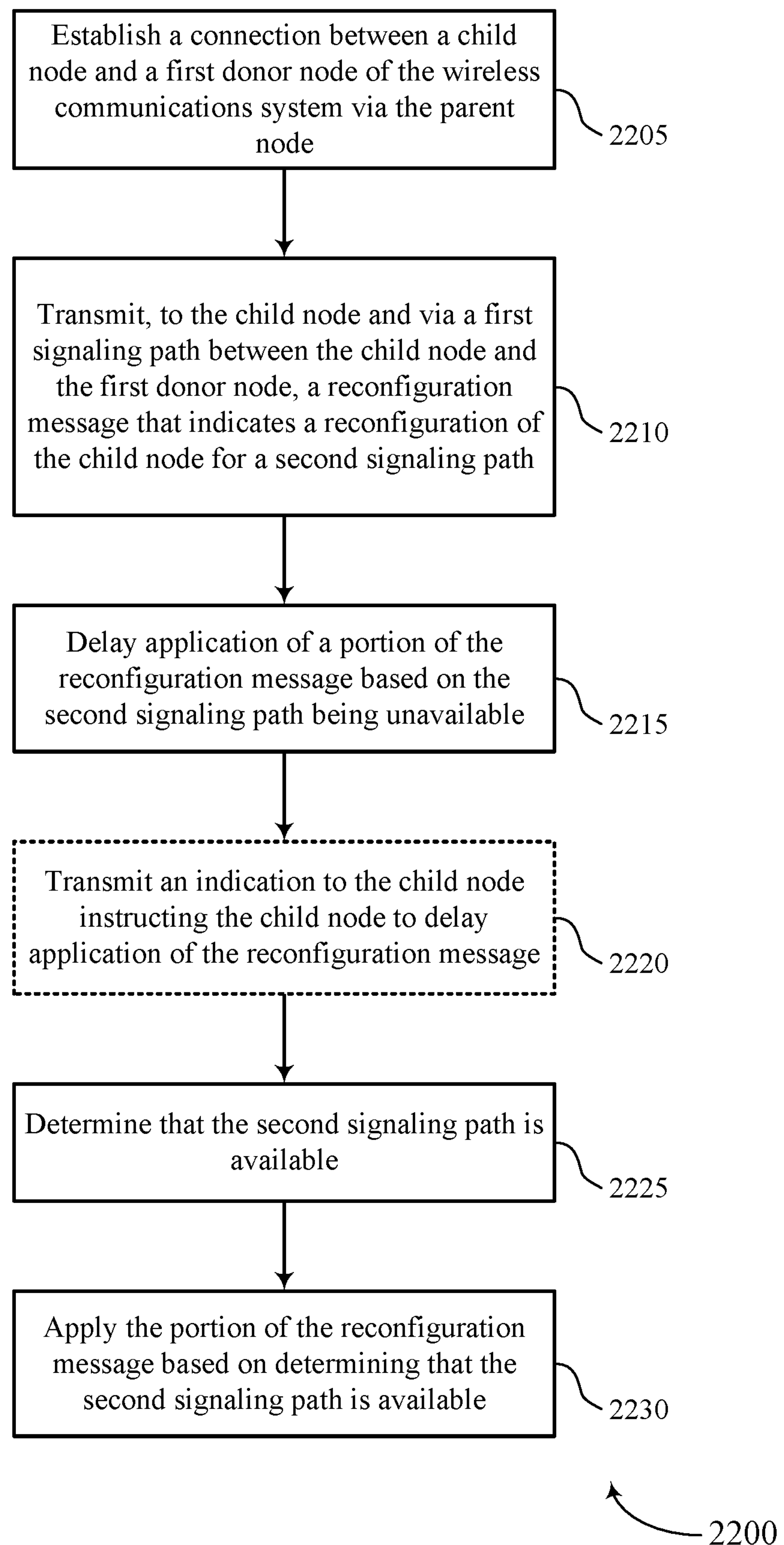

FIG. 22 shows a flowchart illustrating a method 2200 that supports delayed reconfiguration in wireless systems in accordance with one or more aspects of the present disclosure. The operations of method 2200 may be implemented by a UE 115 or base station 105 or its components as described herein. For example, the operations of method 2200 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 2205, the IAB node may establish a connection between a child node and a first donor node of the wireless communications system via the parent node. The operations of 2205 may be performed according to the methods described herein. In some examples, aspects of the operations of 2205 may be performed by a connection manager as described with reference to FIGS. 6 through 10.

At 2210, the IAB node may transmit, to the child node and via a first signaling path between the child node and the first donor node, a reconfiguration message that indicates a reconfiguration of the child node for a second signaling path. The operations of 2210 may be performed according to the methods described herein. In some examples, aspects of the operations of 2210 may be performed by a message transmitter as described with reference to FIGS. 6 through 10.

At 2215, the IAB node may delay application of a portion of the reconfiguration message based on the second signaling path being unavailable. The operations of 2215 may be performed according to the methods described herein. In some examples, aspects of the operations of 2215 may be performed by a delaying component as described with reference to FIGS. 6 through 10.

At 2220, the IAB node may transmit an indication to the child node instructing the child node to delay application of the reconfiguration message. The operations of 2220 may be performed according to the methods described herein. In some examples, aspects of the operations of 2220 may be performed by an indication transmitter as described with reference to FIGS. 6 through 10.

At 2225, the IAB node may determine that the second signaling path is available. The operations of 2225 may be performed according to the methods described herein. In some examples, aspects of the operations of 2225 may be performed by an availability manager as described with reference to FIGS. 6 through 10.

At 2230, the IAB node may apply the portion of the reconfiguration message based on determining that the second signaling path is available. The operations of 2230 may be performed according to the methods described herein. In some examples, aspects of the operations of 2230 may be performed by an application component as described with reference to FIGS. 6 through 10.

Figure 23:
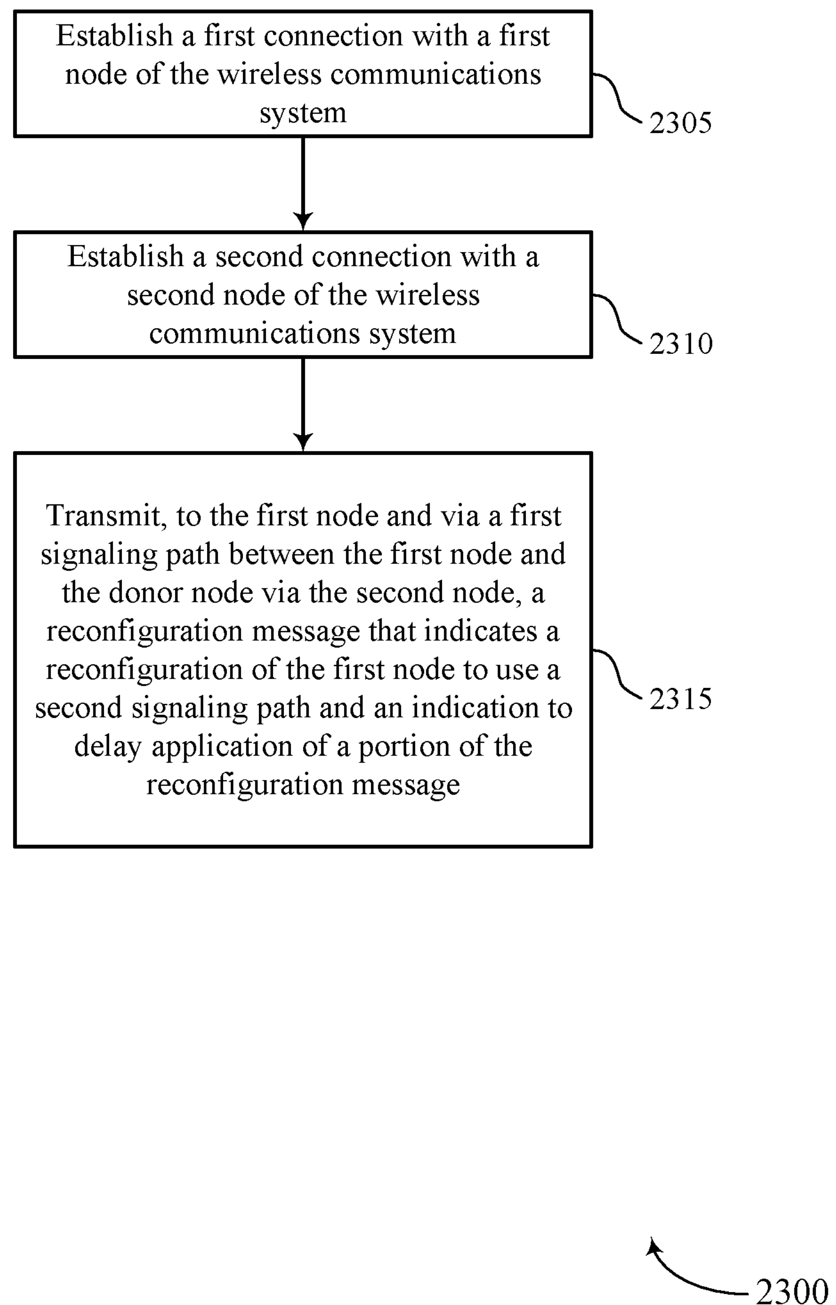

FIG. 23 shows a flowchart illustrating a method 2300 that supports delayed reconfiguration in wireless systems in accordance with one or more aspects of the present disclosure. The operations of method 2300 may be implemented by a UE 115 or base station 105 or its components as described herein. For example, the operations of method 2300 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 2305, the IAB node may establish a first connection with a first node of the wireless communications system. The operations of 2305 may be performed according to the methods described herein. In some examples, aspects of the operations of 2305 may be performed by a connection manager as described with reference to FIGS. 6 through 10.

At 2310, the IAB node may establish a second connection with a second node of the wireless communications system. The operations of 2310 may be performed according to the methods described herein. In some examples, aspects of the operations of 2310 may be performed by a connection manager as described with reference to FIGS. 6 through 10.

At 2315, the IAB node may transmit, to the first node and via a first signaling path between the first node and the donor node via the second node, a reconfiguration message that indicates a reconfiguration of the first node to use a second signaling path and an indication to delay application of a portion of the reconfiguration message. The operations of 2315 may be performed according to the methods described herein. In some examples, aspects of the operations of 2315 may be performed by a message transmitter as described with reference to FIGS. 6 through 10.

Figure 24:
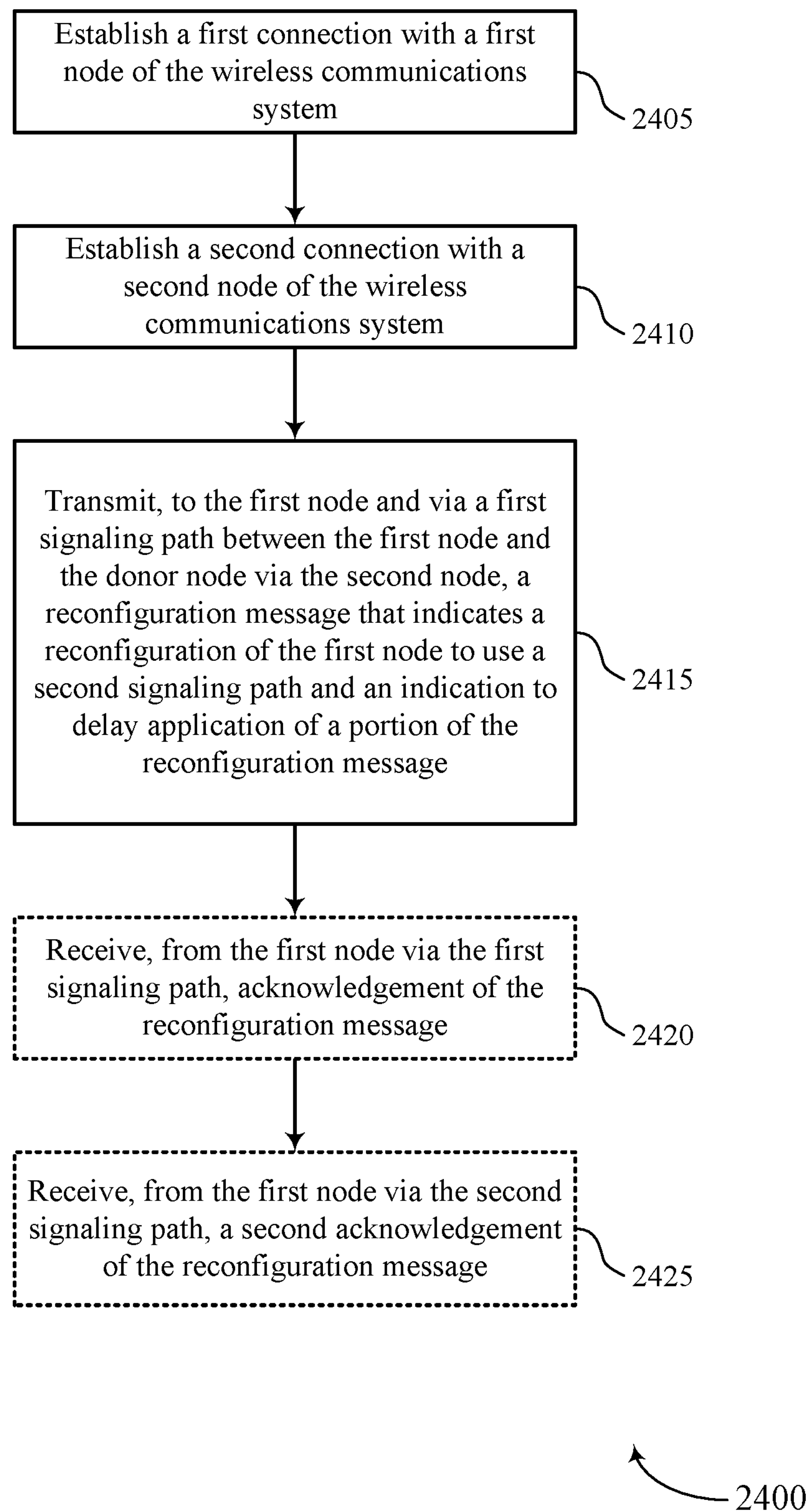

FIG. 24 shows a flowchart illustrating a method 2400 that supports delayed reconfiguration in wireless systems in accordance with one or more aspects of the present disclosure. The operations of method 2400 may be implemented by a UE 115 or base station 105 or its components as described herein. For example, the operations of method 2400 may be performed by a communications manager as described with reference to FIGS. 6 through 10. In some examples, a IAB node may execute a set of instructions to control the functional elements of the IAB node to perform the functions described herein. Additionally or alternatively, a IAB node may perform aspects of the functions described herein using special-purpose hardware.

At 2405, the IAB node may establish a first connection with a first node of the wireless communications system. The operations of 2405 may be performed according to the methods described herein. In some examples, aspects of the operations of 2405 may be performed by a connection manager as described with reference to FIGS. 6 through 10.

At 2410, the IAB node may establish a second connection with a second node of the wireless communications system. The operations of 2410 may be performed according to the methods described herein. In some examples, aspects of the operations of 2410 may be performed by a connection manager as described with reference to FIGS. 6 through 10.

At 2415, the IAB node may transmit, to the first node and via a first signaling path between the first node and the donor node via the second node, a reconfiguration message that indicates a reconfiguration of the first node to use a second signaling path and an indication to delay application of a portion of the reconfiguration message. The operations of 2415 may be performed according to the methods described herein. In some examples, aspects of the operations of 2415 may be performed by a message transmitter as described with reference to FIGS. 6 through 10.

At 2420, the IAB node may receive, from the first node via the first signaling path, acknowledgement of the reconfiguration message. The operations of 2420 may be performed according to the methods described herein. In some examples, aspects of the operations of 2420 may be performed by a message receiver as described with reference to FIGS. 6 through 10.

At 2425, the IAB node may receive, from the first node via the second signaling path, a second acknowledgement of the reconfiguration message. The operations of 2425 may be performed according to the methods described herein. In some examples, aspects of the operations of 2425 may be performed by a message receiver as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first node in a wireless communications system, comprising: receiving, from a second node and via a first signaling path between the first node and a first donor node, a reconfiguration message that indicates a reconfiguration of the first node for a second signaling path via a third node and an indication to delay application of a portion of the reconfiguration message; and communicating via the second signaling path in accordance with the reconfiguration message based at least in part on a trigger for reconfiguration of the first node for the second signaling path via the third node.

Aspect 2: The method of aspect 1, wherein the reconfiguration message comprises the indication to delay application of the portion of the reconfiguration message.

Aspect 3: The method of any of aspects 1 and 2, further comprising: delaying application of the portion of the reconfiguration message based at least in part on the second signaling path being unavailable and the indication to delay application of the portion of the reconfiguration message; determining that the second signaling path is available; and applying the portion of the reconfiguration message based at least in part on the determining.

Aspect 4: The method of any of aspects 1 through 3, further comprising: establishing a connection with the first donor node of the wireless communications system via the second node of the wireless communications system.

Aspect 5: The method of aspect 4, further comprising: establishing a second connection with one of the first donor node or a second donor node as part of the reconfiguration of the first node; and determining that the second signaling path is available based at least in part on establishing the second connection.

Aspect 6: The method of any of aspects 1 through 5, wherein the indication to delay application of the portion of the reconfiguration message comprises: an indication to postpone one or more procedures triggered by the reconfiguration message.

Aspect 7: The method of any of aspects 1 through 6, wherein the reconfiguration message indicates updated uplink mapping information or IP address information for the first node for communications via the second signaling path, the method further comprising: utilizing, before communicating via the second signaling path, initial uplink mapping information or IP address information different from the updated uplink mapping information or IP address information for the first node for communications via the first signaling path.

Aspect 8: The method of aspect 7, wherein utilizing the initial uplink mapping information comprises: transmitting a reconfiguration complete message to the first donor node via the first signaling path in accordance with the initial uplink mapping information or IP address information.

Aspect 9: The method of any of aspects 7 and 8, further comprising: transmitting an acknowledgement of the reconfiguration message via the second signaling path in accordance with the updated uplink mapping information or IP address information as part of communicating via the second signaling path.

Aspect 10: The method of any of aspects 7 through 9, further comprising: initiating a security handshake via the second signaling path in accordance with the updated uplink mapping information or IP address information as part of communicating via the second signaling path.

Aspect 11: The method of any of aspects 1 through 10, wherein the trigger for reconfiguration of the first node for the second signaling path via the third node comprises an expiration of a timer, an absolute time, reception of a first indication from the first donor node, reception of a second indication from a parent node of the first node, or any combination thereof.

Aspect 12: The method of any of aspects 1 through 11, wherein the indication to delay application of the portion of the reconfiguration message comprises: an indication to postpone forwarding of an upstream message to the third node, wherein the upstream message is from a child node of the first node.

Aspect 13: The method of any of aspects 1 through 12, further comprising: performing a random access procedure, a security handshake, or a handover procedure from the second node to the third node.

Aspect 14: The method of any of aspects 1 through 13, further comprising: configuring a new or existing SCTP connection, a new or existing F1-C connection, an additional signaling path of an existing SCTP connection, or one or more new or existing F1-U data tunnels for the first node based at least in part on the reconfiguration message.

Aspect 15: The method of any of aspects 1 through 14, further comprising: discarding one or more portions of the reconfiguration message based at least in part on a failure of establishment of the second signaling path.

Aspect 16: The method of aspect 15, further comprising: determining the failure of establishment of the second signaling path based at least in part on an indication from the first donor node, a parent node of the first node, or a lack of receipt of a configuration message from the parent node prior to expiration of a timer.

Aspect 17: The method of any of aspects 1 through 16, wherein the second signaling path is between the first node and the first donor node or between the first node and a second donor node.

Aspect 18: A method for wireless communications at a parent node in a wireless communications system, comprising: transmitting, to a child node and via a first signaling path between the child node and a first donor node, a reconfiguration message that indicates a reconfiguration of the child node for a second signaling path based on a trigger for reconfiguration of the child node for the second signaling path; and applying a portion of the reconfiguration message based at least in part on determining that the trigger for reconfiguration of the child node for the second signaling path is satisfied.

Aspect 19: The method of aspect 18, further comprising: receiving an upstream message from the child node; refraining from forwarding the upstream message to the first donor node based at least in part on the trigger not being satisfied; and forwarding the upstream message to the first donor node based at least in part on the trigger being satisfied.

Aspect 20: The method of aspect 19, further comprising: detecting a random access configuration, completion of a handover procedure, or a DU function change at the parent node; and forwarding the upstream message to the first donor node based at least in part on the detecting.

Aspect 21: The method of any of aspects 18 through 20, further comprising: transmitting an indication that instructs the child node to delay application of the reconfiguration message until the trigger, the trigger comprising an expiration of a timer, a first indication from the first donor node, a second indication from the parent node, an absolute time, or any combination thereof.

Aspect 22: The method of any of aspects 18 through 21, further comprising: transmitting, to the child node, an indication to apply the portion of the reconfiguration message, wherein the trigger comprises the indication.

Aspect 23: The method of any of aspects 18 through 22, further comprising: receiving an indication from the first donor node instructing the parent node to delay application of the portion of the reconfiguration message.

Aspect 24: The method of any of aspects 18 through 23, further comprising: refraining from scheduling uplink messages for the child node for a portion of time based at least in part on the trigger not being satisfied.

Aspect 25: The method of any of aspects 18 through 24, further comprising: transmitting, to the child node, a message indicating a failure of establishment of the second signaling path.

Aspect 26: A method for wireless communications at a donor node in a wireless communications system, comprising: establishing a first connection with a first node of the wireless communications system; establishing a second connection with a second node of the wireless communications system; and transmitting, to the first node and via a first signaling path between the first node and the donor node via the second node, a reconfiguration message that indicates a reconfiguration of the first node to use a second signaling path and an indication to delay application of a portion of the reconfiguration message.

Aspect 27: The method of aspect 26, further comprising: receiving, from the first node via the first signaling path, acknowledgement of the reconfiguration message and receiving, from the first node via the second signaling path, a second acknowledgement of the reconfiguration message.

Aspect 28: The method of any of aspects 26 through 27, wherein the indication to delay application of the portion of the reconfiguration message instructs one of the first node or the second node to postpone one or more procedures triggered by the reconfiguration message.

Aspect 29: The method of any of aspects 26 through 28, wherein the indication to delay application of the portion of the reconfiguration message instructs one of the first node or the second node to delay application of the portion of the reconfiguration message until expiration of a timer, a trigger from the donor node or parent node, an absolute time, or any combination thereof.

Aspect 30: An apparatus for wireless communications at a first node in a wireless communications system, comprising a processor; memory coupled with the processor; and instructions stored in the memory and executable by the processor to cause the apparatus to perform a method of any of aspects 1 through 17.

Aspect 31: An apparatus for wireless communications at a first node in a wireless communications system, comprising at least one means for performing a method of any of aspects 1 through 17.

Aspect 32: A non-transitory computer-readable medium storing code for wireless communications at a first node in a wireless communications system, the code comprising instructions executable by a processor to perform a method of any of aspects 1 through 17.

Aspect 33: An apparatus for wireless communications at a parent node in a wireless communications system, comprising a processor; memory coupled with the processor; and instructions stored in the memory and executable by the processor to cause the apparatus to perform a method of any of aspects 18 through 24.

Aspect 34: An apparatus for wireless communications at a parent node in a wireless communications system, comprising at least one means for performing a method of any of aspects 18 through 24.

Aspect 35: A non-transitory computer-readable medium storing code for wireless communications at a parent node in a wireless communications system, the code comprising instructions executable by a processor to perform a method of any of aspects 18 through 24.

Aspect 36: An apparatus for wireless communications at a donor node in a wireless communications system, comprising a processor; memory coupled with the processor; and instructions stored in the memory and executable by the processor to cause the apparatus to perform a method of any of aspects 25 through 29.

Aspect 37: An apparatus for wireless communications at a donor node in a wireless communications system, comprising at least one means for performing a method of any of aspects 25 through 29.

Aspect 38: A non-transitory computer-readable medium storing code for wireless communications at a donor node in a wireless communications system, the code comprising instructions executable by a processor to perform a method of any of aspects 25 through 29.

Aspect 39: A method for wireless communications at a first node in wireless communications system, comprising establishing a connection with a first donor node of the wireless communications system via a second node of the wireless communications system receiving, from the second node and via a first signaling path between the first node and the first donor node, a reconfiguration message that indicates a reconfiguration of the first node for a second signaling path via a third node delaying application of a portion of the reconfiguration message based at least in part on the second signaling path being unavailable determining that the second signaling path is available applying the portion of the reconfiguration message based at least in part on the determining communicating via the second signaling path in accordance with the reconfiguration message based at least in part on applying the portion of the reconfiguration message.

Aspect 40: The method of aspect 39, wherein delaying application of the portion of the reconfiguration message: postponing one or more procedures triggered by the reconfiguration message.

Aspect 41: The method of any one of aspects 39 and 40, wherein the reconfiguration message indicates updated uplink mapping information for the first node for communications via the second signaling path, the method further comprising utilizing, while delaying application of the portion of the reconfiguration message, initial uplink mapping information different from the updated uplink mapping information for the first node for communications via the first signaling path.

Aspect 42: The method of aspect 41, wherein utilizing the initial uplink mapping information comprises: transmitting a reconfiguration complete message to the first donor node via the first signaling path in accordance with the initial uplink mapping information.

Aspect 43: The method of any one of aspects 41 and 42, further comprising transmitting an acknowledgement of the reconfiguration message via the second signaling path in accordance with the updated uplink mapping information after applying the portion of the reconfiguration message.

Aspect 44: The method of any one of aspects 41 through 43, further comprising initiating a security handshake via the second signaling path in accordance with the updated uplink mapping information after applying the portion of the reconfiguration message.

Aspect 45: The method of any one of aspects 39 through 44, further comprising receiving, from the first donor node, an indication to delay application of the portion of the reconfiguration message delaying application of the portion of the reconfiguration message based at least in part on the indication.

Aspect 46: The method of any one of aspects 39 through 45, wherein delaying application of the portion of the reconfiguration message: delaying application of the portion of the reconfiguration message until expiration of a timer, an absolute time, reception of an indication from the first donor node, reception of a trigger from a parent node of the first node, or any combination thereof.

Aspect 47: The method of any one of aspects 39 through 46, further comprising receiving an indication to extend delaying application of the portion of the reconfiguration message from the first donor node or the second node extending delaying application of the portion of the reconfiguration message based at least in part on the indication.

Aspect 48: The method of any one of aspects 39 through 47, wherein delaying application of the portion of the reconfiguration message: postponing forwarding of an upstream message to the third node, wherein the upstream message is from a child node of the first node.

Aspect 49: The method of aspect 48, further comprising receiving an indication to postpone forwarding of one or more upstream messages received at the first node, wherein the upstream message is postponed based at least in part on the indication.

Aspect 50: The method of aspect 49, wherein the indication to postpone forwarding is associated with a Backhaul Adaptation Protocol (BAP) address, a BAP routing ID, a channel ID, or any combination thereof.

Aspect 51: The method of any one of aspects 49 and 50, wherein the indication to postpone forwarding is associated with a given MT function of the wireless communications system or a set of MT functions of the wireless communications system.

Aspect 52: The method of any one of aspects 48 through 51, wherein postponing forwarding of the upstream message comprises: refraining from scheduling uplink messages for the child node of the first node.

Aspect 53: The method of any one of aspects 48 through 52, further comprising discarding the upstream message based at least in part on an indication from the first donor node, an indication from a parent node of the first node, a handover failure, or a lack of receipt a configuration message from the parent node prior to expiration of a timer.

Aspect 54: The method of any one of aspects 39 through 53, further comprising establishing a second connection with one of the first donor node or the second donor node as part of the reconfiguration of the first node determining that the second signaling path is available based at least in part on establishing the second connection.

Aspect 55: The method of any one of aspects 39 through 54, wherein applying the portion of the reconfiguration message comprises: performing a random access procedure, a security handshake, or a handover procedure from the second node to the third node.

Aspect 56: The method of any one of aspects 39 through 55, wherein applying the portion of the reconfiguration message comprises: establishing an SCTP connection or an F1-C connection for the first node.

Aspect 57: The method of any one of aspects 39 through 56, wherein applying the portion of the reconfiguration message comprises: establishing an additional signaling path of an existing SCTP connection or one or more F1-U data tunnels for the first node.

Aspect 58: The method of any one of aspects 39 through 57, further comprising discarding one or more portions of the reconfiguration message based at least in part on a failure of establishment of the second signaling path.

Aspect 59: The method of aspect 58, further comprising determining the failure of establishment of the second signaling path based at least in part on an indication from the first donor node, a parent node of the first node, or a lack of receipt a configuration message from the parent node prior to expiration of a timer.

Aspect 60: The method of any one of aspects 39 through 59, wherein the second signaling path is between the first node and the first donor node or between the first node and a second donor node.

Aspect 61: A method for wireless communications at a parent node in a wireless communications system, comprising establishing a connection between a child node and a first donor node of the wireless communications system via the parent node transmitting, to the child node and via a first signaling path between the child node and the first donor node, a reconfiguration message that indicates a reconfiguration of the child node for a second signaling path delaying application of a portion of the reconfiguration message based at least in part on the second signaling path being unavailable determining that the second signaling path is available applying the portion of the reconfiguration message based at least in part on determining that the second signaling path is available.

Aspect 62: The method of aspect 61, further comprising receiving an upstream message from the child node refraining from forwarding the upstream message to the first donor node based at least in part on delaying application of the portion of the reconfiguration message.

Aspect 63: The method of aspect 62, further comprising forwarding the upstream message to the first donor node after applying the portion of the reconfiguration message.

Aspect 64: The method of any one of aspects 62 and 63, further comprising detecting a random access configuration, completion of a handover procedure, or a DU function change at the parent node forwarding the upstream message to the first donor node based at least in part on the detecting.

Aspect 65: The method of any one of aspects 62 through 64, further comprising detecting a security handshake, establishment of an SCTP connection, or modification of an existing SCTP connection forwarding the upstream message to the first donor node based at least in part on the detecting.

Aspect 66: The method of any one of aspects 62 through 65, further comprising detecting establishment or migration of an F1-C connection, or setup or migration of one or more F1-U connection forwarding the upstream message to the first donor node based at least in part on the detecting.

Aspect 67: The method of any one of aspects 61 through 66, further comprising transmitting an indication to the child node instructing the child node to delay application of the reconfiguration message.

Aspect 68: The method of aspect 67, wherein the indication instructs the child node to delay application of the reconfiguration message until expiration of a timer, a trigger from the parent node or the first donor node, an absolute time, or any combination thereof.

Aspect 69: The method of any one of aspects 67 and 68, wherein the indication instructs the child node to extend delaying application of the reconfiguration message.

Aspect 70: The method of any one of aspects 61 through 69, further comprising receiving an indication from the first donor node instructing the parent node to delay application of the portion of the reconfiguration message.

Aspect 71: The method of any one of aspects 61 through 70, further comprising transmitting a configuration message to the child node configuring the child node with a reconnection timer based at least in part on delaying application of the portion of the reconfiguration message.

Aspect 72: The method of any one of aspects 61 through 71, wherein delaying application of the portion of the reconfiguration message comprises: delaying scheduling uplink messages for the child node.

Aspect 73: The method of any one of aspects 61 through 72, wherein the second signaling path is between the child node and the first donor node or between the child node and a second donor node.

Aspect 74: A method for wireless communications at a donor node in a wireless communications system, comprising establishing a first connection with a first node of the wireless communications system establishing a second connection with a second node of the wireless communications system transmitting, to the first node and via a first signaling path between the first node and the donor node via the second node, a reconfiguration message that indicates a reconfiguration of the first node to use a second signaling path and an indication to delay application of a portion of the reconfiguration message.

Aspect 75: The method of aspect 74, further comprising receiving, from the first node via the first signaling path, acknowledgement of the reconfiguration message.

Aspect 76: The method of aspect 75, further comprising receiving, from the first node via the second signaling path, a second acknowledgement of the reconfiguration message.

Aspect 77: The method of any one of aspects 74 through 76, transmitting the reconfiguration message comprises: transmitting the reconfiguration message for a second donor node of the wireless communications system, wherein the second signaling path is between the first node and the second donor node.

Aspect 78: The method of any one of aspects 74 through 77, wherein the indication to delay application of the portion of the reconfiguration message instructs one of the first node or the second node to postpone one or more procedures triggered by the reconfiguration message.

Aspect 79: The method of any one of aspects 74 through 78, wherein the indication to delay application of the portion of the reconfiguration message instructs one of the first node or the second node to delay application of the portion of the reconfiguration message until expiration of a timer, a trigger from the donor node or parent node, an absolute time, or any combination thereof.

Aspect 80: An apparatus for wireless communications at a donor node in a wireless communications system comprising at least one means for performing a method of any one of aspects 39 through 60.

Aspect 81: An apparatus for wireless communications at a donor node in a wireless communications system comprising a processor and memory coupled to the processor, the processor and memory configured to perform a method of any one of aspects 39 through 60.

Aspect 82: A non-transitory computer-readable medium storing code for wireless communications at a donor node in a wireless communications system comprising a processor, memory in electronic communication with the processor, and instructions stored in the memory and executable by the processor to cause the apparatus to perform a method of any one of aspects 39 through 60.

Aspect 83: An apparatus for wireless communications at a donor node in a wireless communications system comprising at least one means for performing a method of any one of aspects 61 through 73.

Aspect 84: An apparatus for wireless communications at a donor node in a wireless communications system comprising a processor and memory coupled to the processor, the processor and memory configured to perform a method of any one of aspects 61 through 73.

Aspect 85: A non-transitory computer-readable medium storing code for wireless communications at a donor node in a wireless communications system comprising a processor, memory in electronic communication with the processor, and instructions stored in the memory and executable by the processor to cause the apparatus to perform a method of any one of aspects 61 through 73.

Aspect 86: An apparatus for wireless communications at a donor node in a wireless communications system comprising at least one means for performing a method of any one of aspects 74 through 79.

Aspect 87: An apparatus for wireless communications at a donor node in a wireless communications system comprising a processor and memory coupled to the processor, the processor and memory configured to perform a method of any one of aspects 74 through 79.

Aspect 88: A non-transitory computer-readable medium storing code for wireless communications at a donor node in a wireless communications system comprising a processor, memory in electronic communication with the processor, and instructions stored in the memory and executable by the processor to cause the apparatus to perform a method of any one of aspects 74 through 79.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first node for wireless communication, comprising:

a memory; and a processor coupled to the memory, wherein the processor is configured to cause the first node to:

receive, from a second node and via a first signaling path between the first node and a first donor node, a reconfiguration message that indicates a reconfiguration of the first node for a second signaling path via a third node, wherein the reconfiguration message comprises an indication to delay application of a portion of the reconfiguration message, wherein the reconfiguration message indicates updated uplink mapping information or Internet Protocol address information for the first node for communications via the second signaling path;

utilize, before communication via the second signaling path, initial uplink mapping information or Internet Protocol address information different from the updated uplink mapping information or Internet Protocol address information for the first node for communications via the first signaling path; and communicate via the second signaling path in accordance with the reconfiguration message based at least in part on a trigger for reconfiguration of the first node for the second signaling path via the third node.

2. The first node of claim 1, wherein the processor is configured to cause the first node to:

delay application of the portion of the reconfiguration message based at least in part on the second signaling path being unavailable and the indication to delay application of the portion of the reconfiguration message;

determine that the second signaling path is available; and apply the portion of the reconfiguration message based at least in part on the determination.

3. The first node of claim 1, wherein the processor is configured to cause the first node to:

establish a connection with the first donor node via the second node.

4. The first node of claim 3, wherein the processor is configured to cause the first node to:

establish a second connection with one of the first donor node or a second donor node as part of the reconfiguration of the first node; and determine that the second signaling path is available based at least in part on the establishment of the second connection.

5. The first node of claim 1, wherein the indication to delay application of the portion of the reconfiguration message comprises:

an indication to postpone one or more procedures triggered by the reconfiguration message.

6. The first node of claim 1, wherein, to utilize the initial uplink mapping information or Internet Protocol address information different from the updated uplink mapping information or Internet Protocol address information for the first node for communications via the first signaling path, the processor is configured to cause the first node to:

transmit a reconfiguration complete message to the first donor node via the first signaling path in accordance with the initial uplink mapping information or Internet Protocol address information.

7. The first node of claim 1, wherein the processor is configured to cause the first node to:

transmit an acknowledgement of the reconfiguration message via the second signaling path in accordance with the updated uplink mapping information or Internet Protocol address information as part of communication via the second signaling path.

8. The first node of claim 1, wherein the processor is configured to cause the first node to:

initiate a security handshake via the second signaling path in accordance with the updated uplink mapping information or Internet Protocol address information as part of communication via the second signaling path.

9. The first node of claim 1, wherein the trigger for reconfiguration of the first node for the second signaling path via the third node comprises an expiration of a timer, an absolute time, reception of a first indication from the first donor node, reception of a second indication from a parent node of the first node, or any combination thereof.

10. The first node of claim 1, wherein the indication to delay application of the portion of the reconfiguration message comprises:

an indication to postpone forwarding of an upstream message to the third node, wherein the upstream message is from a child node of the first node.

11. The first node of claim 1, wherein the processor is configured to cause the first node to:

perform a random access procedure, a security handshake, or a handover procedure from the second node to the third node.

12. The first node of claim 1, wherein the processor is configured to cause the first node to:

configure, based at least in part on the reconfiguration message, a new or existing stream control transmission protocol (SCTP) connection, a new or existing F1 control plane (F1-C) connection, an additional signaling path of an existing SCTP connection, or one or more new or existing F1 user plane (F1-U) data tunnels for the first node.

13. The first node of claim 1, wherein the processor is configured to cause the first node to:

discard one or more portions of the reconfiguration message based at least in part on a failure of establishment of the second signaling path.

14. The first node of claim 13, wherein the processor is configured to cause the first node to:

determine the failure of establishment of the second signaling path based at least in part on an indication from the first donor node, a parent node of the first node, or a lack of receipt of a configuration message from the parent node prior to expiration of a timer.

15. The first node of claim 1, wherein the second signaling path is between the first node and the first donor node or between the first node and a second donor node.

16. A first node for wireless communication, comprising:

a memory; and a processor coupled to the memory, wherein the processor is configured to cause the first node to:

receive, from a second node and via a first signaling path between the first node and a first donor node, a reconfiguration message that indicates a reconfiguration of the first node for a second signaling path, wherein the reconfiguration message indicates updated uplink mapping information or Internet Protocol address information for the first node for communications via the second signaling path;

utilize, before communication via the second signaling path, initial uplink mapping information or Internet Protocol address information different from the updated uplink mapping information or Internet Protocol address information for the first node for communications via the first signaling path; and communicate via the second signaling path in accordance with the reconfiguration message.

17. The first node of claim 16, wherein at least one of:

to utilize the initial uplink mapping information or Internet Protocol address information different from the updated uplink mapping information or Internet Protocol address information for the first node for communications via the first signaling path, the processor is configured to cause the first node to transmit a reconfiguration complete message to the first donor node via the first signaling path in accordance with the initial uplink mapping information or Internet Protocol address information;

the processor is configured to cause the first node to transmit an acknowledgement of the reconfiguration message via the second signaling path in accordance with the updated uplink mapping information or Internet Protocol address information as part of communication via the second signaling path; or the processor is configured to cause the first node to initiate a security handshake via the second signaling path in accordance with the updated uplink mapping information or Internet Protocol address information as part of communication via the second signaling path.

18. The first node of claim 16, wherein, to utilize the initial uplink mapping information or Internet Protocol address information different from the updated uplink mapping information or Internet Protocol address information for the first node for communications via the first signaling path, the processor is configured to cause the first node to transmit a reconfiguration complete message to the first donor node via the first signaling path in accordance with the initial uplink mapping information or Internet Protocol address information.

19. The first node of claim 16, wherein the processor is configured to cause the first node to transmit an acknowledgement of the reconfiguration message via the second signaling path in accordance with the updated uplink mapping information or Internet Protocol address information as part of communication via the second signaling path.

20. The first node of claim 16, wherein the processor is configured to cause the first node to initiate a security handshake via the second signaling path in accordance with the updated uplink mapping information or Internet Protocol address information as part of communication via the second signaling path.

21. A method of wireless communication performed by a first node, the method comprising:

receiving, from a second node and via a first signaling path between the first node and a first donor node, a reconfiguration message that indicates a reconfiguration of the first node for a second signaling path, wherein the reconfiguration message indicates updated uplink mapping information or Internet Protocol address information for the first node for communications via the second signaling path;

utilizing, before communication via the second signaling path, initial uplink mapping information or Internet Protocol address information different from the updated uplink mapping information or Internet Protocol address information for the first node for communications via the first signaling path; and communicating via the second signaling path in accordance with the reconfiguration message.

22. The method of claim 21, wherein at least one of:

the utilizing comprises transmitting a reconfiguration complete message to the first donor node via the first signaling path in accordance with the initial uplink mapping information or Internet Protocol address information;

the method further comprises transmitting an acknowledgement of the reconfiguration message via the second signaling path in accordance with the updated uplink mapping information or Internet Protocol address information as part of communication via the second signaling path; or the method further comprises initiating a security handshake via the second signaling path in accordance with the updated uplink mapping information or Internet Protocol address information as part of communication via the second signaling path.

23. The method of claim 21, wherein the utilizing comprises transmitting a reconfiguration complete message to the first donor node via the first signaling path in accordance with the initial uplink mapping information or Internet Protocol address information.

24. The method of claim 21, wherein the method further comprises transmitting an acknowledgement of the reconfiguration message via the second signaling path in accordance with the updated uplink mapping information or Internet Protocol address information as part of communication via the second signaling path.

25. The method of claim 21, wherein the method further comprises initiating a security handshake via the second signaling path in accordance with the updated uplink mapping information or Internet Protocol address information as part of communication via the second signaling path.

* * * * *